(12) United States Patent
Hayashi et al.

(10) Patent No.: US 10,033,997 B2
(45) Date of Patent: Jul. 24, 2018

(54) IMAGE DECODING APPARATUS, IMAGE DECODING METHOD, INTEGRATED CIRCUIT, AND PROGRAM

(75) Inventors: Yoshiteru Hayashi, Kyoto (JP); Takeshi Tanaka, Osaka (JP); Takashi Hashimoto, Fukuoka (JP); Satoshi Kajita, Osaka (JP); Hiroshi Amano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 797 days.

(21) Appl. No.: 13/805,704

(22) PCT Filed: Jun. 21, 2011

(86) PCT No.: PCT/JP2011/003529
§ 371 (c)(1),
(2), (4) Date: Dec. 20, 2012

(87) PCT Pub. No.: WO2011/161949
PCT Pub. Date: Dec. 29, 2011

(65) Prior Publication Data
US 2013/0089149 A1    Apr. 11, 2013

(30) Foreign Application Priority Data

Jun. 23, 2010 (JP) ................. 2010-143205

(51) Int. Cl.
*H04N 7/32*     (2006.01)
*H04N 19/50*    (2014.01)
(Continued)

(52) U.S. Cl.
CPC ....... *H04N 19/00569* (2013.01); *H04N 19/44* (2014.11); *H04N 19/51* (2014.11);
(Continued)

(58) Field of Classification Search
CPC ............. H04N 19/00569; H04N 19/52; H04N 19/176; H04N 19/51; H04N 19/86;
(Continued)

(56) References Cited

U.S. PATENT DOCUMENTS 6,501,859 B1 * 12/2002 Kajiwara ............... H04N 19/00
375/E7.049
6,714,686 B2   3/2004 Hashimoto
(Continued)

FOREIGN PATENT DOCUMENTS

JP    2001-275116    10/2001
JP    2005-295526    10/2005
(Continued)

OTHER PUBLICATIONS

International Search Report dated Sep. 27, 2011 in corresponding International Application No. PCT/JP2011/003529.
(Continued)

*Primary Examiner* — Jonathan Messmore
*Assistant Examiner* — Matthew Kwan
(74) *Attorney, Agent, or Firm* — Wenderoth, Lind & Ponack, L.L.P.

(57) ABSTRACT

An image decoding device is provided that decodes, without an increase in the circuit size, a coded video sequence including a large-size block. The image decoding apparatus includes: a block division unit which divides a current block that is to be decoded and is included in a picture of the coded video sequence, into sub-blocks; an image obtainment unit which obtains, for each of the sub-blocks, image data corresponding to the sub-block from a recording medium; a prediction unit which generates, for each of the sub-blocks, a predicted image of the sub-block, based on the image data obtained by the image obtainment unit; and a reconstruction unit which reconstructs each of the sub-blocks, by adding
(Continued)

the predicted image generated for the sub-block to the sub-block.

12 Claims, 43 Drawing Sheets

(51) Int. Cl.
    *H04N 19/51*     (2014.01)
    *H04N 19/44*     (2014.01)
    *H04N 19/52*     (2014.01)
    *H04N 19/176*    (2014.01)
    *H04N 19/61*     (2014.01)
    *H04N 19/96*     (2014.01)
    *H04N 19/107*    (2014.01)
    *H04N 19/86*     (2014.01)

(52) U.S. Cl.
    CPC .......... *H04N 19/107* (2014.11); *H04N 19/176* (2014.11); *H04N 19/52* (2014.11); *H04N 19/61* (2014.11); *H04N 19/86* (2014.11); *H04N 19/96* (2014.11)

(58) Field of Classification Search
    CPC ...... H04N 19/96; H04N 19/107; H04N 19/44; H04N 19/61
    USPC .......................... 375/240.12, 240.16, 240.25
    See application file for complete search history.

(56) References Cited

U.S. PATENT DOCUMENTS

| | | | |
|---|---|---|---|
| 2002/0015445 A1 | 2/2002 | Hashimoto | |
| 2006/0104354 A1* | 5/2006 | Han | H04N 19/159 375/240.03 |
| 2006/0209948 A1* | 9/2006 | Bialkowski | H04N 19/105 375/240.2 |
| 2006/0239354 A1 | 10/2006 | Amano et al. | |
| 2007/0002945 A1* | 1/2007 | Kim | H04N 19/176 375/240 |
| 2007/0206675 A1* | 9/2007 | Tanaka | H04N 19/127 375/240.12 |
| 2008/0031357 A1* | 2/2008 | Kimura | H04N 19/13 375/240.25 |
| 2008/0240245 A1* | 10/2008 | Lee | H04N 19/105 375/240.16 |
| 2009/0110069 A1* | 4/2009 | Jung | H04N 19/61 375/240.12 |
| 2009/0196517 A1 | 8/2009 | Divorra Escoda et al. | |
| 2012/0087413 A1 | 4/2012 | Amano et al. | |

FOREIGN PATENT DOCUMENTS

| | | |
|---|---|---|
| JP | 2006-311526 | 11/2006 |
| JP | 2010-502102 | 1/2010 |
| WO | 2008/027192 | 3/2008 |

OTHER PUBLICATIONS

"Advanced video coding for generic audiovisual services", ITU-T Recommendation H.264, Mar. 2005.

Thomas Wiegand et al., "Overview of the H.264/AVC Video Coding Standard", IEEE Transactions on Circuits and Systems for Video Technology, vol. 13, No. 7, Jul. 2003, pp. 560-576.

Jaeil Kim et al., "Enlarging MB size for high fidelity video coding beyond HD", ITU—Telecommunications Standardization Sector, Study Group 16 Question 6, Video Coding Experts Group (VCEG), VCEG-AJ21, 36th Meeting: San Diego, Oct. 8-10, 2008, http://wftp3.itu.int/av-arch/video-site/0810_San/VCEG-AJ21.zip.

P. Chen et al., "Video Coding Using Extended Block Sizes", ITU—Telecommunications Standardization Sector, Study Group 16 Question 6, Video Coding Experts Group (VCEG), VCEG-AJ23, 36th Meeting: San Diego, Oct. 8-10, 2008, http://wftp3.itu.int/av-arch/video-site/0810_San/VCEG-AJ23.zip.

Sung-Chang Lim et al., "Intra coding using extended block size", ITU—Telecommunications Standardization Sector, Study Group 16 Question 6, Video Coding Experts Group (VCEG), 38th Meeting: London/Geneva, Jul. 1-8, 2009, http://wftp3.itu.int/av-arch/video-site/0906_LG/VCEG-AL28.zip.

* cited by examiner

Unit blocks for performing motion compensation on super macroblock

IMAGE DECODING APPARATUS, IMAGE DECODING METHOD, INTEGRATED CIRCUIT, AND PROGRAM

TECHNICAL FIELD

The present invention relates to image decoding apparatuses and image decoding methods for decoding coded images. In particular, the present invention relates to an image decoding apparatus, an image decoding method, and so forth for decoding a coded stream in which the size of a unit block of decoding is larger than the size based on a conventional coding method (such as the H.264 standard).

BACKGROUND ART

A conventional image coding apparatus for coding a video sequence divides each picture included in the video sequence into macroblocks (hereafter, a macroblock may be referred to simply as "MB" for short). The size of a macroblock is 16 by 16 pixels (16 pixels in the horizontal direction and 16 pixels in the vertical direction). Then, the conventional image coding apparatus performs coding for each of the macroblocks in the order of raster scan. As a result, the conventional image coding apparatus generates a coded stream (a coded video sequence) by coding and compressing the video sequence. Then, a conventional image decoding apparatus decodes this coded stream on a macroblock-by-macroblock basis in the order of raster scan as well to reproduce the pictures of the original video sequence.

The conventional coding methods include the International Telecommunication Union Telecommunication Standardization Sector (ITU-T) H.264 standard (see Non Patent Literature 1 and Non Patent Literature 2, for example). When the images coded according to the H.264 standard are to be decoded, the coded stream is firstly read and variable-length decoding is performed after each piece of header information is decoded. Then, inverse quantization and inverse frequency transform are performed on coefficient information obtained by the variable-length decoding and, as a result, a difference image is generated. Next, according to a macroblock type (mb_type) obtained by the variable-length decoding, intra-picture prediction or motion compensation is performed to generate a predicted image. After this, a reconstruction process is performed by adding the difference image to the predicted image and, as a result, a reconstructed image is generated. Lastly, deblocking filtering is performed on the reconstructed image, and then a decoded image is obtained.

In this way, the processes from variable-length decoding to deblocking filtering are performed on a macroblock-by-macroblock basis and, as a result, the coded images are decoded. It is generally known, as a method for enhancing the decoding speed, to pipeline the decoding process on a macroblock-by-macroblock basis (see Patent Literature 1, for example). By the pipeline processing performed on a macroblock-by-macroblock basis (the macroblock-based pipeline processing), a series of processes (the decoding process) from variable-length decoding to deblocking filtering is divided into stages and then these stages are performed in parallel.

FIG. 1 is a diagram showing an example of the macroblock-based pipeline processing in the case where the decoding process is divided into four stages.

In the example shown in FIG. 1, processes from a stage 0 to a stage 3 are performed on one macroblock. In the stage 0, variable-length decoding is performed on a coded stream, and coding information and coefficient information for each pixel are outputted. In the stage 1, inverse quantization and inverse frequency transform are performed on the coefficient information obtained in the stage 0 and, as a result, a difference image is generated. In a stage 2, intra-picture prediction or motion compensation is performed according to the macroblock type obtained by the variable-length decoding and, as a result, a predicted image is generated. Then, the predicted image is added to the difference image obtained in the stage 1 to generate a reconstructed image. In the stage 3, deblocking filtering is performed on the reconstructed image obtained in the stage 2. In this way, by the pipeline processing, different macroblocks are processed in the stages at the same time, which implements parallel processing and thus enhances the decoding speed. Here, a cycle of a time slot (TS) in the pipeline processing is determined according to a processing cycle of a stage having the longest processing cycle (i.e., the longest stage). On this account, when one stage is the longest and only the processing cycle of this stage is longer, this means that the other stages cannot start processing for next macroblocks until the processing of the longest stage is completed. This causes an unnecessary idle time. In order for the pipeline processing to operate effectively, it is important for the processing cycles of the stages to be equal to each other.

As described above, according to the H.264 standard, an image is coded for each 16-by-16-pixel macroblock. However, the size of 16 by 16 pixels is not necessarily optimal as a unit of coding. In general, when the image resolution is higher, the correlation between neighboring blocks is higher. On account of this, a larger unit of coding can increase the compression efficiency. In recent years, the use of high definition (HD) images has increased. Moreover, since super high resolution displays of, for example, 4K2K (4096 pixels by 2048 pixels) have been developed, the resolution of images to be processed is expected to be increasingly higher. As the image resolution becomes higher in this way, higher-resolution images cannot be effectively coded with the H.264 standard.

With this being the situation, technologies proposed as next-generation image coding standards include technologies that solve the stated problem (see Non Patent Literatures 3, 4, and 5). With these technologies, the size of a unit block of coding according to the conventional H.264 standard is made variable, thereby allowing coding to be performed for each block that is larger than the conventional 16-by-16-pixel unit block.

Non Patent Literature 3 defines a macroblock having the size larger than 16 by 16 pixels, such as a 32-by-32-pixel macroblock, a 64-by-64-pixel macroblock, and a 128-by-128-pixel macroblock at the maximum, in addition to a 16-by-16-pixel macroblock.

Hereafter, in order to be distinguished from the conventional 16-by-16-pixel macroblock, a macroblock having the size larger than 16 by 16 pixels is referred to as a super macroblock. As in the case of the H.264 standard, a super macroblock has a hierarchical structure. When a block includes four sub-blocks, a structural pattern is further defined for each sub-block.

FIG. 2 is a diagram showing possible structural patterns in the case where the size of a super macroblock is 64 by 64 pixels. With such an increase in the macroblock size, the compression efficiency for high-resolution images can be improved.

Non Patent Literature 4 defines a 32-by-32-pixel super macroblock. Non Patent Literature 4 describes the technology of performing motion compensation block by block for the case where the block is an internal sub-block of the super macroblock. Moreover, as with the technology described in Non Patent Literature 3, since the super macroblock has a hierarchical structure, motion compensation is performed according to this hierarchical structure.

FIG. 3 is a diagram showing possible structural patterns of the super macroblock described in Non Patent Literature 4. As shown in FIG. 3, Non Patent Literature 4 describes motion compensation performed per block having the size of 32 by 32 pixels, 32 by 16 pixels, or 16 by 32 pixels that is not defined according to the H.264 standard.

Non Patent Literature 5 defines a 32-by-32-pixel super macroblock, and describes the technology of performing intra-picture prediction block by block for the case where the block has the size of 32 by 32 pixels that is not defined according to the H.264 standard.

As described thus far, in order to improve the compression efficiency for high-resolution images, the methods for increasing the size of the block used as the units of coding and decoding have been proposed in recent years. Here, the methods for increasing the block unit of motion compensation and intra-picture prediction to be larger than 16 by 16 pixels have been proposed. However, as of now, no method has been proposed to perform inverse quantization (quantization in the case of coding) and inverse frequency transform (frequency transform in the case of coding) per block having the size larger than 16 by 16 pixels.

CITATION LIST

Patent Literature

[PTL 1]
Japanese Unexamined Patent Application Publication No. 2005-295526
[Non Patent Literature]
[NPL 1]
ITU-T H.264 standard: Advanced video coding for generic audiovisual services, May 2005.
[NPL 2]
Thomas Wiegand et al, "Overview of the H.264/AVC Video Coding Standard", IEEE TRANSACTIONS ON CIRCUITS AND SYSTEMS FOR VIDEO TECHNOLOGY, JULY 2003, PP. 1-19.
[NPL 3]
Jaeil Kim et al, "Enlarging MB size for high fidelity video coding beyond HD", [online], ITU-T Video Coding Experts Group, Oct. 8, 2008 [searched on Oct. 19, 2009], <URL: http://wftp3.itu.int/av-arch/video-site/0810_San/VCEG-AJ21.zip>
[NPL 4]
P. Chen et al, "Video Coding Using Extended Block Sizes", [online], ITU-T Video Coding Experts Group, Oct. 8, 2008 [searched on Oct. 19, 2009], <URL: http://wftp3.itu.int/av-arch/video-site/0810_San/VCEG-AJ23.zip>
[NPL 5]
Sung-Chang Lim et al, "Intra coding using extended block size", [online], ITU-T Video Coding Experts Group, June 1, 2009 [searched on Oct. 19, 2009], <URL: http://wftp3.itu.int/av-arch/video-site/0906_LG/VCEG-AL28.zip>

SUMMARY OF INVENTION

Technical Problem

As described above, the methods for increasing the compression efficiency by using super macroblocks are described in Non Patent Literatures 3 to 5. With these methods, the size of the block used as the unit of coding is enlarged. For this reason, the circuit size of an image decoding apparatus that performs decoding block by block according to this unit of processing is disadvantageously increased. The conventional apparatus is implemented to process only 16-by-16-pixel blocks. However, according to Non Patent Literature 3, the apparatus needs to be implemented to process a block having the size of 128 by 128 pixels at the maximum. Thus, the corresponding processing units that perform, for example, motion compensation and intra-picture prediction need to be structured so as to process the 128-by-128-pixel block at the maximum. This disadvantageously increases the circuit size. Moreover, in the case where the size of a super macroblock is variable, the apparatus needs to correspond to all the possible block sizes and, therefore, a processing unit for each block size needs to be implemented. This also disadvantageously increases the circuit size. Hence, an image decoding apparatus for processing super macroblocks has the problem of the increase in the circuit size of the image decoding apparatus.

Furthermore, in the case where the size of a super macroblock is variable, there is a problem when a coded video sequence is decoded by the pipeline processing. In general, when the size of the macroblock is larger, the decoding cycle is longer. Thus, in the case where macroblocks in different sizes are present in the pictures, the processing cycles of the stages in the pipeline processing vary according to the size of the macroblock. This causes a waiting time where no blocks can be processed. Therefore the efficiency of the pipeline processing is reduced, which results in a reduction in the processing efficiency of the image decoding apparatus.

FIG. 4 is a diagram showing an example where waiting times are caused in the pipeline processing.

Suppose that, for example, a coded stream including super macroblocks is decoded by the macroblock-based pipeline processing having four stages as shown in FIG. 4. As an example, the coded stream includes an MB 4 that is a sole 32-by-32-pixel super macroblock and the other macroblocks that are regular 16-by-16-pixel macroblocks. In this case, as can be seen from the pipeline processing shown in FIG. 4, since the size of the MB 4 is four times as large as a regular macroblock, the processing cycle is also four times longer than the processing cycle of the other macroblocks. On this account, after the processing is completed for an MB 3, an MB 2, and an MB 1 in stages 1 to 3, these stages have to wait until the processing for the MB 4 is completed in a stage 0. This causes idle times (namely, waiting times). Similarly, after the processing is completed for an MB 5, the MB 3, and the MB 2 in the stages 0, 2, and 3, these stages have to wait until the processing for the MB 4 is completed in the stage 1. Also, after the processing is completed for an MB 6, the MB 5, and the MB 3 in the stages 0, 1, and 3, these stages have to wait until the processing for the MB 4 is completed in the stage 2. Moreover, after the processing is completed for an MB 7, the MB 6, and the MB 5 in the stages 0 to 2, these stages have to wait until the processing for the MB 4 is completed in the stage 3. In this way, when the coded stream including the super macroblock is decoded by the pipeline processing, idle times are caused. As a result, the processing efficiency is disadvantageously reduced.

Although the aforementioned problem occurs by using super macroblocks, Non Patent Literatures 3 to 5 make no mention of this problem.

The present invention is conceived to solve the aforementioned conventional problem, and has an object to provide an image decoding apparatus that decodes, without an increase in the circuit size, a coded video sequence including a large-size block.

Solution to Problem

In order to achieve the above object, the image decoding apparatus in an aspect according to the present invention is an image decoding apparatus that decodes a coded video sequence generated by coding, per block, each of pictures included in video, the image decoding apparatus including: a block division unit which divides a current block that is to be decoded and is included in a picture of the coded video sequence, into a plurality of sub-blocks; an image obtainment unit which obtains, for each of the sub-blocks, image data corresponding to the sub-block from a recording medium; a prediction unit which generates, for each of the sub-blocks, a predicted image of the sub-block, based on the image data obtained by the image obtainment unit; and a reconstruction unit which reconstructs each of the sub-blocks, by adding the predicted image generated for the sub-block to the sub-block.

With this, when the size of a block (for example, a current block to be decoded, such as a current macroblock) used as a unit of coding in a coded video sequence is larger than, for example, the size defined by the H.264 standard (i.e., the 16-by-16-pixel size), the block is divided into a plurality of 16-by-16-pixel sub-blocks or the like. Therefore, the prediction unit does not need a circuit size for generating a predicted image corresponding to a block having the size larger than 16 by 16 pixels. As a result, the circuit of the prediction unit can be held to a minimum enough to generate a predicted image corresponding to a block having the size smaller than or equal to 16 by 16 pixels. Hence, a coded video sequence including a large-size block can be decoded without an increase in the circuit size.

Moreover, the image obtainment unit may obtain, as the image data corresponding to the sub-block, a part of an already-reconstructed picture that is included in the coded video sequence and is different from the picture including the sub-block, and the prediction unit may generate the predicted image by performing motion compensation on the sub-block, with reference to the image data obtained by the image obtainment unit. For example, the block division unit may divide the current block into the sub-blocks by assigning a motion vector and an index that indicates the different picture to each of the sub-blocks, the motion vector and the index being already assigned to the current block.

With this, the circuit size required for motion compensation performed to generate the predicted image can be suppressed.

Furthermore, the image obtainment unit may obtain, as the image data corresponding to the sub-block, a part of an already-reconstructed image in the picture including the sub-block, and the prediction unit may generate the predicted image by performing intra-picture prediction on the sub-block, with reference to the image data obtained by the image obtainment unit. For example, the block division unit may divide the current block into the sub-blocks by assigning, to each of the sub-blocks, an intra-prediction mode already assigned to the current block.

With this, the circuit size required for intra-picture prediction performed to generate the predicted image can be suppressed.

Moreover, the image decoding apparatus may further includes a determination unit which determines whether or not a size of the current block is larger than a predetermined size, wherein the block division unit may divide the current block into the sub-blocks when the determination unit determines that the size of the current block is larger than the predetermined size.

With this, the block is divided when the size of the block is larger than the predetermined size. Thus, the predetermined size may be set at the size of a sub-block, for example. When the coded video sequence includes a block having the size smaller than or equal to the predetermined size, this block is not divided and thus processed by the prediction unit. When the coded video sequence includes a block having the size larger than the predetermined size, this block is divided into a plurality of sub-blocks each of which is then processed by the prediction unit. Hence, when the blocks included in the coded video sequence have different sizes, the coded video sequence can be decoded appropriately without an increase in the circuit size.

Furthermore, the image decoding apparatus may further includes an inverse processing unit which performs inverse quantization and inverse frequency transform on the current block, sequentially for each of the sub-blocks, wherein the prediction unit may generate a predicted image of a first sub-block, among the sub-blocks, on which the inverse processing unit already performs inverse quantization and inverse frequency transform, while the inverse processing unit performs inverse quantization and inverse frequency transform on a second sub-block among the sub-blocks.

With this, after the inverse processing unit performs inverse quantization and inverse frequency transform on the first sub-block, inverse quantization and inverse frequency transform by the inverse processing unit for the second sub-block are performed in parallel with generation of the predicted image by the prediction unit for the first sub-block. To be more specific, the inverse processing unit and the prediction unit can execute the pipeline processing for each sub-block. Thus, without having to wait for inverse quantization and inverse frequency transform to be completed for different sub-blocks other than the first sub-block included in the current block, that is, without having to wait for these processes to be completed for the current entire block, the prediction unit can start processing for this block. As a result, the process waiting time can be reduced, and the efficiency of the decoding process can be increased.

Moreover, the image decoding apparatus may further includes a deblocking filtering unit which eliminates, for each of the sub-blocks, a block noise included in the sub-block reconstructed by the reconstruction unit, wherein the deblocking filtering unit may eliminate the block noise included in the first sub-block for which the predicted image is already generated by the prediction unit and which is already reconstructed by the reconstruction unit, while the prediction unit generates a predicted image of the second sub-block and the reconstruction unit reconstructs the second sub-block.

With this, after the prediction unit generates the predicted image for the first sub-block and the reconstruction unit reconstructs the first sub-block, generation of a predicted image by the prediction unit for the second sub-block, reconstruction by the reconstruction unit for the second sub-block, and block noise elimination by the deblocking filtering unit for the first sub-block are performed in parallel. To be more specific, the prediction unit, the reconstruction unit, and the deblocking filtering unit can execute the pipeline processing for each sub-block. Thus, without having to wait for predicted-image generation and reconstruction to be completed for different sub-blocks other than the first sub-block included in the current block, that is, without having to wait for these processes to be completed for the current entire block, the deblocking filtering unit can start processing for this block. As a result, the process waiting time can be further reduced, and the efficiency of the decoding process can be further increased.

Furthermore, the image decoding apparatus may further includes a memory; and a variable-length decoding unit which generates coefficient information by performing variable-length decoding on the coded video sequence and store the coefficient information into the memory, for each of blocks, wherein, when performing inverse quantization and inverse frequency transform on the sub-block, the inverse processing unit may read a part of the coefficient information corresponding to the sub-block and perform inverse quantization and inverse frequency transform on the read part of the coefficient information.

With this, inverse quantization and inverse frequency transform for the sub-block of the current block are performed on a part of the coefficient information generated as a result of variable-length decoding performed on the current block, that is, a part that is included in the coefficient information and corresponds to the current sub-block. Here, the generated coefficient information is temporarily stored into the memory. Then, inverse quantization and inverse frequency transform for the sub-block are performed on a part of the coefficient information read from the memory. Therefore, variable-length decoding can be sequentially performed on a block following this sub-block, without having to wait for inverse quantization and inverse frequency transform to be completed for this sub-block. To be more specific, regardless of the progress of inverse quantization, inverse frequency transform, and predicted-image generation, variable-length decoding can be proceeded. As a result, the process waiting time can be further reduced.

It should be noted that the present invention can be implemented not only as an image decoding apparatus as described, but also as: a method of a process operation performed by the image decoding apparatus; a program causing a computer to execute the process operation; a recording medium having the program recorded thereon; and an integrated circuit executing the process operation.

Advantageous Effects of Invention

The present invention allows a coded video sequence including a large-size block to be decoded without an increase in the circuit size. For example, a coded video sequence including a macroblock having the size larger than 16 by 16 pixels can be decoded using a small area. Hence, the present invention can advantageously implement a low-cost image decoding apparatus.

DESCRIPTION OF EMBODIMENTS

The following is a description of an image decoding apparatus in Embodiments according to the present invention, with reference to the drawings.

[Embodiment 1]
[Overview]

An overview of an image decoding apparatus according to the present invention is described. The image decoding apparatus decodes a coded video sequence in which the size of a macroblock and each of the sizes of unit blocks for motion compensation and intra-picture prediction are larger than the size according to the H.264 standard. The image decoding apparatus according to the present invention divides a macroblock included in the coded video sequence into sub-blocks each having a 16-by-16-pixel size that corresponds to the size of the macroblock according to the H.264 standard. Then, the image decoding apparatus performs motion compensation or intra-picture prediction on the sub-blocks. With this, even when the size of a macroblock is larger than 16 by 16 pixels, the image decoding apparatus can decode the coded video sequence with a circuit having the size enough to perform motion compensation and intra-picture prediction on a 16-by-16-pixel block.

This is the overview of the image decoding apparatus according to the present invention.

[Configuration]

Next, a configuration of an image decoding apparatus in Embodiment 1 is described.

Figure 5:
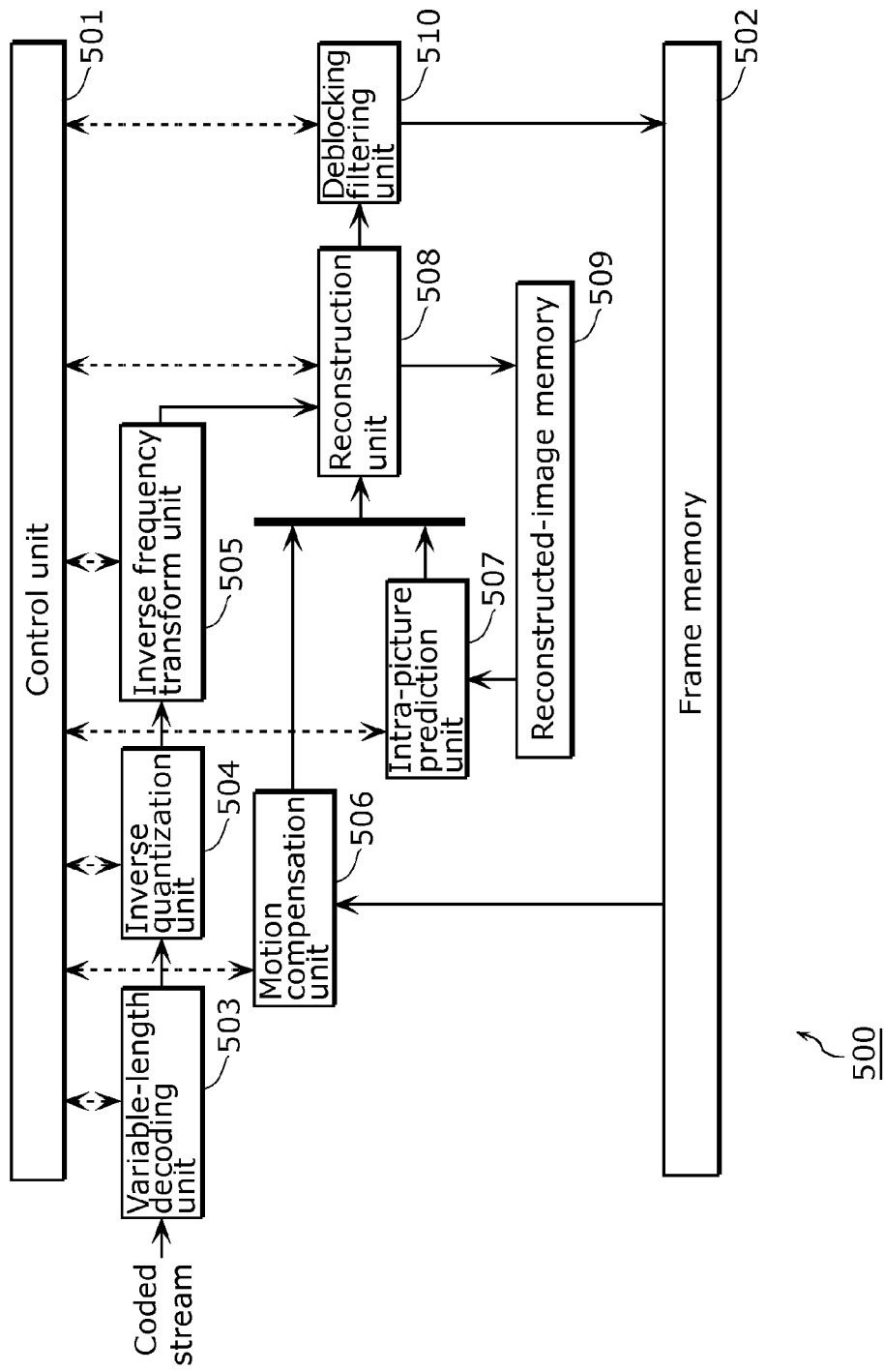
FIG. 5 is a diagram showing a configuration of an image decoding apparatus in Embodiment 1 according to the present invention.

FIG. 5 is a diagram showing the configuration of the image decoding apparatus in Embodiment 1.

An image decoding apparatus 500 in Embodiment 1 includes: a control unit 501 that controls the whole of the image decoding apparatus 500; a frame memory 502 that stores decoded image data; a reconstructed-image memory 509 that stores a part of a generated reconstructed image; a variable-length decoding unit 503 that reads a coded stream (a coded video sequence) and decodes a variable length code included in the coded stream; an inverse quantization unit 504 that performs inverse quantization; an inverse frequency transform unit 505 that performs inverse frequency transform; a motion compensation unit 506 that reads a reference image from the frame memory 502 and performs motion compensation to generate a predicted image; an intra-picture prediction unit 507 that reads a reconstructed image from the reconstructed-image memory 509 and performs intra-picture prediction (also referred to as intra prediction) to generate a predicted image; a reconstruction unit 508 that generates a reconstructed image by adding a difference image to a predicted image and stores a part of the reconstructed image into the reconstructed-image memory 509; and a deblocking filtering unit 510 that eliminates block noise from the reconstructed image to improve image quality.

Figure 6:
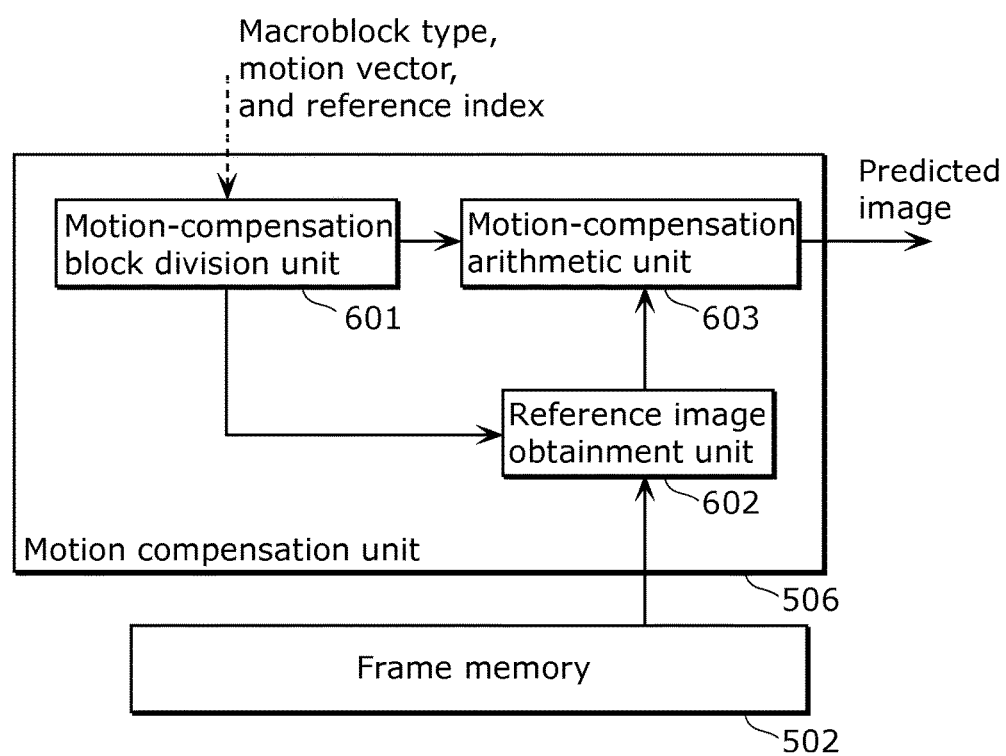
FIG. 6 is a diagram showing a configuration of a motion compensation unit in Embodiment 1 according to the present invention.

FIG. 6 is a diagram showing a configuration of the motion compensation unit 506.

The motion compensation unit 506 includes a motion-compensation block division unit 601, a reference image obtainment unit 602, and a motion-compensation arithmetic unit 603. The motion-compensation block division unit 601 receives, from the control unit 501, a macroblock type, a motion vector, and a reference index (ref_idx), and divides a macroblock into 16-by-16-pixel sub-blocks. Then, the motion-compensation block division unit 601 transmits, to the reference image obtainment unit 602 and the motion-compensation arithmetic unit 603: location information indicating a location in a macroblock for each sub-block; and a motion vector and a reference index for each sub-block. Based on the location information, the motion vector, and the reference index for each sub-block to be processed, the reference image obtainment unit 602 calculates a location of a reference image to be referenced in motion compensation performed on the sub-block, obtains the reference image from the frame memory 502, and then transmits the obtained reference image to the motion-compensation arithmetic unit 603. Based on the reference image transmitted from the reference image obtainment unit 602, the motion-compensation arithmetic unit 603 performs motion compensation on the sub-block and outputs a generated predicted image.

Figure 7:
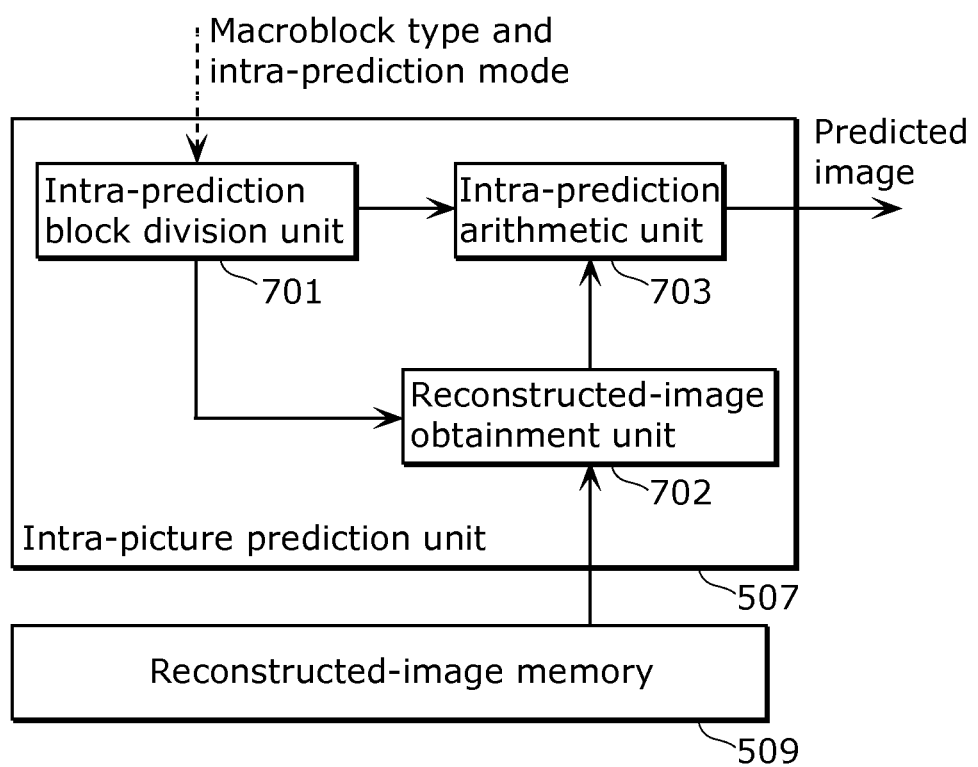
FIG. 7 is a diagram showing a configuration of an intra-picture prediction unit in Embodiment 1 according to the present invention.

FIG. 7 is a diagram showing a configuration of the intra-picture prediction unit 507.

The intra-picture prediction unit 507 includes an intra-prediction block division unit 701, a reconstructed-image obtainment unit 702, and an intra-prediction arithmetic unit 703. The intra-prediction block division unit 701 receives, from the control unit 501, a macroblock type and an intra-prediction mode, and divides a macroblock into 16-by-16-pixel sub-blocks. Then, the intra-prediction block division unit 701 transmits, to the reconstructed-image obtainment unit 702 and the intra-prediction arithmetic unit 703: location information indicating a location in a macroblock for each sub-block; and an intra-prediction mode for each sub-block. Based on the location information and the intra-prediction mode for each sub-block to be processed, the reconstructed-image obtainment unit 702 calculates a location of a reconstructed image to be referenced in intra-picture prediction performed on the sub-block, obtains the reconstructed image from the reconstructed-image memory 509, and then transmits the obtained reconstructed image to the intra-prediction arithmetic unit 703. Based on the reconstructed image transmitted from the reconstructed-image obtainment unit 702, the intra-prediction arithmetic unit 703 performs intra-picture prediction on the sub-block and outputs a generated predicted image.

This is the configuration of the image decoding apparatus 500.

[Operation]

Next, an operation performed by the image decoding apparatus in Embodiment 1 is described.

Figure 8A:
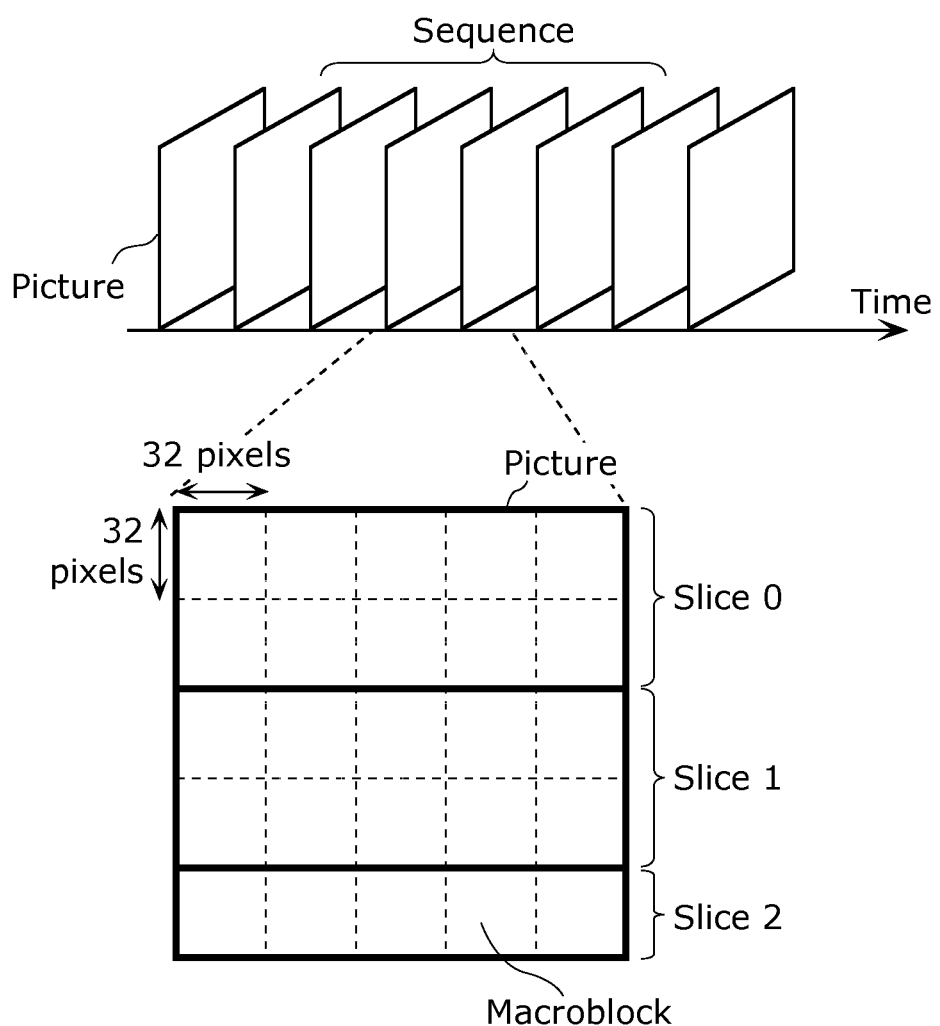
FIG. 8A is a diagram showing a structure of a coded video sequence to be decoded by the image decoding apparatus in Embodiment 1 according to the present invention.

FIG. 8A is a diagram showing a hierarchical structure of a sequence of pictures included in a coded video sequence to be decoded by the image decoding apparatus 500 in Embodiment 1.

A group of pictures is referred to as a sequence. Each of the pictures is divided into slices, each of which is in turn divided into macroblocks. Note that the size of the macroblock included in the coded video sequence to be decoded by the image decoding apparatus 500 in Embodiment 1 is 32 by 32 pixels which is larger than the size defined according to the H.264 standard. In accordance with the descriptions in Non Patent Literatures 4 and 5, motion compensation and intra-picture prediction are also performed per unit block larger than a 16-by-16-pixel block that is the maximum size defined according to the H.264 standard. More specifically, motion compensation is performed per unit block having the size of, for example, 32 by 32 pixels, 32 by 16 pixels, or 16 by 32 pixels, in addition to the size defined according to the H.264 standard. Intra-picture prediction is performed per unit block having the size of 32 by 32 pixels, in addition to the size defined according to the H.264 standard. It should be noted that each of the unit block (size) of motion compensation and the unit block (size) of intra-picture prediction never exceeds the size of the macroblock. On the other hand, each of the sizes of unit blocks of inverse quantization (quantization in the case of coding) and inverse frequency transform (frequency transform in the case of coding) is 16 by 16 pixels at the maximum as with the H.264 standard. In this way, the coded video sequence to be decoded by the image decoding apparatus 500 in Embodiment 1 is coded in the same manner as in the case of the H.264 standard, except that the size of the macroblock is 32 by 32 pixels and motion compensation and intra-picture prediction are performed per larger unit block. It should be noted that a picture may not be divided into slices.

Figure 8B:
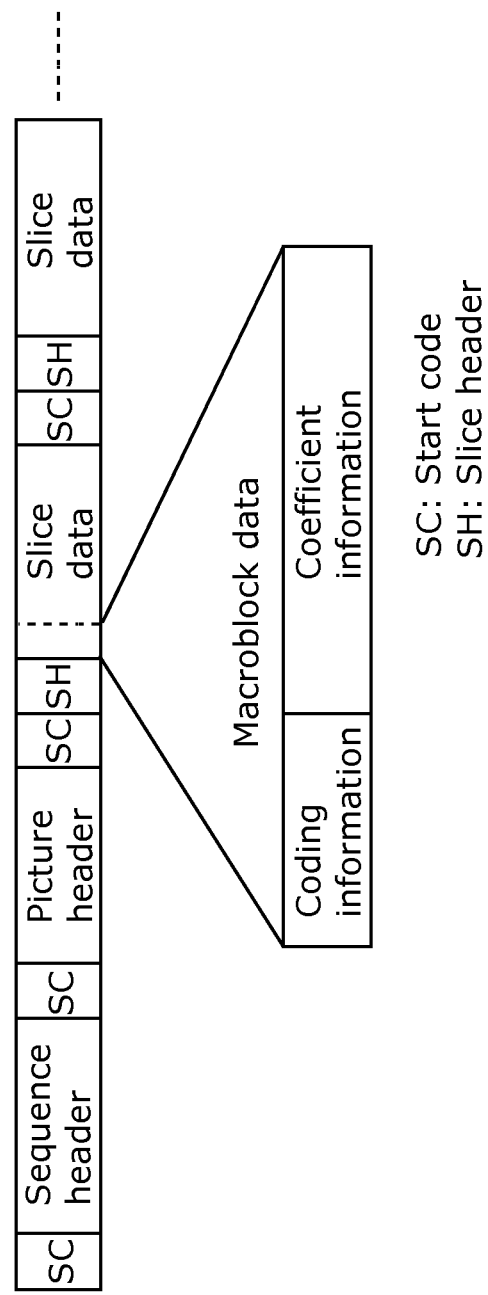
FIG. 8B is a diagram showing a structure of a coded stream in Embodiment 1 according to the present invention.

FIG. 8B is a diagram showing a structure of a coded stream.

In the coded stream as shown in FIG. 8B, a sequence, a picture, a slice, a macroblock, and so forth are hierarchically coded. The coded stream includes: a sequence header for controlling the sequence; a picture header for controlling the picture; a slice header for controlling the slice; and macroblock data. The size of the macroblock included in the slice is included in the slice header. The macroblock data is further divided into: coding information including a macroblock type, an intra-picture prediction (intra prediction) mode, motion vector information, and a quantization parameter; and coefficient information for each pixel. According to the H.264 standard, the sequence header is referred to as a sequence parameter set (SPS) and the picture header is referred to as a picture parameter set (PPS).

Figure 9:
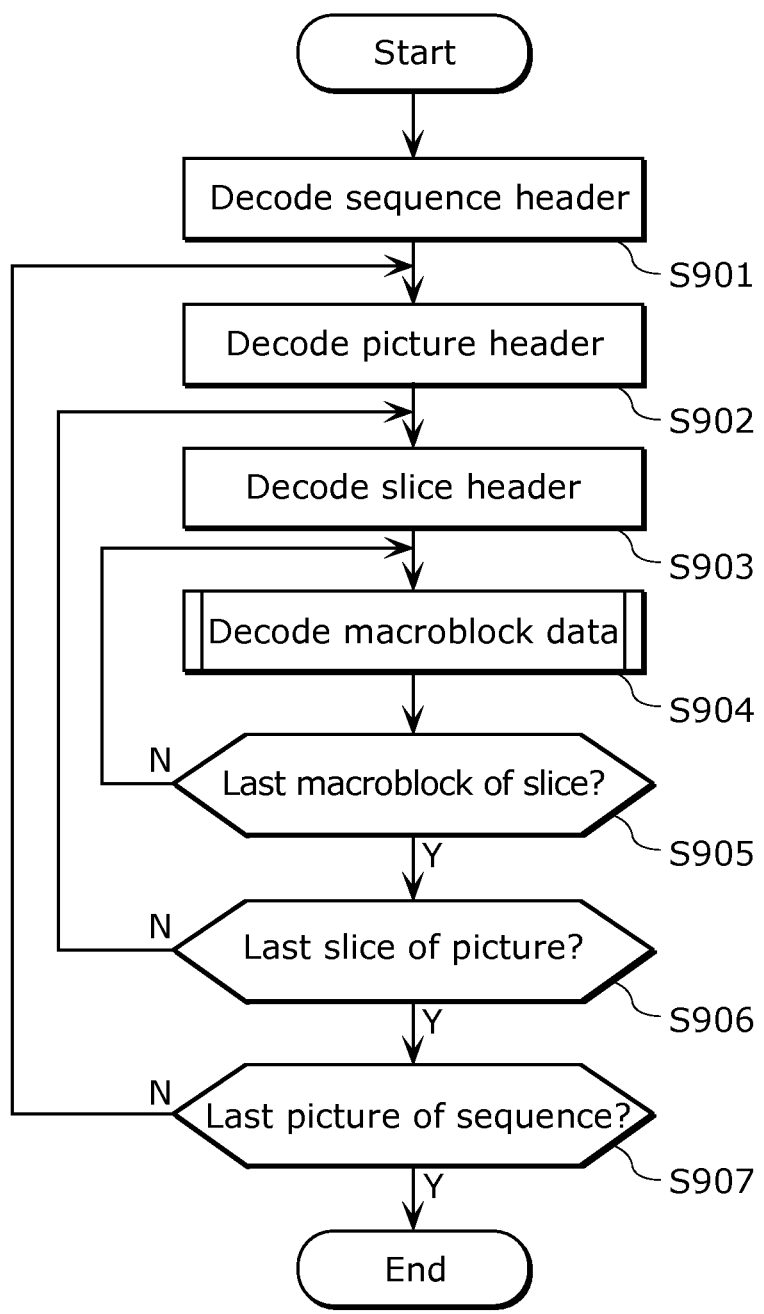
FIG. 9 is a flowchart showing an operation for decoding one sequence of a coded stream in Embodiment 1 according to the present invention.

FIG. 9 is a flowchart showing an operation performed by the image decoding apparatus 500 to decode one sequence of the coded stream.

As shown in FIG. 9, the image decoding apparatus 500 firstly decodes the sequence header (S901). Decoding of the sequence header (S901) is performed by the variable-length decoding unit 503 that decodes the coded stream under the control of the control unit 501. Similarly, the image decoding apparatus 500 next decodes the picture header (S902) and the slice header (S903).

After this, the image decoding apparatus 500 decodes the macroblock data (S904). Decoding of the macroblock data is described in detail later. When the decoding of the macroblock data is completed, the image decoding apparatus 500 determines whether or not the current macroblock data corresponds to the last macroblock of the slice (S905). When the current macroblock data does not correspond to the last macroblock of the slice (N in S905), the image decoding apparatus 500 decodes macroblock data again. When the current macroblock data corresponds to the last macroblock of the slice (Y in S905), the image decoding apparatus 500 determines whether or not the current slice is the last slice of the picture (S906). When the current slice is not the last slice of the picture (N in S906), the image decoding apparatus 500 decodes a slice header again (S903). When the current slice is the last slice of the picture (Y in S906), the image decoding apparatus 500 determines whether or not the current picture is the last picture of the sequence (S907). When the current picture is not the last picture of the sequence (N in S907), the image decoding apparatus 500 decodes a picture header again (902). When decoding is completed for all the pictures of the sequence, a series of decoding processes is terminated.

Figure 10:
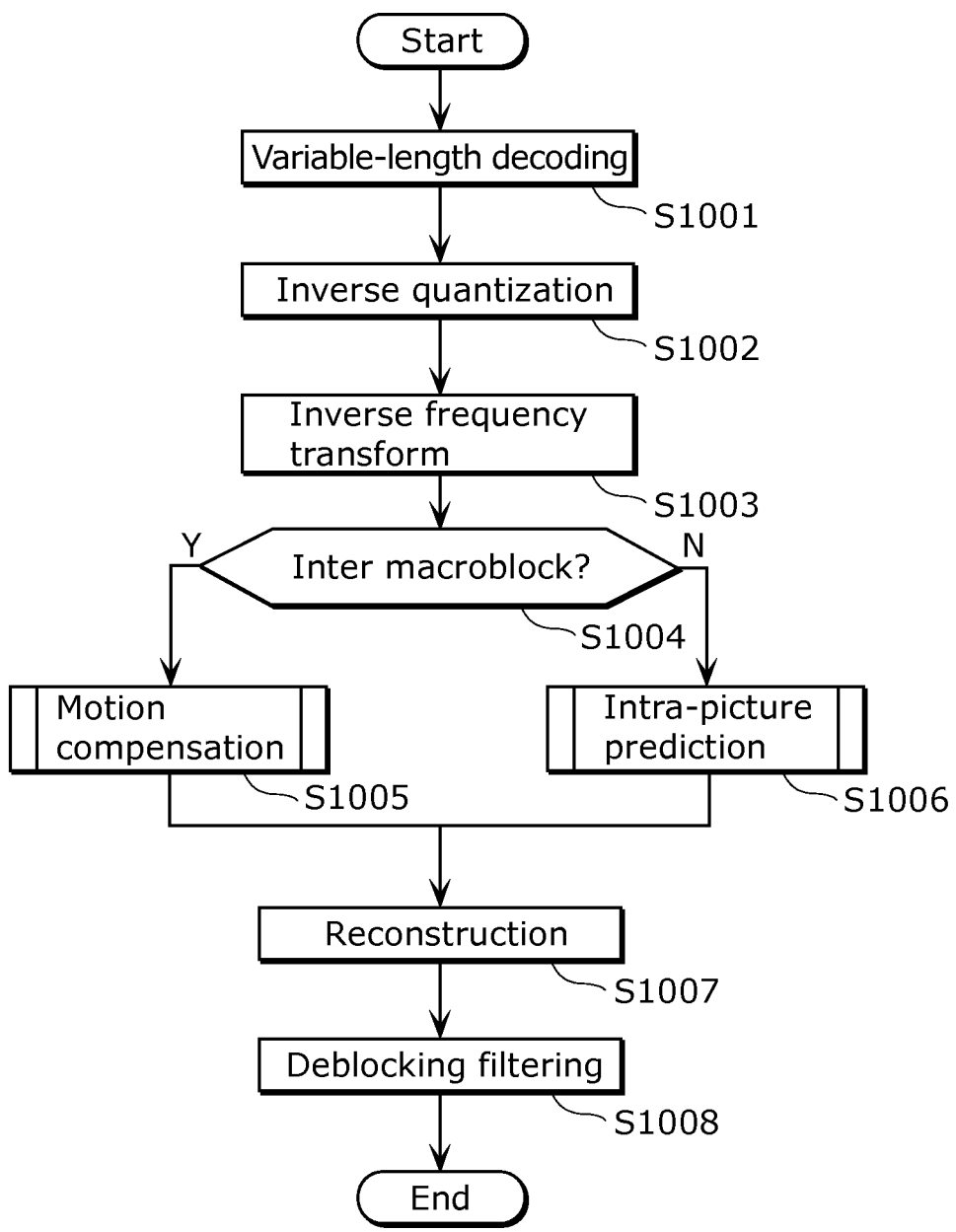
FIG. 10 is a flowchart showing an operation for decoding data of one macroblock in Embodiment 1 according to the present invention.

FIG. 10 is a flowchart showing an operation performed by the image decoding apparatus 500 to decode one macroblock. It should be noted that this flowchart shows the process operation performed in step S904 of FIG. 9.

Firstly, the variable-length decoding unit 503 performs variable-length decoding on the input coded stream (S1001). In the variable-length decoding process (S1001), the variable-length decoding unit 503 outputs: coding information including a macroblock type, an intra-picture prediction (intra prediction) mode, a motion vector, a reference index, and a quantization parameter; and coefficient information for each pixel. The coding information is outputted to the control unit 501 and, after this, inputted into corresponding processing units. The coefficient information is outputted to the inverse quantization unit 504 subsequent to the variable-length decoding unit 503. Then, the inverse quantization unit 504 performs the inverse quantization process on the coefficient information (S1002). After this, the inverse frequency transform unit 505 performs inverse frequency transform on the inversely-quantized coefficient information to generate a difference image (S1003).

Next, the control unit 501 determines, based on the macroblock type, whether the current macroblock to be decoded is an inter macroblock or an intra macroblock (S1004). When the current macroblock is an inter macroblock (Y in S1004), the control unit 501 activates the motion compensation unit 506 and causes the motion compensation unit 506 to generate a predicted image with a ½ pixel precision or a ¼ pixel precision (S1005). On the other hand, when the current macroblock is not an inter macroblock (N in S1004), that is, when the current macroblock is an intra macroblock, the control unit 501 activates the intra-picture prediction unit 507 and causes the intra-picture prediction unit 507 to perform the intra-picture prediction process to generate a predicted image (S1006). Note that the motion compensation process and the intra-picture prediction process are described in detail later.

The reconstruction unit 508 generates a reconstructed image by adding the predicted image outputted from the motion compensation unit 506 or the intra-picture prediction unit 507 to the difference image outputted from the inverse frequency transform unit 505 (S1007). The generated reconstructed image is transmitted to the deblocking filtering unit 510 and, at the same time, a part of the generated reconstructed image is stored into the reconstructed-image memory 509. Lastly, the deblocking filtering unit 510 obtains the reconstructed image from the reconstruction unit 508, performs the deblocking filtering process on the reconstructed image to reduce block noise, and then stores the result into the frame memory 502 (S1008). With that, the operation to decode one macroblock is terminated.

Figure 11:
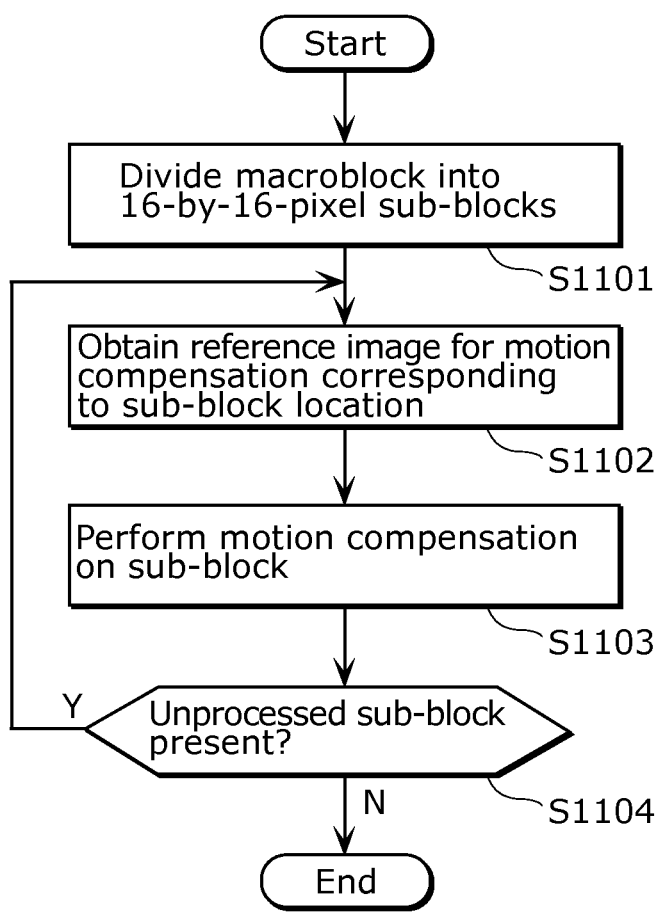
FIG. 11 is a flowchart showing an operation for motion compensation in Embodiment 1 according to the present invention.

FIG. 11 is a flowchart showing an operation for motion compensation performed by the motion compensation unit 506 of the image decoding apparatus 500. It should be noted that this flowchart shows the process operation performed in step S1005 of FIG. 10.

Firstly, the motion-compensation block division unit 601 divides the macroblock into 16-by-16-pixel sub-blocks. To be more specific, the motion-compensation block division unit 601 calculates: location information indicating a location in the macroblock for each sub-block; and a motion vector and a reference index for each sub-block (S1101). The location information regarding the sub-block is represented by coordinates of a pixel located at the upper left of the sub-block in the macroblock. It should be noted that the location information regarding the sub-block may be an index number indicating the location of the sub-block, instead of the coordinates. For example, a method of assigning an index number for each of the sub-blocks can be used as follows. An index number "0" may be assigned to the sub-block located at the upper left of the 32-by-32-pixel macroblock. An index number "1" may be assigned to the sub-block located at the upper right. An index number "2" may be assigned to the sub-block located at the lower left. An index number "3" may be assigned to the sub-block located at the lower right. When motion compensation is performed per unit block having the size smaller than the sub-block, the motion vector and the reference index of the motion-compensation unit block included in the sub-block are used as the motion vector and the reference index of the sub-block. On the other hand, when motion compensation is performed per unit block having the size larger than the sub-block, the motion vector and the reference index of the sub-block are used as the motion vector and the reference index of the motion-compensation unit block that includes the current sub-block.

After this, the reference image obtainment unit 602 calculates a location of a reference image referenced in motion compensation performed on the sub-block, from the location information regarding the sub-block and the motion vector and the reference index of the sub-block, and then obtains the reference image from the frame memory 502 (S1102). The obtained reference image is transmitted to the motion-compensation arithmetic unit 603. After this, using the received reference image, the motion-compensation arithmetic unit 603 performs motion compensation on the sub-block and outputs a predicted image (S1103). With that, the motion compensation process is completed for one sub-block. Next, the motion compensation unit 506 determines whether or not the macroblock includes a sub-block that has yet to be processed (S1104). When an unprocessed sub-block is present (Y in S1104), a reference image of the unprocessed sub-block is obtained (S1102) and then motion compensation is performed (S1103). When no unprocessed sub-block is present and motion compensation is thus completed for all the sub-blocks (N in S1104), this means that the motion compensation process is completed for one macroblock.

Next, the operation for motion compensation described thus far is explained using a specific example.

Figure 12:
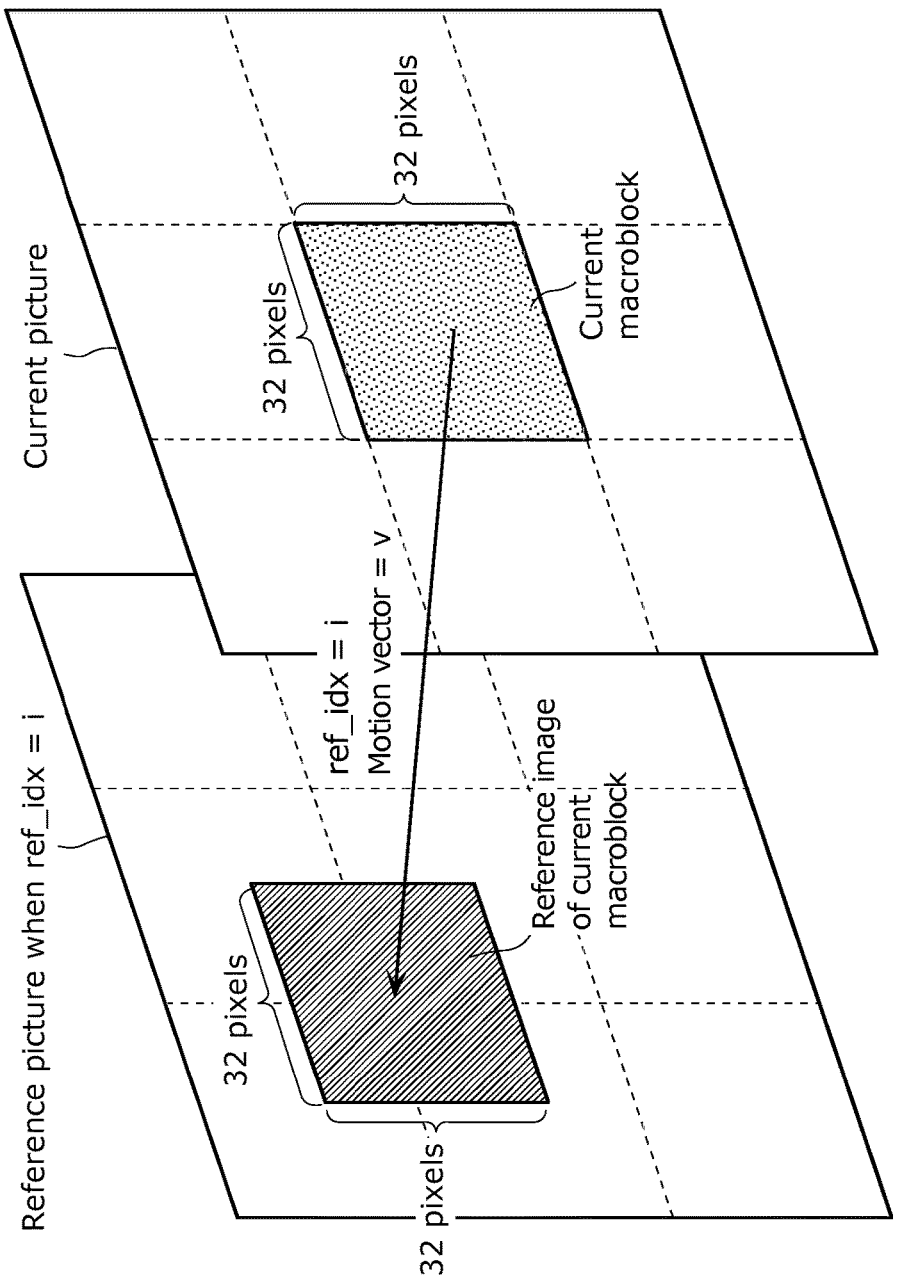
FIG. 12 is a diagram showing an operation for typical motion compensation performed in the case where the size of a unit block of motion compensation is 32 by 32 pixels.

FIG. 12 is a diagram showing an operation for typical motion compensation performed in the case where the size of the motion-compensation unit block is 32 by 32 pixels. In this example as shown in FIG. 12: the size of the motion-compensation unit block in the current macroblock to be decoded is 32 by 32 pixels; a reference index (ref_idx) of the motion-compensation unit block (the current macroblock) is "i"; and a motion vector of the motion-compensation unit block is "v". The motion compensation process is performed, using a picture specified by the reference index "i" as the reference picture and using a 32-by-32-pixel block specified by the motion vector "v" as the reference image.

In Embodiment 1, the motion-compensation block division unit 601 firstly divides the current macroblock having the 32-by-32-pixel size into the 16-by-16-pixel sub-blocks.

Figure 13:
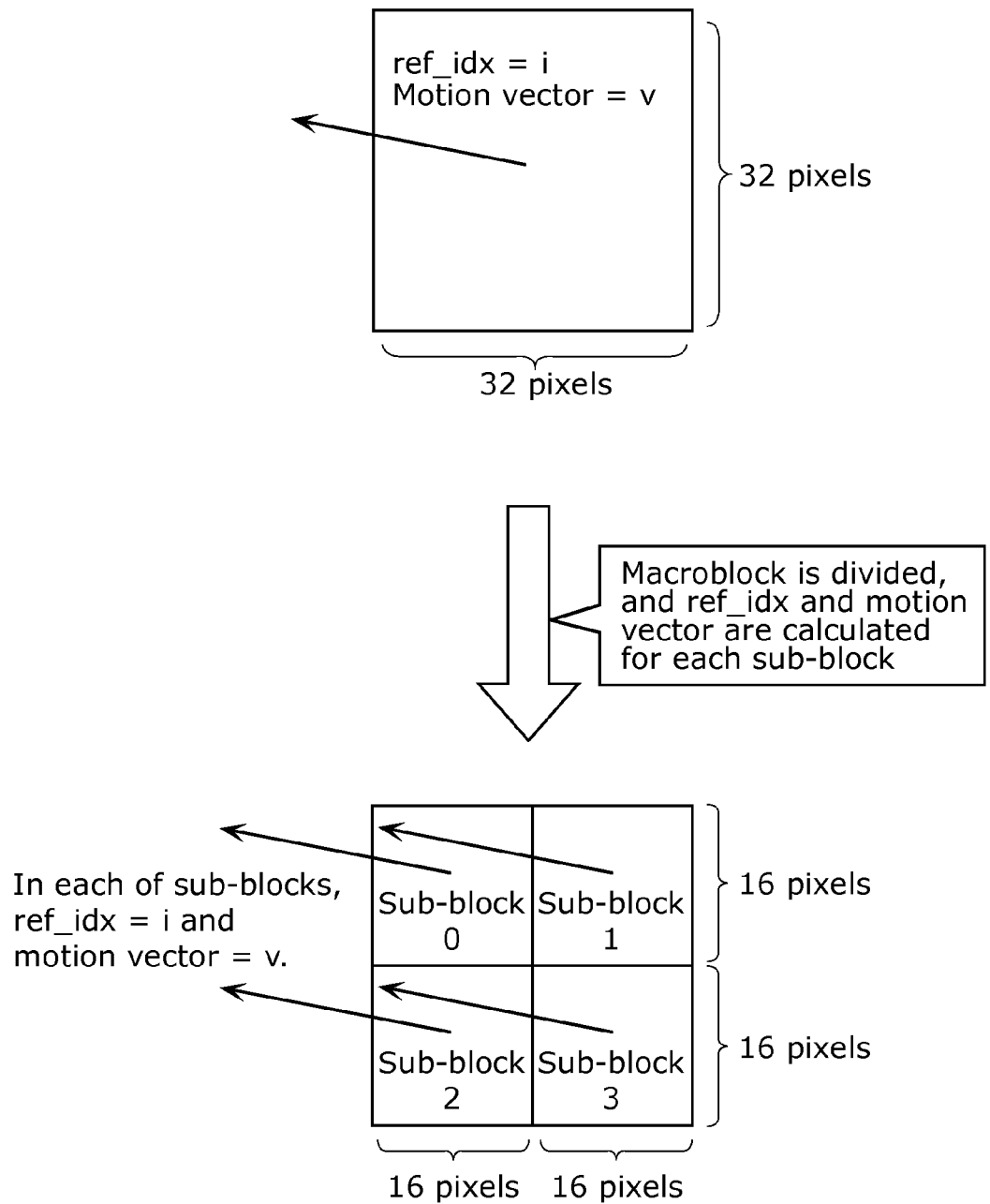
FIG. 13 is a diagram showing an operation to divide a macroblock in motion compensation in Embodiment 1 according to the present invention.

FIG. 13 is a diagram showing the motion vectors and the reference indexes of the sub-blocks.

The motion-compensation unit block is larger than the sub-block and has the size of 32 by 32 pixels equal to the size of the current macroblock. Therefore, as shown in FIG. 13, each of the motion vectors and each of the reference indexes of the sub-blocks are used as the motion vector and the reference index of the motion-compensation unit block having the 32-by-32-pixel size (i.e., the current macroblock). More specifically, each of the motion vectors of the sub-blocks is "v", and each of the reference indexes of the sub-blocks is "i". Here, note that: a block located at the upper left of the macroblock is referred to as the sub-block 0; a block located at the upper right of the macroblock is referred to as the sub-block 1; a block located at the lower left of the macroblock is referred to as the sub-block 2; and a block located at the lower right of the macroblock is referred to as the sub-block 3. Hereafter, the process is performed on the sub-block 0, the sub-block 1, the sub-block 2, and the sub-block 3 in this order. In other words, the motion-compensation division unit 601 divides the current macroblock into the four sub-blocks 0 to 3, assigns the reference index "i" of the motion-compensation unit block (i.e., the current macroblock) to each of the four sub-blocks 0 to 3, and assigns the motion vector "v" of the motion-compensation unit block (i.e., the current macroblock) to each of the four sub-blocks 0 to 3.

Next, based on the location of the sub-block 0 and the motion vector v and the reference index i of the sub-block 0, the reference image obtainment unit 602 obtains the reference image to be referenced by the sub-block 0 from the frame memory 502.

Figure 14:
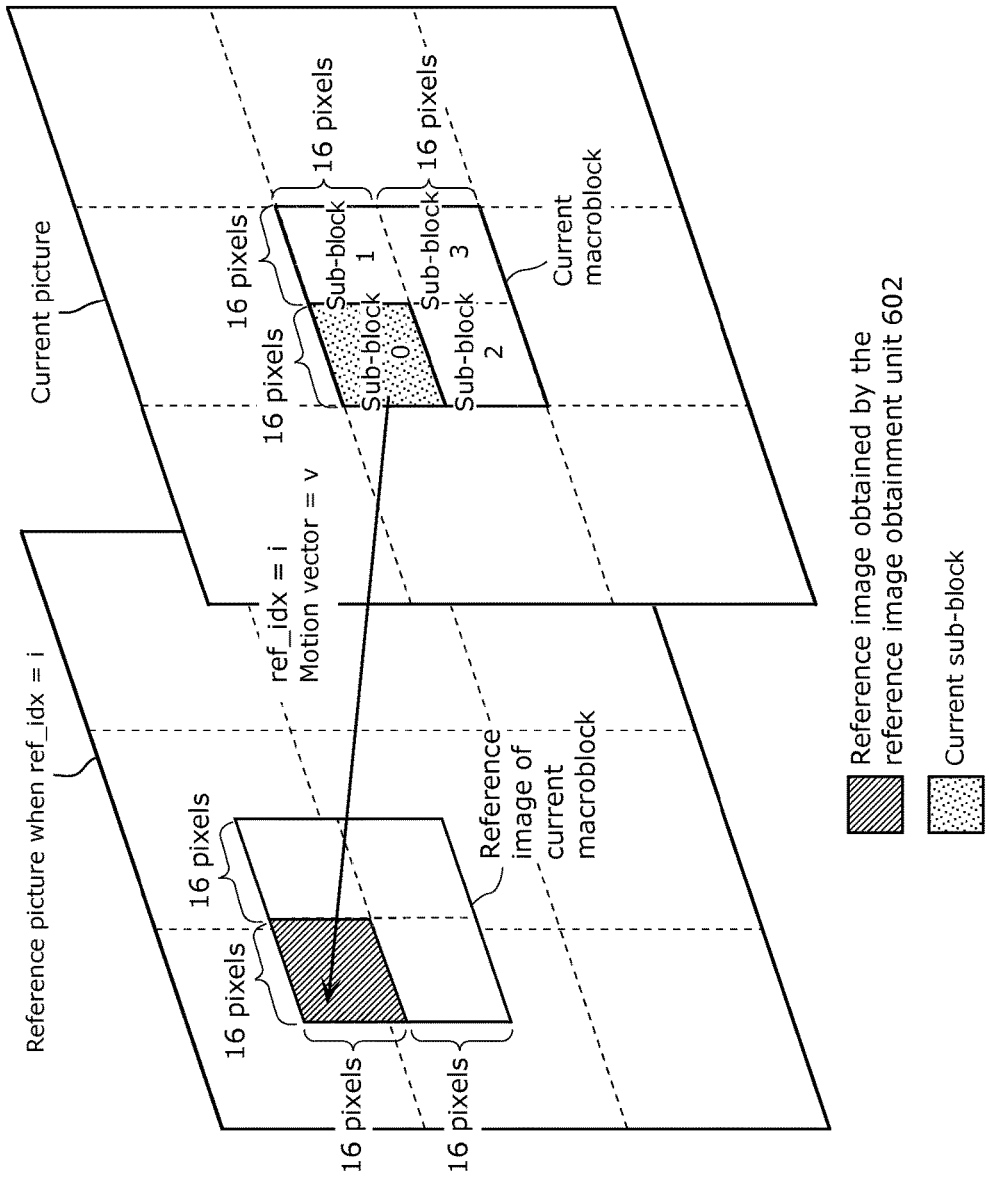
FIG. 14 is a diagram showing an operation to obtain a reference image in motion compensation performed on a sub-block 0 in Embodiment 1 according to the present invention.

FIG. 14 is a diagram showing the reference image obtained corresponding to the sub-block 0.

Here, the motion vector of the sub-block 0 is v and the reference index of the sub-block 0 is i. Therefore, as shown in FIG. 14, the reference image obtained by the reference image obtainment unit 602 for the sub-block 0 is a 16-by-16-pixel block located at the upper left of a 32-by-32-pixel block to be referenced by the original motion-compensation unit block having the 32-by-32-pixel size. The reference image obtainment unit 602 obtains this 16-by-16-pixel block as the reference image from the frame memory 502. When the obtainment of the reference image is completed, the motion-compensation arithmetic unit 603 performs motion compensation on the sub-block 0 with reference to the reference image to generate a predicted image. When the motion vector indicates a location of a sub-pixel, the arithmetic operation of the motion compensation process is to perform a filtering process (an interpolation filtering process) on the obtained reference image to generate a predicted image. When the motion vector indicates a location of an integer pixel, the arithmetic operation of the motion compensation process is to use the obtained reference image as the predicted image without any change.

With that, the motion compensation process is completed for the sub-block 0.

Similarly, the reference image obtainment unit 602 obtains, from the frame memory 502, a reference image to be referenced in motion compensation performed on the sub-block 1.

Figure 15:
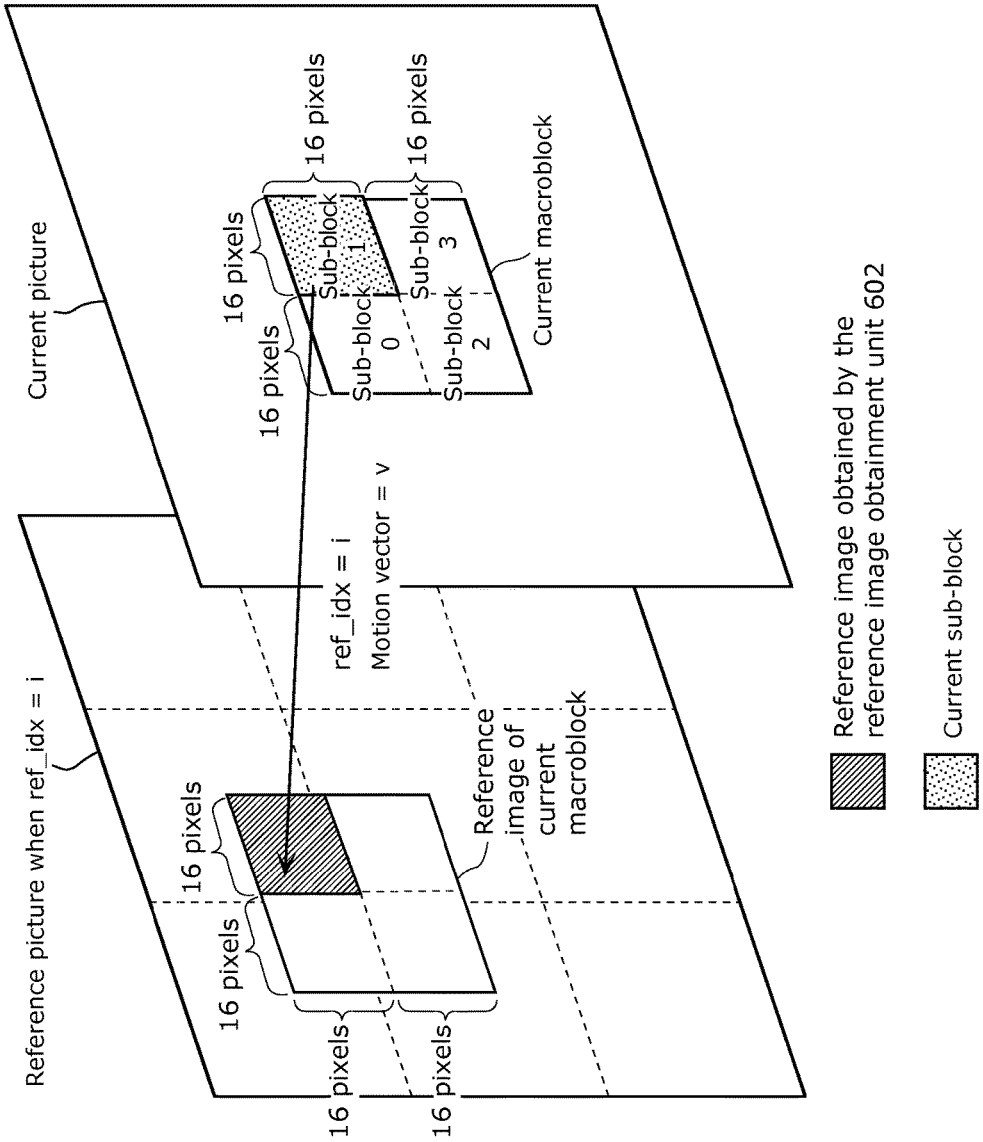
FIG. 15 is a diagram showing an operation to obtain a reference image in motion compensation performed on a sub-block 1 in Embodiment 1 according to the present invention.

FIG. 15 is a diagram showing the reference image obtained corresponding to the sub-block 1.

The motion vector of the sub-block 1 is v and the reference index of the sub-block 1 is i. Therefore, as shown in FIG. 15, the reference image obtained by the reference image obtainment unit 602 for the sub-block 1 is a 16-by-16-pixel block located at the upper right of the 32-by-32-pixel block to be referenced by the original motion-compensation unit block having the 32-by-32-pixel size. The reference image obtainment unit 602 obtains this 16-by-16-pixel block as the reference image from the frame memory 502. When the obtainment of the reference image is completed, the motion-compensation arithmetic unit 603 performs motion compensation on the sub-block 1 with reference to the reference image to generate a predicted image. With that, the motion compensation process is completed for the sub-block 1.

Similarly, the reference image obtainment unit 602 obtains, from the frame memory 502, a reference image to be referenced in motion compensation performed on the sub-block 2.

Figure 16:
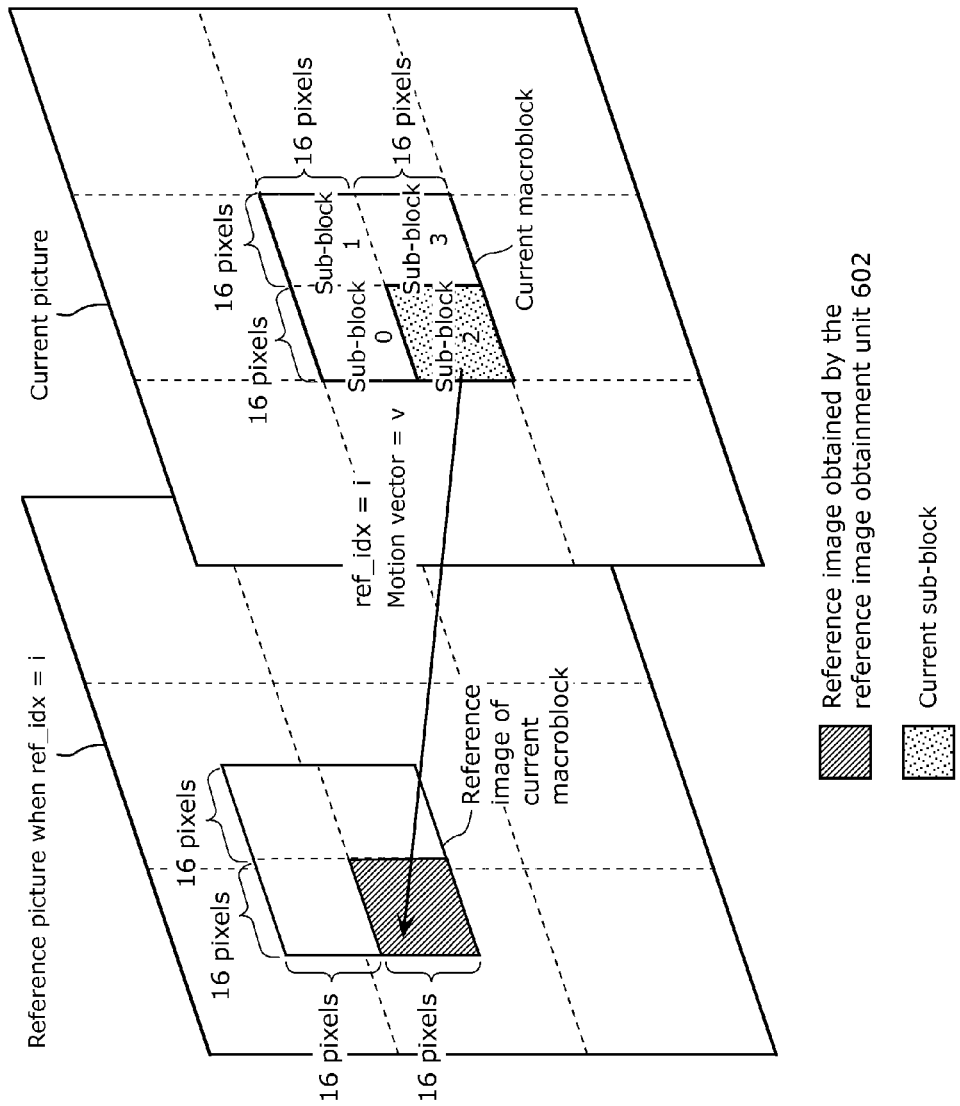
FIG. 16 is a diagram showing an operation to obtain a reference image in motion compensation performed on a sub-block 2 in Embodiment 1 according to the present invention.

FIG. 16 is a diagram showing the reference image obtained corresponding to the sub-block 2.

The motion vector of the sub-block 2 is v and the reference index of the sub-block 2 is i. Therefore, as shown in FIG. 16, the reference image obtained by the reference image obtainment unit 602 for the sub-block 2 is a 16-by-16-pixel block located at the lower left of the 32-by-32-pixel block to be referenced by the original motion-compensation unit block having the 32-by-32-pixel size. The reference image obtainment unit 602 obtains this 16-by-16-pixel block as the reference image from the frame memory 502. When the obtainment of the reference image is completed, the motion-compensation arithmetic unit 603 performs motion compensation on the sub-block 2 with reference to the reference image to generate a predicted image. With that, the motion compensation process is completed for the sub-block 2.

Similarly, the reference image obtainment unit 602 obtains, from the frame memory 502, a reference image to be referenced in motion compensation performed on the sub-block 3.

Figure 17:
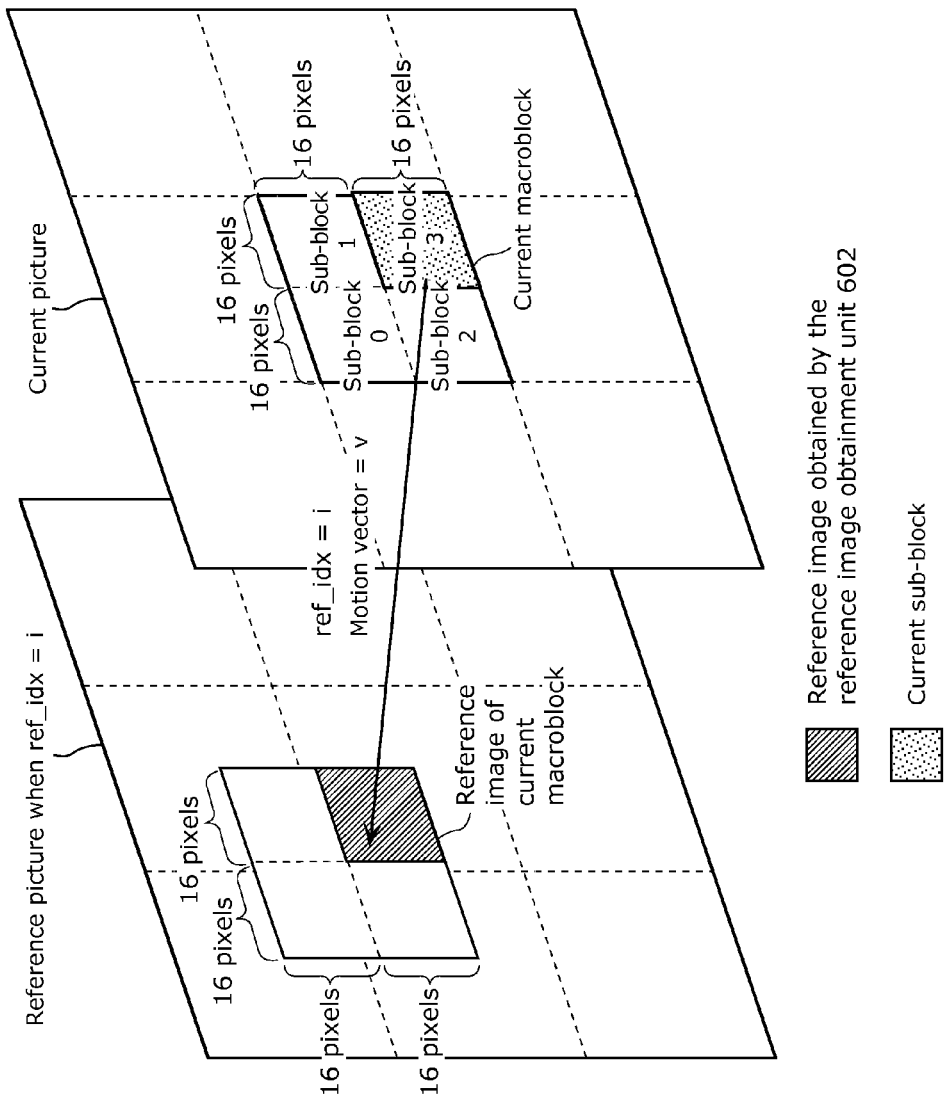
FIG. 17 is a diagram showing an operation to obtain a reference image in motion compensation performed on a sub-block 3 in Embodiment 1 according to the present invention.

FIG. 17 is a diagram showing the reference image obtained corresponding to the sub-block 3.

The motion vector of the sub-block 3 is v and the reference index of the sub-block 3 is i. Therefore, as shown in FIG. 17, the reference image obtained by the reference image obtainment unit 602 for the sub-block 1 is a 16-by-16-pixel block located at the lower right of the 32-by-32-pixel block to be referenced by the original motion-compensation unit block having the 32-by-32-pixel size. The reference image obtainment unit 602 obtains this 16-by-16-pixel block as the reference image from the frame memory 502. When the obtainment of the reference image is completed, the motion-compensation arithmetic unit 603 performs motion compensation on the sub-block 3 with reference to the reference image to generate a predicted image. With that, the motion compensation process is completed for the sub-block 3.

Here, the motion compensation process is completed for the sub-blocks 0 to 3. As a result, the operation for motion compensation is completed for the current macroblock having the motion vector v and the reference index i.

Figure 18:
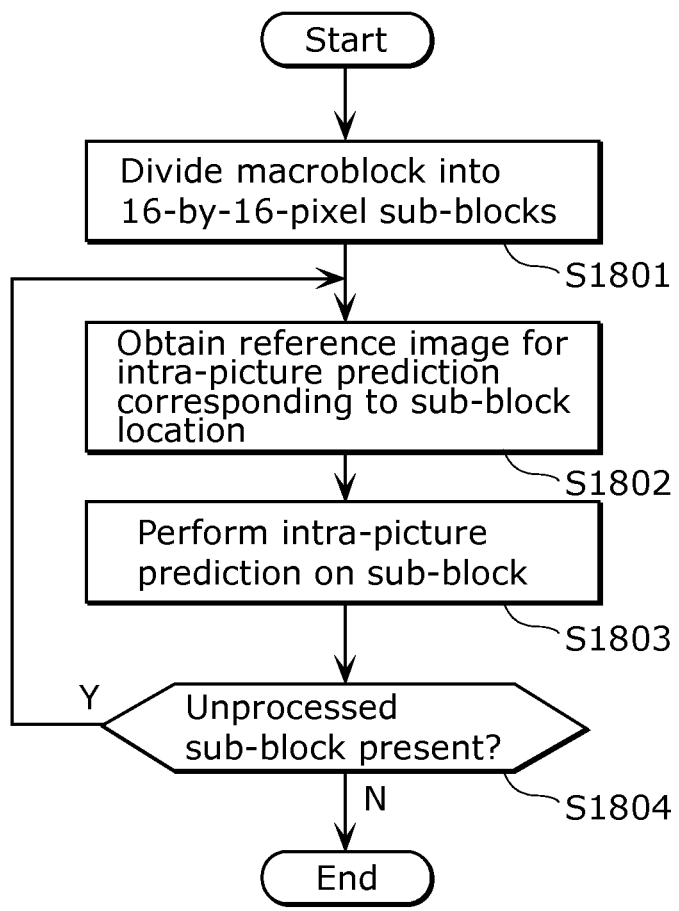
FIG. 18 is a flowchart showing an operation for intra-picture prediction in Embodiment 1 according to the present invention.

FIG. 18 is a flowchart showing an operation for intra-picture prediction performed by the intra-picture prediction unit 507 of the image decoding apparatus 500. It should be noted that this flowchart shows the process operation performed in step S1006 of FIG. 10.

Firstly, the intra-prediction block division unit 701 divides the macroblock into 16-by-16-pixel sub-blocks. To be more specific, the intra-prediction block division unit 701 calculates: location information indicating a location in the macroblock for each sub-block; and an intra-prediction mode for each sub-block (S1801). The location information regarding the sub-block is represented by coordinates of a pixel located at the upper left of the sub-block in the macroblock. It should be noted that, as in the case of the motion compensation process, the location information regarding the sub-block may be an index number indicating the location of the sub-block, instead of the coordinates. When intra prediction is performed per unit block having the size smaller than the sub-block, the intra-prediction mode of the intra-prediction unit block included in the sub-block is used as the intra-prediction mode of the sub-block. On the other hand, when the intra prediction is performed per unit block having the size larger than the sub-block, the intra-prediction mode of the sub-block is used as the intra-prediction mode of the intra-prediction unit block that includes the current sub-block.

After this, the reconstructed-image obtainment unit 702 calculates a location of a reconstructed image referenced in intra-picture prediction performed on the sub-block, from the location information regarding the sub-block and the intra-prediction mode of the sub-block, and then obtains the reconstructed image from the reconstructed-image memory 509 (S1802). The obtained reconstructed image is transmitted to the intra-prediction arithmetic unit 703. After this, using the received reconstructed image, the intra-prediction arithmetic unit 703 intra-picture prediction on the sub-block and outputs a predicted image (S1803). With that, the intra-prediction process is completed for one sub-block. Next, the intra-picture prediction unit 507 determines whether or not the macroblock includes a sub-block that has yet to be processed (S1804). When an unprocessed sub-block is present (Y in S1804), a reconstructed image of the unprocessed sub-block is obtained (S1802) and then intra-picture prediction is performed (S1803). When no unprocessed sub-block is present and intra-picture prediction is thus completed for all the sub-blocks (N in S1804), this means that the intra-picture prediction process is completed for one macroblock.

Next, the operation for intra-picture prediction described thus far is explained using a specific example.

Figure 19A:
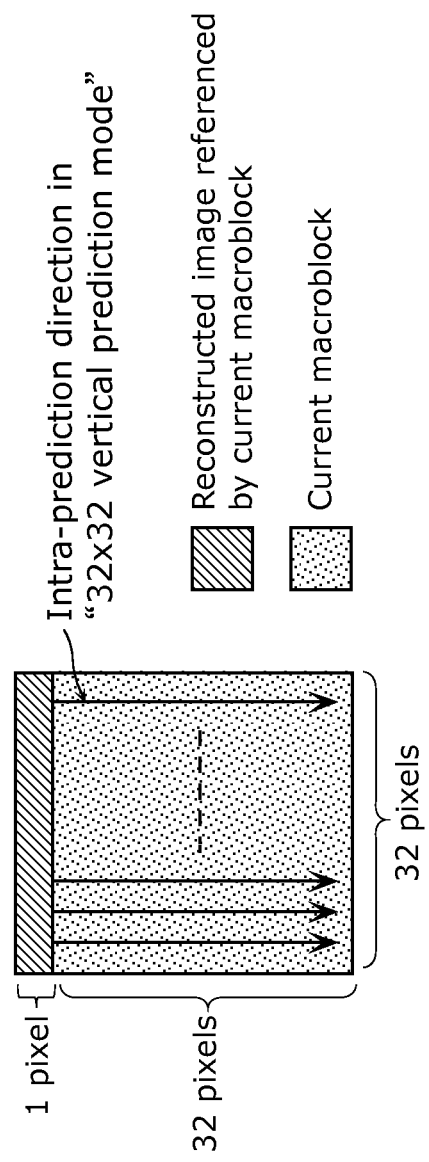
FIG. 19A is a diagram showing an operation for typical intra-picture prediction performed on a 32-by-32-pixel macroblock.

FIG. 19A is a diagram showing an operation for typical intra-picture prediction performed in the case where the size of the intra-prediction unit block is 32 by 32 pixels. In this example as shown in FIG. 19A, the intra-prediction mode is a "32×32 vertical prediction mode". Therefore, intra-picture prediction is performed, using a reconstructed-image block (the reconstructed image) that has the size of 32 by 1 pixels and is located adjacent to and immediately above the current macroblock. To be more specific, a predicted image is generated in this intra-picture prediction by copying, in the vertically downward direction, pixel values of the 32-by-1-pixel block located adjacent to and immediately above the current macroblock.

In Embodiment 1, the intra-prediction block division unit 701 firstly divides the current macroblock into the 16-by-16-pixel sub-blocks.

Figure 19B:
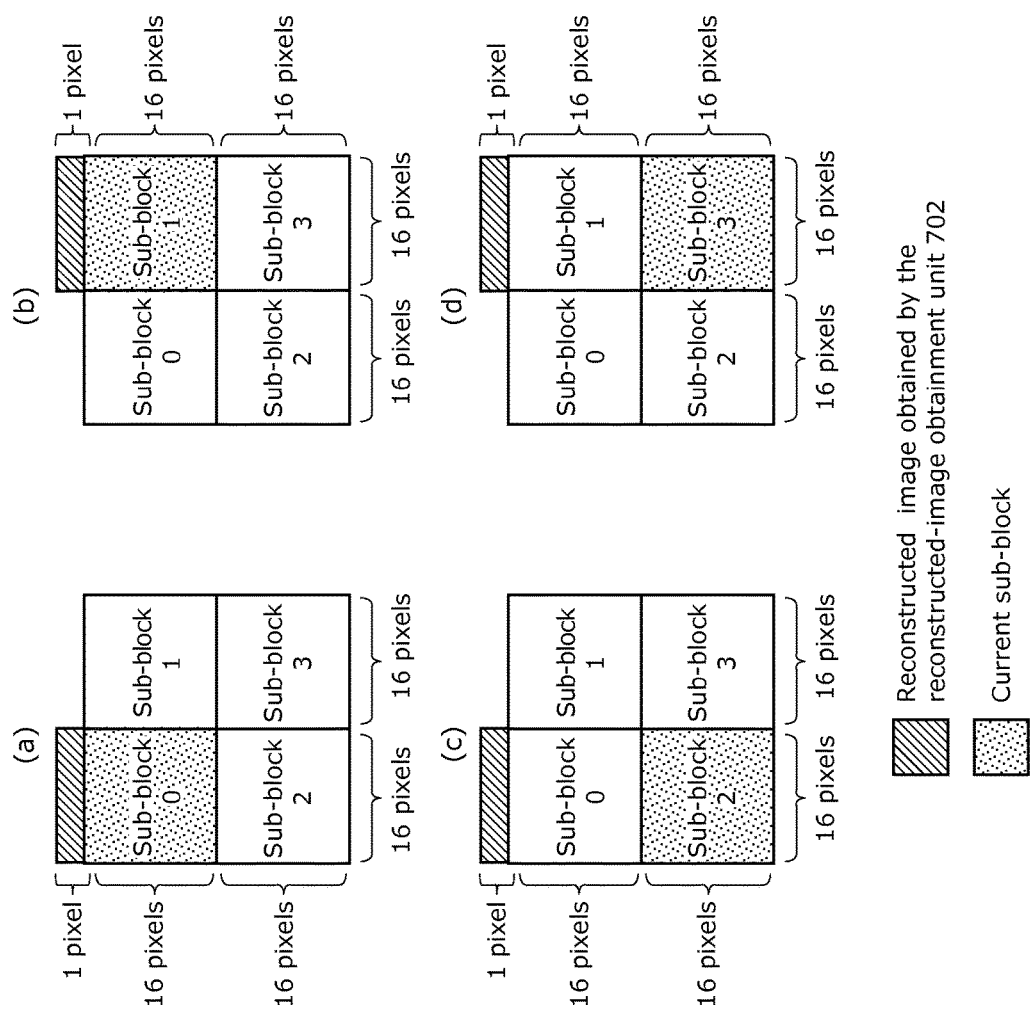
FIG. 19B is a diagram showing an operation to obtain a reconstructed image for a sub-block in intra-picture prediction in Embodiment 1 according to the present invention.

FIG. 19B is a diagram showing reconstructed images obtained corresponding to the sub-blocks.

The intra-prediction unit block is larger than the sub-block and has the size of 32 by 32 pixels equal to the size of the current macroblock. Therefore, each of the intra-prediction modes of the sub-blocks is used as the intra-prediction mode of the intra-prediction unit block having the 32-by-32-pixel size (i.e., the current macroblock). More specifically, each of the intra-prediction modes of the sub-blocks is "32×32 vertical prediction mode". Here, note that: a block located at the upper left of the macroblock is referred to as the sub-block 0; a block located at the upper right of the macroblock is referred to as the sub-block 1; a block located at the lower left of the macroblock is referred to as the sub-block 2; and a block located at the lower right of the macroblock is referred to as the sub-block 3. Hereafter, the process is performed on the sub-block 0, the sub-block 1, the sub-block 2, and the sub-block 3 in this order. In other words, the intra-prediction division unit 701 divides the current macroblock into the four sub-blocks 0 to 3, assigns the intra-prediction mode (such as the 32×32 vertical prediction mode) of the intra-prediction unit block (i.e., the current macroblock) to each of the four sub-blocks 0 to 3.

Next, based on the location of the sub-block 0 and the intra-prediction mode of the sub-block 0, the reconstructed-image obtainment unit 702 obtains the reconstructed image to be referenced by the sub-block 0 from the reconstructed-image memory 509. The location and size of the reconstructed image to be obtained are determined by the following procedure.

Firstly, the reconstructed-image obtainment unit 702 determines whether the intra-prediction mode assigned to the sub-block 0 is capable of processing a block having the size exceeding the size of the sub-block 0. When the intra-prediction mode is capable of processing a block having the size that does not exceed the size of the sub-block 0, that is, when the size of the intra-prediction unit block is smaller than or equal to 16 by 16 pixels, the reconstructed-image obtainment unit 702 can obtain the reconstructed image by the same procedure as used by an H.264-compliant image decoding apparatus. However, in the present example, the intra-prediction mode of the 16-by-16-pixel sub-block 0 is the "32×32 vertical prediction mode". In other words, this intra-prediction mode is capable of processing a block having the size exceeding the sub-block 0. In this case, the intra-prediction block division unit 701 calculates the location and size of a reconstructed image to be referenced in intra-picture prediction performed on the sub-block 0 included in the intra-prediction unit block (the current macroblock) and thus obtains the reconstructed image. Since the intra-prediction mode is the "32×32 vertical prediction mode" in the present example, the obtained reconstructed image corresponds to a 16-by-1-pixel block located adjacent to and immediately above the sub-block 0 as shown in (a) of FIG. 19B.

By the above procedure, after determining the location and size of the reconstructed image to be obtained, the reconstructed-image obtainment unit 702 obtains, from the reconstructed-image memory 509, the 16-by-1-pixel block located adjacent to and immediately above the sub-block 0 as the reconstructed image corresponding to the sub-block 0. When the obtainment of the reconstructed image is completed, the intra-prediction arithmetic unit 703 performs intra-picture prediction on the sub-block 0 with reference to the obtained reconstructed image to generate a predicted image. Since the intra-prediction mode is the "32×32 vertical prediction mode", the arithmetic operation of the intra-picture prediction process is to generate a predicted image by copying, in the vertically downward direction, pixel values of the obtained 16-by-1-pixel block (the reconstructed image). With that, the intra-picture prediction process is completed for the sub-block 0.

Similarly, the reconstructed-image obtainment unit 702 next obtains a reconstructed image to be referenced in intra-picture prediction performed on the sub-block 1 from the reconstructed-image memory 509. Since the intra-prediction mode of the sub-block 1 is the "32×32 vertical prediction mode", the reconstructed-image obtainment unit 702 obtains a 16-by-1-pixel block located adjacent to and immediately above the sub-block 1 as the reconstructed image corresponding to the sub-block 1, as shown in (b) of FIG. 19B. When the obtainment of the reconstructed image is completed, the intra-prediction arithmetic unit 703 performs intra-picture prediction on the sub-block 1 with reference to the obtained reconstructed image to generate a predicted image. Since the intra-prediction mode is the "32×32 vertical prediction mode", the arithmetic operation of the intra-picture prediction process is to generate a predicted image by copying, in the vertically downward direction, pixel values of the obtained 16-by-1-pixel block (the reconstructed image). With that, the intra-picture prediction process is completed for the sub-block 1.

Similarly, the reconstructed-image obtainment unit 702 next obtains a reconstructed image to be referenced in intra-picture prediction performed on the sub-block 2 from the reconstructed-image memory 509. Since the intra-prediction mode of the sub-block 2 is the "32×32 vertical prediction mode", the reconstructed-image obtainment unit 702 obtains the 16-by-1-pixel block located adjacent to and immediately above the sub-block 0 as the reconstructed image corresponding to the sub-block 2, as shown in (c) of FIG. 19B. When the obtainment of the reconstructed image is completed, the intra-prediction arithmetic unit 703 performs intra-picture prediction on the sub-block 2 with reference to the obtained reconstructed image to generate a predicted image. Since the intra-prediction mode is the "32×32 vertical prediction mode", the arithmetic operation of the intra-picture prediction process is to generate a predicted image by copying, in the vertically downward direction, pixel values of the obtained 16-by-1-pixel block (the reconstructed image). With that, the intra-picture prediction process is completed for the sub-block 2.

Similarly, the reconstructed-image obtainment unit 702 next obtains a reconstructed image to be referenced in intra-picture prediction performed on the sub-block 3 from the reconstructed-image memory 509. Since the intra-prediction mode of the sub-block 3 is the "32×32 vertical prediction mode", the reconstructed-image obtainment unit 702 obtains the 16-by-1-pixel block located adjacent to and immediately above the sub-block 1 as the reconstructed image corresponding to the sub-block 3, as shown in (d) of FIG. 19B. When the obtainment of the reconstructed image is completed, the intra-prediction arithmetic unit 703 performs intra-picture prediction on the sub-block 3 with reference to the obtained reconstructed image to generate a predicted image. Since the intra-prediction mode is the "32×32 vertical prediction mode", the arithmetic operation of the intra-picture prediction process is to generate a predicted image by copying, in the vertically downward direction, pixel values of the obtained 16-by-1-pixel block (the reconstructed image). With that, the intra-picture prediction process is completed for the sub-block 3.

Here, the intra-picture prediction process is completed for the sub-blocks 0 to 3. As a result, the operation for intra-picture prediction is completed for the current macroblock where the intra-prediction mode is the "32×32 vertical prediction mode".

This is the description of the operation performed by the image decoding apparatus 500.

[Advantageous effect]

In Embodiment 1, the motion compensation unit 506 includes the motion-compensation block division unit 601 as described. With this, even when the size of the macroblock is large and exceeds the size of 16 by 16 pixels, the motion compensation unit 506 can perform motion compensation with a circuit having the size enough to perform motion compensation on a 16-by-16-pixel block. Moreover, in Embodiment 1, the intra-picture prediction unit 507 includes the intra-prediction block division unit 701. With this, even when the size of the macroblock is large and exceeds the size of 16 by 16 pixels, the intra-picture prediction unit 507 can perform intra-picture prediction with a circuit having the size enough to perform intra-picture prediction on a 16-by-16-pixel block. In this way, with the circuit equal in size to a circuit of an image decoding apparatus that decodes a coded video sequence where the size of a macroblock is 16 by 16 pixels, the image decoding apparatus 500 in Embodiment 1 can decode a coded video sequence having been coded per macroblock having the size larger than 16 by 16 pixels.

Embodiment 1 has described the case where the current coded video sequence to be decoded has been coded according to the variable-length coding method. However, the coding method may be different. The current coded video sequence may have been coded according to any other coding method, such as Huffman coding, run-length coding, or arithmetic coding.

Moreover, each of the configurations of the processing units may be implemented, in whole or part, by a circuit configured with dedicated hardware, or may be implemented by a program on a processor.

Furthermore, each of the frame memory 502 and the reconstructed-image memory 509 is a memory. However, each of these memories may be configured with a different memory element such as a flip-flop, as long as the memory element can store data. Alternatively, each of these memories may be configured to use a part of a memory area of a processor or a part of a cache memory.

Moreover, in Embodiment 1, the coded video sequence is the same as defined according to the H.264 standard, except that the size of the macroblock is 32 by 32 pixels and that motion compensation and intra-picture prediction are performed per unit block having the size of 32 by 32 pixels at the maximum. However, the coded video sequence may be based on any other image coding standard, such as the MPEG2 standard, the MPEG4 standard, or the VC-1 standard.

Furthermore, Embodiment 1 has described the case where the size of the macroblock is 32 by 32 pixels and motion compensation and intra-picture prediction are performed per unit block having the size of 32 by 32 pixels at the maximum. However, these sizes may be larger than 32 by 32 pixels. Even when the size of the macroblock is larger than 32 by 32 pixels, each of the motion-compensation block division unit 601 and the intra-prediction block division unit 701 divides the macroblock into 16-by-16-pixel sub-blocks before performing the corresponding process. Hence, the image decoding apparatus 500 in Embodiment 1 can decode the coded video sequence, regardless of the size of the macroblock.

[Embodiment 2]

[Overview]

An overview of an image decoding apparatus in Embodiment 2 is next described. The image decoding apparatus 500 in Embodiment 1 decodes the coded video sequence in which the size of the macroblock is fixed. In Embodiment 2, since the size of the macroblock is determined, a coded video sequence in which the size of the macroblock is variable can be decoded. Even when the size of the macroblock is variable, the image decoding apparatus in Embodiment 2 can perform motion compensation and intra-picture prediction with a circuit having the size enough to perform motion compensation and intra-picture prediction on a 16-by-16-pixel block.

This is the overview of the image decoding apparatus in Embodiment 2.

[Configuration]

Next, a configuration of the image decoding apparatus in Embodiment 2 is described.

Figure 20:
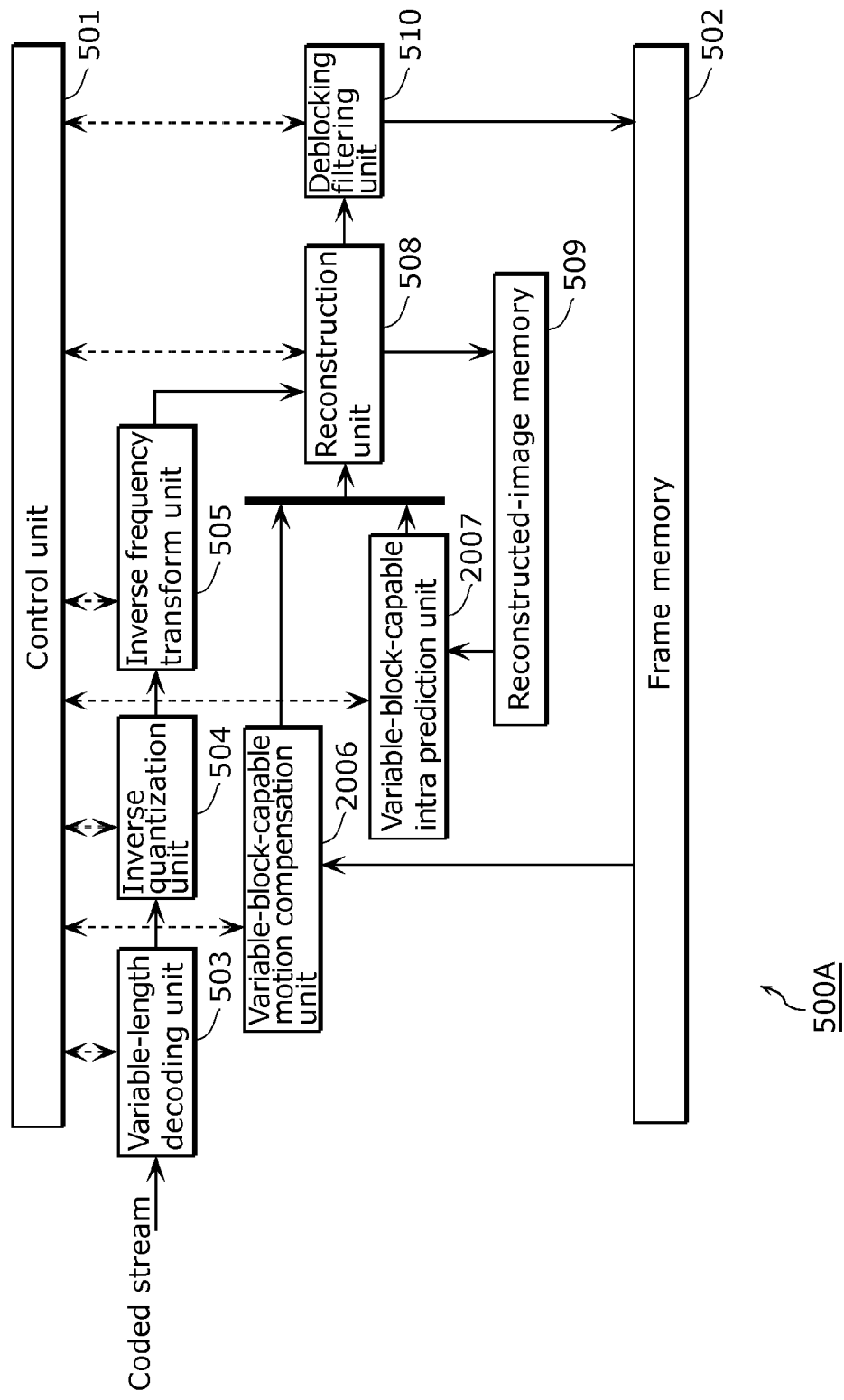
FIG. 20 is a diagram showing a configuration of an image decoding apparatus in Embodiment 2 according to the present invention.

FIG. 20 is a diagram showing the configuration of the image decoding apparatus in Embodiment 2.

An image decoding apparatus 500A in Embodiment 2 includes: a variable-block-capable motion compensation unit 2006 in place of the motion compensation unit 506 described in Embodiment 1; and a variable-block-capable intra prediction unit 2007 in place of the intra-picture prediction unit 507 described in Embodiment 1. The other components in the image decoding apparatus 500A are the same as those shown in FIG. 5 in Embodiment 1. Thus, these components are assigned the same reference signs as used in FIG. 5, and the explanations of these components are omitted here.

Figure 21:
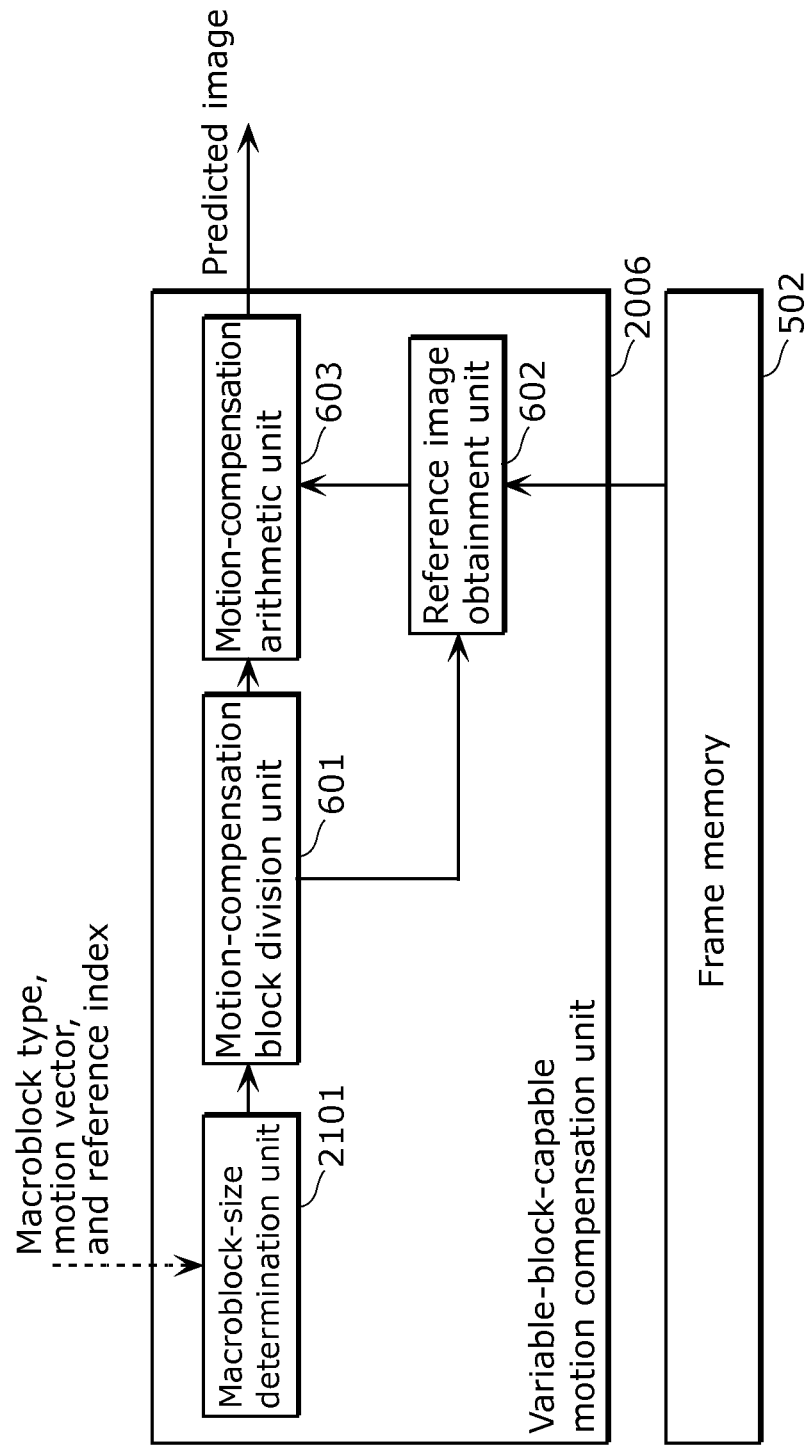
FIG. 21 is a diagram showing a configuration of a variable-block-capable motion compensation unit in Embodiment 2 according to the present invention.

FIG. 21 is a diagram showing a configuration of the variable-block-capable motion compensation unit 2006.

The variable-block-capable motion compensation unit 2006 includes a macroblock-size determination unit 2101, in addition to the components of the motion compensation unit 506 described in Embodiment 1. The other components in the variable-block-capable motion compensation unit 2006 are the same as the components of the motion compensation unit 506 shown in FIG. 6. Thus, these components are assigned the same reference signs as used in FIG. 6, and the explanations of these components are omitted here.

The macroblock-size determination unit 2101 receives a macroblock type, a motion vector, and a reference index from the control unit 501 and determines whether or not the size of a current macroblock to be decoded is larger than 16 by 16 pixels. When the size of the current macroblock is larger than 16 by 16 pixels, the macroblock-size determination unit 2101 instructs the motion-compensation block division unit 601 to divide the macroblock. At this time, the macroblock-size determination unit 2101 outputs, to the motion-compensation block division unit 601, the macroblock type, the motion vector, and the reference index received from the control unit 501, together with the instruction for the macroblock division. Otherwise, the macroblock-size determination unit 2101 does not instruct for the macroblock division and, as a result, the motion-compensation arithmetic unit 603 performs motion compensation on the undivided current macroblock having the size smaller than or equal to 16 by 16 pixels.

Figure 22:
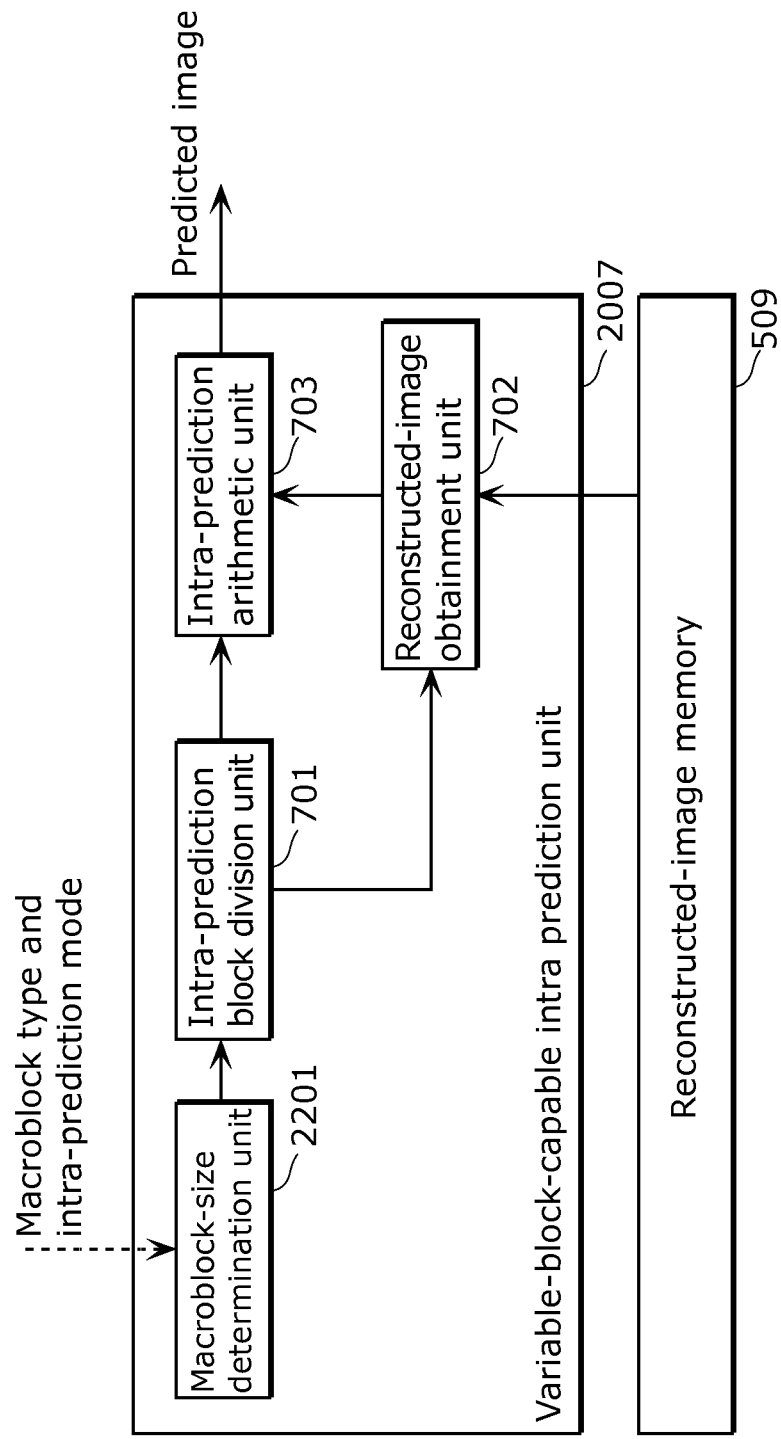
FIG. 22 is a diagram showing a configuration of a variable-block-capable intra prediction unit in Embodiment 2 according to the present invention.

FIG. 22 is a diagram showing a configuration of the variable-block-capable intra prediction unit 2007.

The variable-block-capable intra prediction unit 2007 includes a macroblock-size determination unit 2201, in addition to the components of the intra-picture prediction unit 507 described in Embodiment 1. The other components in the variable-block-capable intra prediction unit 2007 are the same as the components of the intra-picture prediction unit 507 shown in FIG. 7. Thus, these components are assigned the same reference signs as used in FIG. 7, and the explanations of these components are omitted here.

The macroblock-size determination unit 2201 receives a macroblock type and an intra-prediction mode from the control unit 501 and determines whether or not the size of a current macroblock to be decoded is larger than 16 by 16 pixels. When the size of the current macroblock is larger than 16 by 16 pixels, the macroblock-size determination unit 2201 instructs the intra-prediction block division unit 701 to divide the macroblock. At this time, the macroblock-size determination unit 2201 outputs, to the intra-prediction block division unit 701, the macroblock type and the intra-prediction mode received from the control unit 501, together with the instruction for the macroblock division. Otherwise, the macroblock-size determination unit 2201 does not instruct for the macroblock division and, as a result, the intra-prediction arithmetic unit 703 performs intra-picture prediction on the undivided current macroblock having the size smaller than or equal to 16 by 16 pixels.

This is the configuration of the image decoding apparatus.

[Operation]

Next, an operation performed by the image decoding apparatus 500A shown in FIG. 20 is described.

Figure 23:
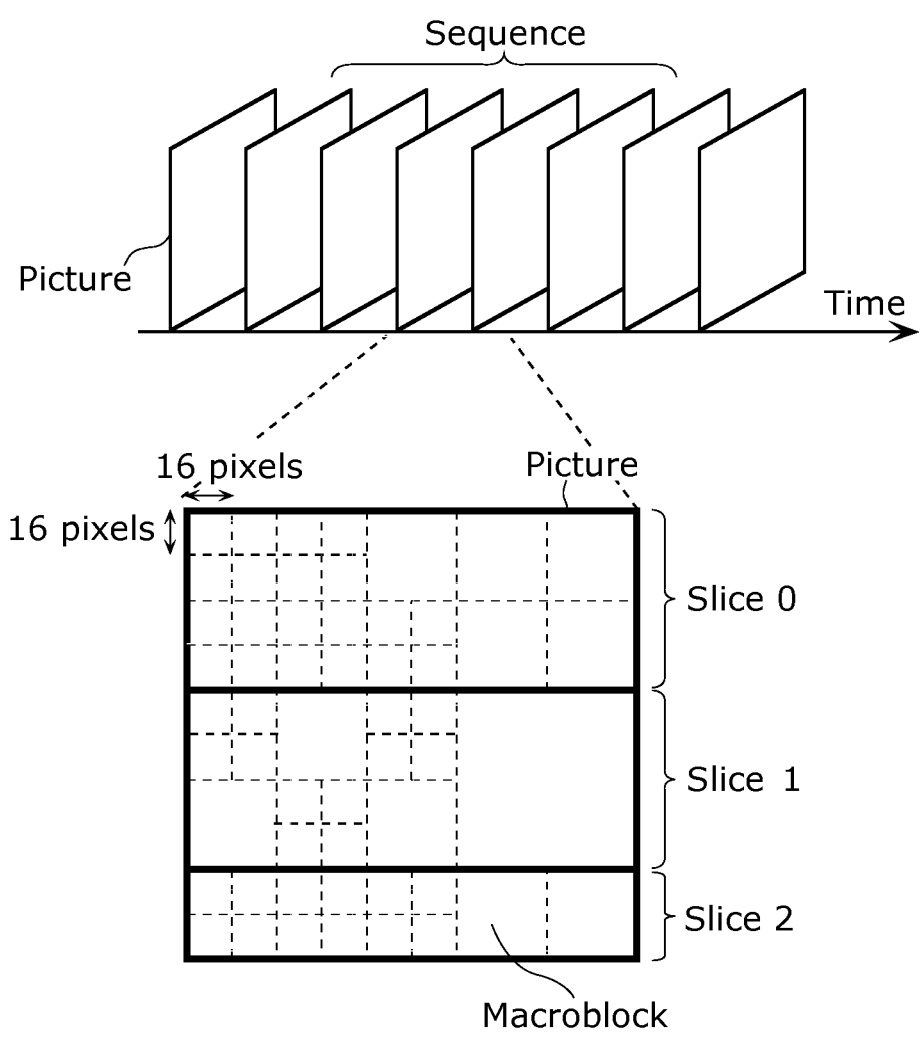
FIG. 23 is a diagram showing a structure of a coded video sequence to be decoded by the image decoding apparatus in Embodiment 2 according to the present invention.

FIG. 23 is a diagram showing a structure of a picture included in a coded video sequence to be decoded by the image decoding apparatus 500A in Embodiment 2.

The coded video sequence to be decoded by the image decoding apparatus 500A in Embodiment 2 is different from the coded video sequence described in Embodiment 1 in that the size of the macroblock is variable instead of being fixed. As described in Non Patent Literature 3 mentioned above, the size of the macroblock is from 16-by-16 pixels to 128-by-128 pixels at the maximum, and is variable in a picture or a slice. In accordance with this, motion compensation and intra-picture prediction are performed per unit size, such as the size of the macroblock described in Non Patent Literature 3 mentioned above and the size of an internal block included in the macroblock, in addition to the size defined according to the H.264 standard. To be more specific, motion compensation and intra-picture prediction are performed per unit size having 128 by 128 pixels at the maximum. On the other hand, each of the sizes of unit blocks of inverse quantization (quantization in the case of coding) and inverse frequency transform (frequency transform in the case of coding) is 16 by 16 pixels at the maximum as with the H.264 standard.

The structure of the coded stream is the same as the structure of the coded stream described in Embodiment 1 as shown in FIG. 8B. Thus, an operation performed by the image decoding apparatus 500A to decode one sequence of the coded stream is the same as described in Embodiment 1 as shown in FIG. 9 and, therefore, the explanation is omitted here. Similarly, a decoding operation performed by the image decoding apparatus 500A on one macroblock is the same as described in Embodiment 1 as shown in FIG. 10 and, therefore, the explanation is also omitted here. However, the processes performed for motion compensation (S1005) and intra-picture prediction (S1006) are different from those described in Embodiment 1 and thus explained in detail as follows.

Figure 24:
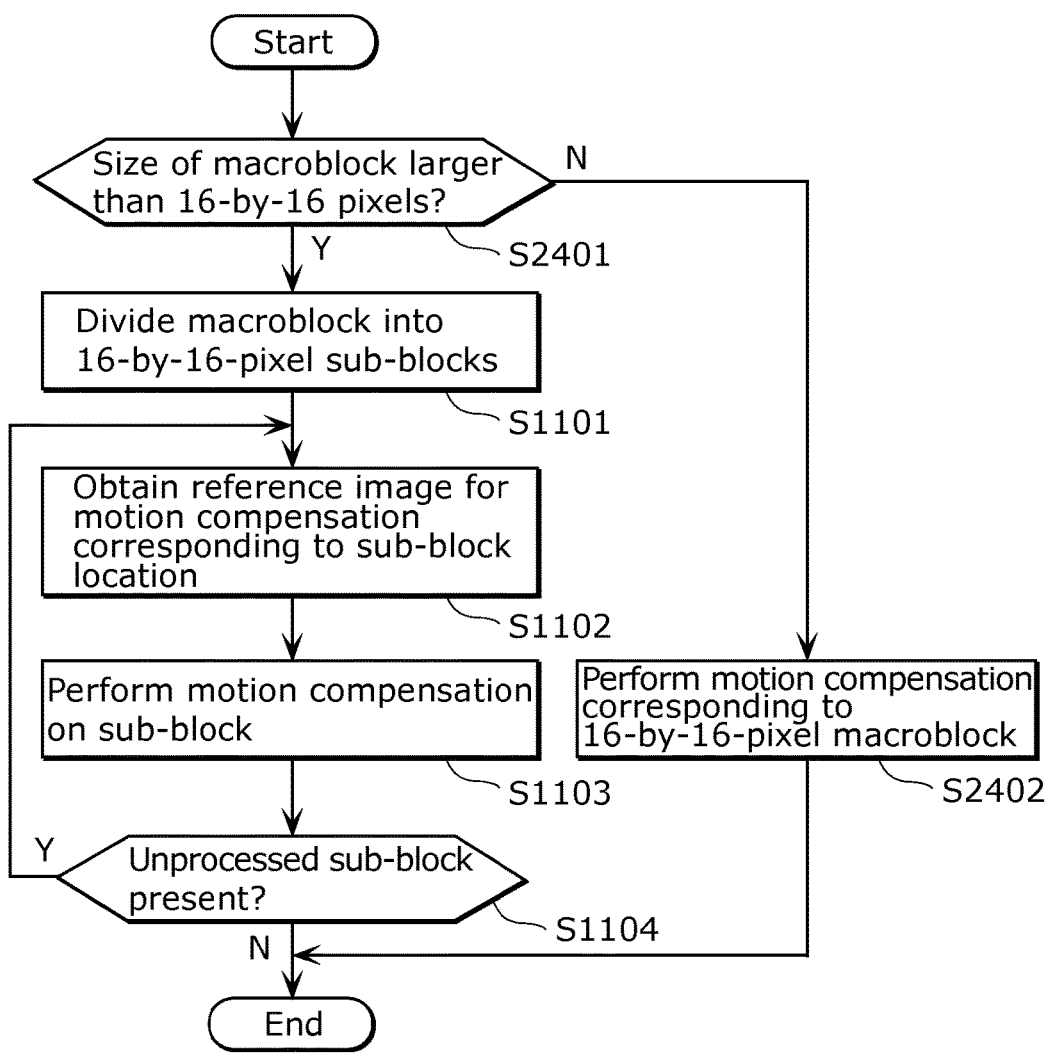
FIG. 24 is a flowchart showing an operation for motion compensation in Embodiment 2 according to the present invention.

FIG. 24 is a flowchart showing an operation for motion compensation performed by the variable-block-capable motion compensation unit 2006 of the image decoding apparatus 500A. It should be noted that this flowchart shows the process operation performed in step S1005 of FIG. 10.

Firstly, the macroblock-size determination unit 2101 determines whether or not the size of the macroblock is larger than 16 by 16 pixels (S2401). When it is determined that the macroblock is larger than 16 by 16 pixels (Y in S2401), the variable-block-capable motion compensation unit 2006 performs the same processes as in the flowchart shown in FIG. 11 in Embodiment 1. Therefore, these processes are assigned the same numbers (S1101 to S1104) as used in FIG. 11 and the explanations of these processes are omitted here. When it is determined that the macroblock is smaller than or equal to 16 by 16 pixels (N in S2401), the variable-block-capable motion compensation unit 2006 performs motion compensation on the macroblock in the same procedure performed by an H.264-compliant image decoding apparatus (S2402). With that, the motion compensation process is completed for one macroblock.

Figure 25:
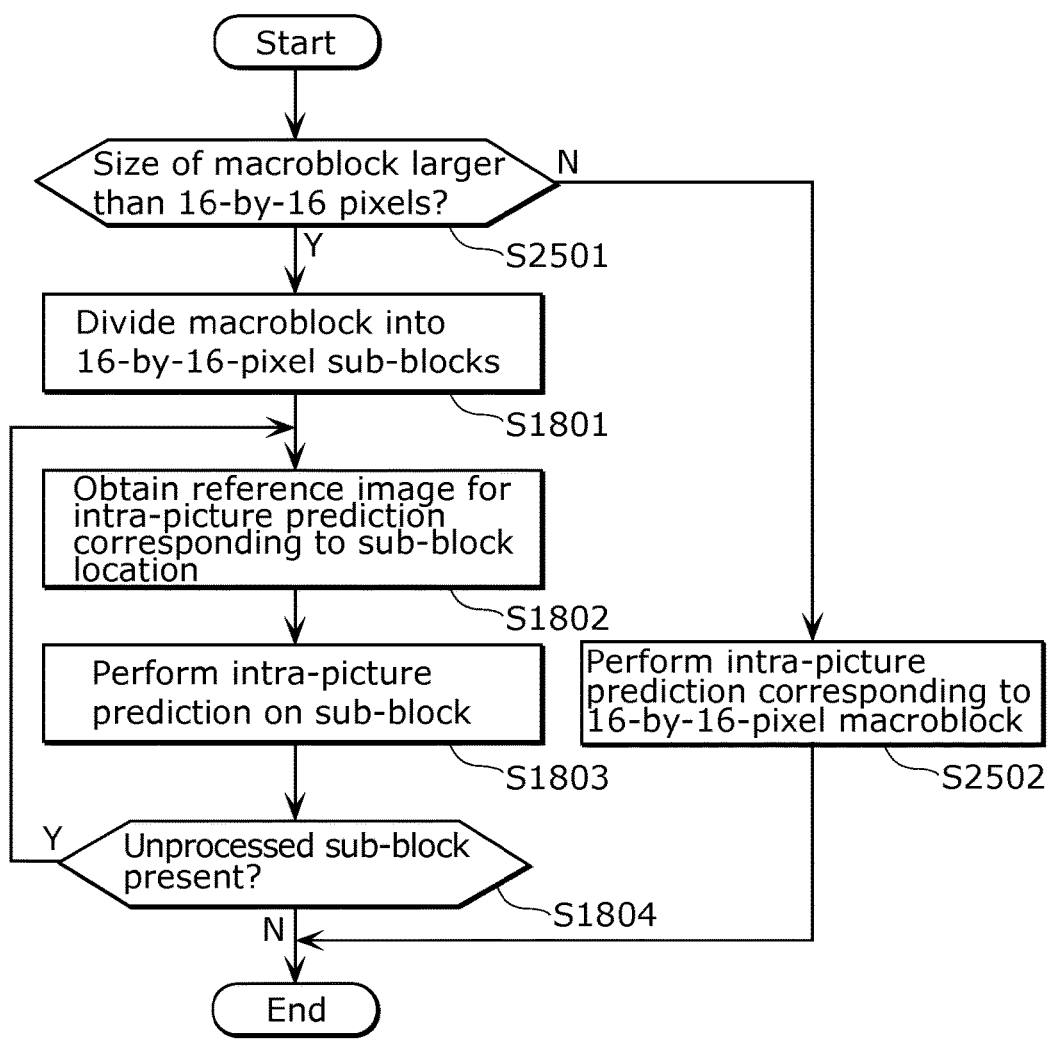
FIG. 25 is a flowchart showing an operation for intra-picture prediction in Embodiment 2 according to the present invention.

FIG. 25 is a flowchart showing an operation for intra-picture prediction performed by the variable-block-capable intra prediction unit 2007 of the image decoding apparatus 500A. It should be noted that this flowchart shows the process operation performed in step S1006 of FIG. 10.

Firstly, the macroblock-size determination unit 2201 determines whether or not the size of the macroblock is larger than 16 by 16 pixels (S2501). When it is determined that the macroblock is larger than 16 by 16 pixels (Y in S2501), the variable-block-capable intra prediction unit 2007 performs the same processes as in the flowchart shown in FIG. 18 in Embodiment 1. Therefore, these processes are assigned the same numbers (S1801 to S1804) as used in FIG. 18 and the explanations of these processes are omitted here. When it is determined that the macroblock is smaller than or equal to 16 by 16 pixels (N in S2501), the variable-block-capable intra prediction unit 2007 performs intra-picture prediction on the macroblock in the same procedure performed by an H.264-compliant image decoding apparatus (S2502). With that, the intra-picture prediction process is completed for one macroblock.

This is the description of the operation performed by the image decoding apparatus 500A.

[Advantageous Effect]

In Embodiment 2, the variable-block-capable motion compensation unit 2006 includes the macroblock-size determination unit 2101 as described. With this, even when the size of the macroblock is variable, macroblocks having different sizes can be processed by a single circuit capable of performing motion compensation on a 16-by-16-pixel block. Thus, it is not necessary to implement a circuit (a motion compensation unit) for each of the different sizes of the macroblocks in order to perform motion compensation, thereby suppressing an increase in the circuit size of the motion compensation unit. Moreover, when the motion-compensation arithmetic unit 603 of the variable-block-capable motion compensation unit 2006 in Embodiment 2 is capable of arithmetic operations for motion compensation according to different image coding methods and the size of the macroblock is different for each of the image coding methods, these macroblocks can be decoded. For example, a single circuit (a motion compensation unit) can be compliant with the H.264 standard where the size of the macroblock is 16 by 16 pixels and with the next-generation coding methods proposed by Non Patent Literatures 3 to 5 where the size of the macroblock is larger than 16 by 16 pixels.

Similarly, in Embodiment 2, the variable-block-capable intra prediction unit 2007 includes the macroblock-size determination unit 2201 as described. With this, even when the size of the macroblock is variable, macroblocks having different sizes can be processed by a single circuit capable of performing intra-picture prediction on a 16-by-16-pixel block. Thus, it is not necessary to implement a circuit (an intra-picture prediction unit) for each of the different sizes of the macroblocks in order to perform intra-picture prediction, thereby suppressing an increase in the circuit size of the intra-picture prediction unit. Moreover, when the intra-prediction arithmetic unit 703 of the variable-block-capable intra prediction unit 2007 in Embodiment 2 is capable of arithmetic operations for intra-picture prediction according to different image coding methods and the size of the macroblock is different for each of the image coding methods, these macroblocks can be decoded. For example, a single circuit (an intra-picture prediction unit) can be compliant with the H.264 standard where the size of the macroblock is 16 by 16 pixels and with the next-generation coding methods proposed by Non Patent Literatures 3 to 5 where the size of the macroblock is larger than 16 by 16 pixels.

Embodiment 2 has described the case where the current coded video sequence to be decoded has been coded according to the variable-length coding method. However, the coding method may be different. The current coded video sequence may have been coded according to any other coding method, such as Huffman coding, run-length coding, or arithmetic coding.

Moreover, each of the configurations of the processing units may be implemented, in whole or part, by a circuit configured with dedicated hardware, or may be implemented by a program on a processor.

Furthermore, each of the frame memory 502 and the reconstructed-image memory 509 is a memory. However, each of these memories may be configured with a different memory element such as a flip-flop, as long as the memory element can store data. Alternatively, each of these memories may be configured to use a part of a memory area of a processor or a part of a cache memory.

Moreover, in Embodiment 2, the coded video sequence is the same as defined according to the H.264 standard, except that the size of the macroblock is 128 by 128 pixels at the maximum and that motion compensation and intra-picture prediction are performed per unit block having the size of 128 by 128 pixels at the maximum. However, the coded video sequence may be based on any other image coding standard, such as the MPEG2 standard, the MPEG4 standard, or the VC-1 standard.

Furthermore, Embodiment 2 has described the case where the size of the macroblock is 128 by 128 pixels at the maximum and motion compensation and intra-picture prediction are performed per unit block having the size of 128 by 128 pixels at the maximum. However, these sizes may be larger than 128 by 128 pixels. Even when the size of the macroblock is larger than 128 by 128 pixels, each of the motion-compensation block division unit 601 and the intra-prediction block division unit 701 divides the macroblock into 16-by-16-pixel sub-blocks before performing the corresponding process. Hence, the image decoding apparatus 500A in Embodiment 2 can decode the coded video sequence, regardless of the size of the macroblock.

[Embodiment 3]

[Overview]

An overview of an image decoding apparatus in Embodiment 3 is described. Each of the image decoding apparatuses in Embodiments 1 and 2 executes the processes one by one to decode the macroblocks included in the coded video sequence. In Embodiment 3, however, a coded video sequence is decoded by processing units that implement pipeline processing on a 16-by-16-pixel block basis. For this reason, Embodiment 3 includes a control unit that performs a macroblock-size determination process, a macroblock division process, and a pipeline control process, in place of the control unit 501 described in each of Embodiments 1 and 2.

With this, since the processes can be performed in parallel on a sub-block basis, the image decoding apparatus can perform decoding at higher speed than the image decoding apparatuses described in Embodiments 1 and 2.

This is the overview of the image decoding apparatus in Embodiment 3.

[Configuration]

Next, a configuration of the image decoding apparatus in Embodiment 3 is described.

Figure 26:
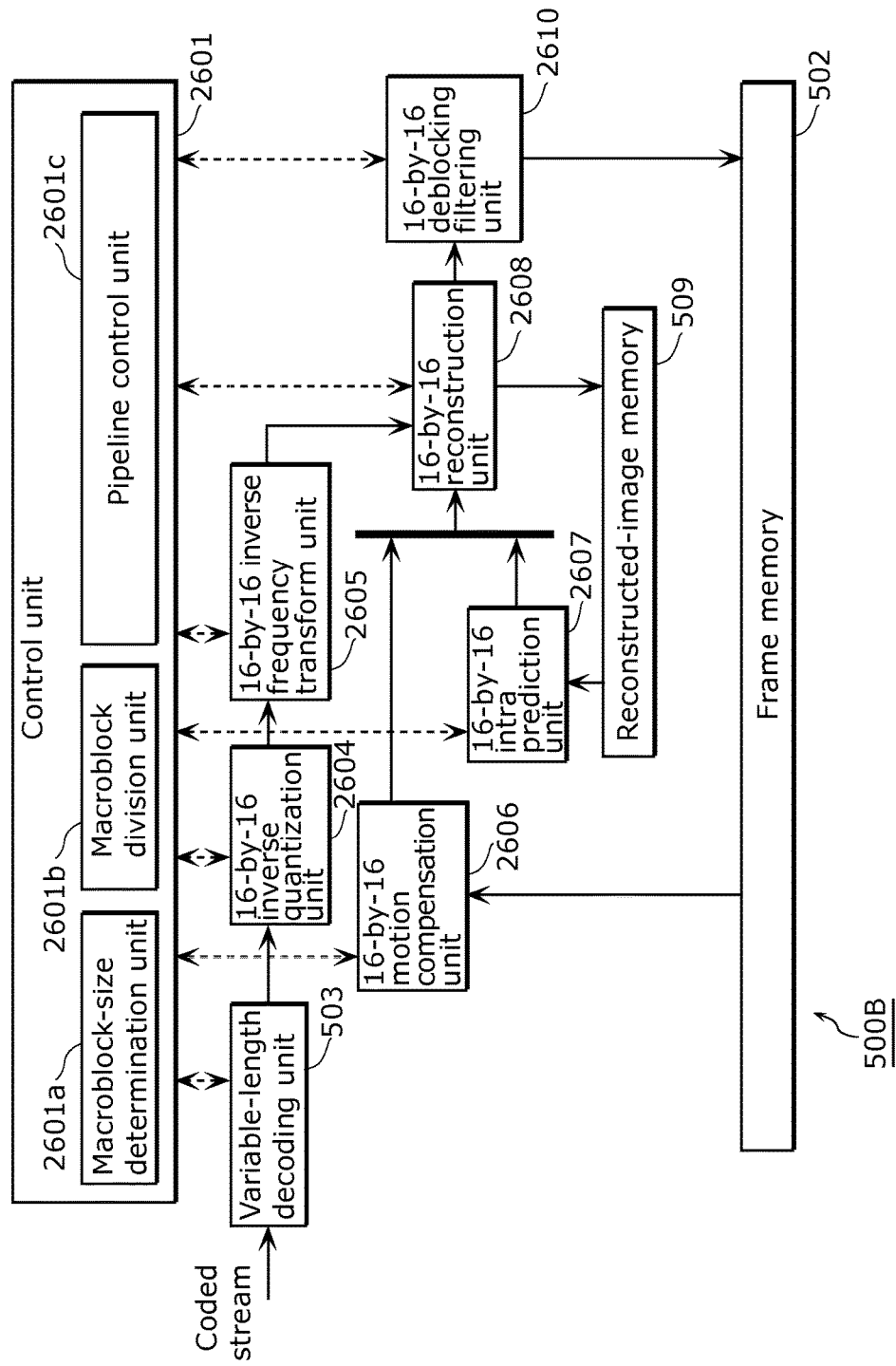
FIG. 26 is a diagram showing a configuration of an image decoding apparatus in Embodiment 3 according to the present invention.

FIG. 26 is a diagram showing a configuration of the image decoding apparatus in Embodiment 3.

An image decoding apparatus 500B in Embodiment 3 includes a control unit 2601, a frame memory 502, a reconstructed-image memory 509, a variable-length decoding unit 503, a 16-by-16 inverse quantization unit 2604, a 16-by-16 inverse frequency transform unit 2605, a 16-by-16 motion compensation unit 2606, a 16-by-16 intra prediction unit 2607, a 16-by-16 reconstruction unit 2608, and a 16-by-16 deblocking filtering unit 2610. To be more specific, as compared to the image decoding apparatus 500 described in Embodiment 1, the image decoding apparatus 500B includes the control unit 2601 having a macroblock-size determination unit 2601a, a macroblock division unit 2601b, and a pipeline control unit 2601c, in place of the control unit 501. Moreover, the image decoding pipeline 500B includes the 16-by-16 inverse quantization unit 2604, the 16-by-16 inverse frequency transform unit 2605, the 16-by-16 motion compensation unit 2606, the 16-by-16 intra prediction unit 2607, the 16-by-16 reconstruction unit 2608, and the 16-by-16 deblocking filtering unit 2610, in place of, respectively, the inverse quantization unit 504, the inverse frequency transform 505, the motion compensation unit 506, the intra-picture prediction unit 507, the reconstruction unit 508, and the deblocking filtering unit 510 described in Embodiment 1. The other components in the image decoding apparatus 500B are the same as those shown in FIG. 5 in Embodiment 1 and in FIG. 20 in Embodiment 2. Thus, these components are assigned the same reference signs as used in FIG. 5 and FIG. 20 and the explanations of these components are omitted here.

The macroblock-size determination unit 2601a calculates the size of a macroblock based on a macroblock type transmitted from the variable-length decoding unit 503, and determines whether or not the size of the macroblock is larger than 16 by 16 pixels. When it is determined that the macroblock is larger than 16 by 16 pixels, the macroblock division unit 2601a divides the macroblock into 16-by-16-pixel sub-blocks. The pipeline control unit 2601c controls the 16-by-16 inverse quantization unit 2604, the 16-by-16 inverse frequency transform unit 2605, the 16-by-16 motion compensation unit 2606, the 16-by-16 intra prediction unit 2607, the 16-by-16 reconstruction unit 2608, and the 16-by-16 deblocking filtering unit 2610. By doing so, the pipeline control unit 2601c performs pipeline control in order for the coded video sequence to be decoded on a 16-by-16-pixel block basis (on a sub-block basis).

The 16-by-16 inverse quantization unit 2604 performs inverse quantization on a 16-by-16-pixel block basis. The 16-by-16 inverse frequency transform unit 2605 performs inverse frequency transform on a 16-by-16-pixel block basis. The 16-by-16 motion compensation unit 2606 performs motion compensation on a 16-by-16-pixel block basis. The 16-by-16 intra prediction unit 2607 performs intra-picture prediction on a 16-by-16-pixel block basis. The 16-by-16 reconstruction unit 2608 performs a reconstruction process on a 16-by-16-pixel block basis. The 16-by-16 deblocking filtering unit 2610 performs deblocking filtering on a 16-by-16-pixel block basis. In this way, although the processing units in Embodiments 1 and 2 perform the pipeline processing on a macroblock basis, the processing units in Embodiment 3 perform the pipeline processing on a 16-by-16-pixel block basis.

This is the configuration of the image decoding apparatus.
[Operation]
Next, an operation performed by the image decoding apparatus 500B shown in FIG. 26 is described. A picture included in the coded video sequence to be decoded by the image decoding apparatus 500B in Embodiment 3 has a structure similar to the structure shown in FIG. 23 in Embodiment 2. However, the size of the macroblock is variable, instead of being fixed at 32 by 32 pixels. To be more specific, the size of the macroblock ranges from 16-by-16 pixels to 128-by128 pixels at the maximum. Motion compensation and intra-picture prediction are performed on a 128-by-128-pixel block basis at the maximum. Here, note that inverse quantization (quantization in the case of coding) and inverse frequency transform (frequency transform in the case of coding) are performed on a 16-by-16-pixel block basis at the maximum as in the case of the H.264 standard.

The coded stream has the same structure as the coded streams described in Embodiments 1 and 2 as shown in FIG. 8B. On account of this, an operation performed by the image decoding apparatus 500B to decode one sequence of the coded stream is the same as the operations described in Embodiments 1 and 2 as shown in FIG. 9. Therefore, the explanation of the operation is omitted here.

Figure 27:
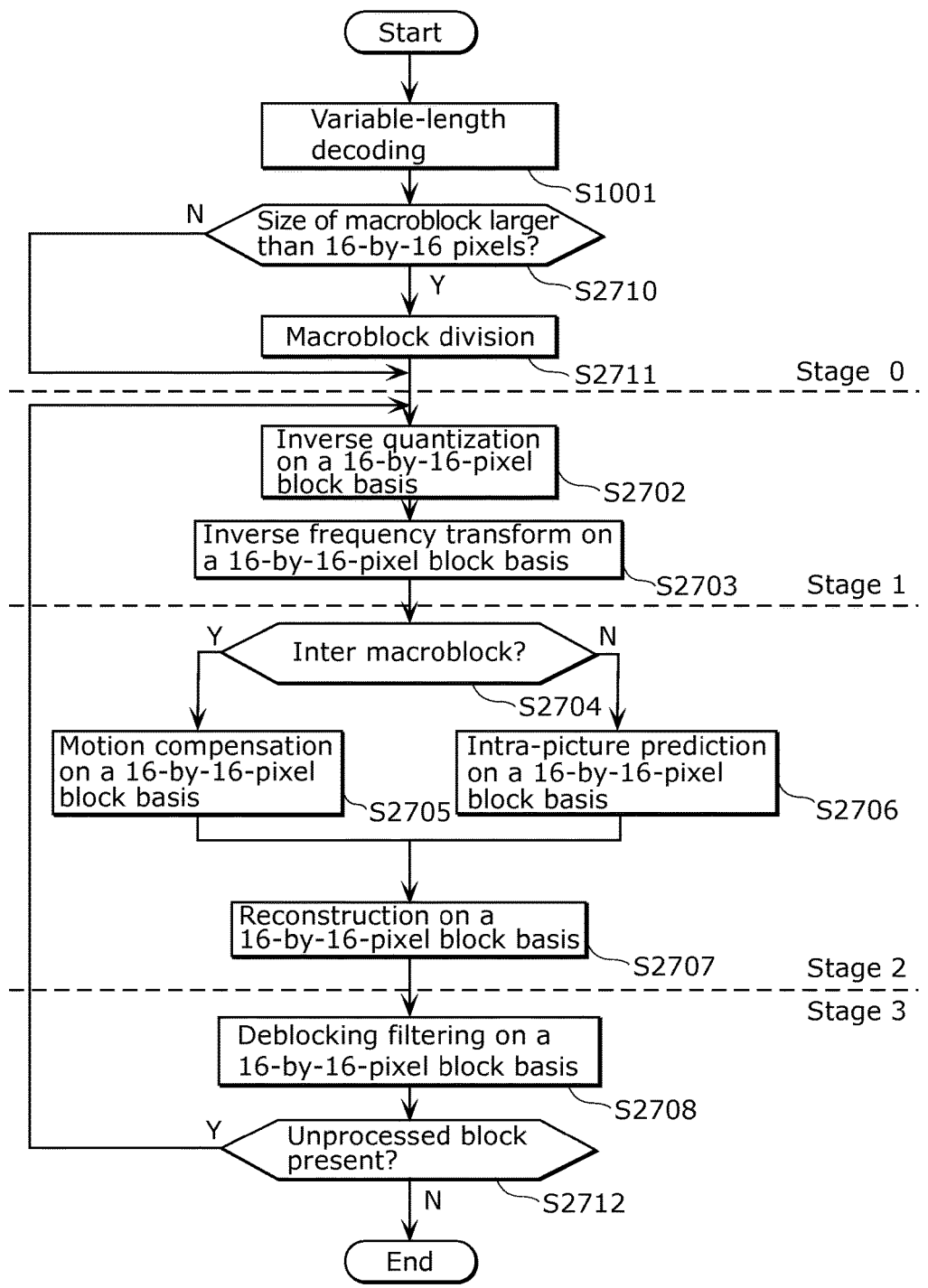
FIG. 27 is a flowchart showing an operation for decoding data of one macroblock in Embodiment 3 according to the present invention.

FIG. 27 is a flowchart showing an operation performed by the image decoding apparatus 500B to decode one macroblock. It should be noted that this flowchart shows the process operation performed in step S904 of FIG. 9.

Firstly, as in Embodiments 1 and 2, the variable-length decoding unit 503 performs variable-length decoding on the input coded stream (S1001). Next, the macroblock-size determination unit 2601a calculates the size of a macroblock based on a macroblock type obtained as a result of variable-length decoding, and determines whether or not the size of the macroblock is larger than 16 by 16 pixels (S2710). When it is determined that the macroblock is larger than 16 by 16 pixels (Y in S2710), the macroblock division unit 2601a divides the macroblock into 16-by-16-pixel sub-blocks (S2711). To be more specific, when dividing the macroblock, the macroblock division unit 2601a calculates location information indicating a location in a macroblock for each sub-block, and also calculates a motion vector and a reference index for each sub-block when the current macroblock is an inter macroblock. When the current macroblock is an intra macroblock, the macroblock division unit 2601a calculates an intra-prediction mode for each sub-block. These calculations are the same as the calculations performed in step S1101 (in FIG. 11) and step S1801 (in FIG. 18) in Embodiments 1 and 2 and, therefore, the detailed explanations are omitted here. When it is determined that the size of the macroblock is smaller than or equal to 16 by 16 pixels (N in S2710), the process of macroblock division (S2711) is not performed. The processes in steps S1001, S2710, and S2711 described thus far are assigned to a stage 0 of the pipeline processing by the pipeline control unit 2601c.

Next, the 16-by-16 inverse quantization unit 2604 performs inverse quantization (S2702) on a 16-by-16-pixel block basis, and the 16-by-16 inverse frequency transform unit 2605 performs inverse frequency transform (S2703) on a 16-by-16-pixel block basis. As a result, a difference image having the size of 16 by 16 pixels is generated. Here, when the current block to be decoded is a sub-block, the control unit 2601 outputs the location information indicating the location of the sub-block in the macroblock to the 16-by-16 inverse quantization unit 2604 and the 16-by-16 inverse frequency transform unit 2605. According to the location information outputted from the control unit 2601, the 16-by-16 inverse quantization unit 2604 and the 16-by-16 inverse frequency transform unit 2605 decide on a sub-block (a 16-by-16-pixel block) to be processed. It should be noted that each of the sizes of unit blocks of inverse quantization and inverse frequency transform to decode the coded video sequence by the image decoding apparatus in Embodiment 3 is 16 by 16 pixels at the maximum as with the H.264 standard. On account of this, the arithmetic operations performed in the inverse quantization and the inverse frequency transform are the same as the operations defined according to the H.264 standard. The processes in steps S2702 and S2703 described thus far are assigned to a stage 1 of the pipeline processing by the pipeline control unit 2601c.

Next, the control unit 2601 determines whether or not the current macroblock is an inter macroblock (S2704). When it is determined that the current macroblock is an inter macroblock (Y in S2704), the 16-by-16 motion compensation unit 2606 performs motion compensation on a 16-by-16-pixel block basis to generate a predicted image (S2705). Here, when the current macroblock is a sub-block, this means that the control unit 2601 has already transmitted, to the 16-by-16 motion compensation unit 2606, the location information indicating the location of the sub-block in the macroblock and the motion vector and the reference index of the sub-block. Thus, according to the above information transmitted from the control unit 2601, the 16-by-16 motion compensation unit 2606 performs motion compensation on the current sub-block. The process for calculating the motion vector and the reference index of the sub-block is the same as the process performed in step S1101 (in FIG. 11) described in Embodiments 1 and 2. Moreover, the motion compensation performed when the current block is a sub-block is the same as the processes performed in steps S1102 and S1103 (in FIG. 11) in Embodiments 1 and 2.

On the other hand, when the current block is not an inter macroblock (N in S2704), that is, when the current macroblock is an intra macroblock, the 16-by-16 intra prediction unit 2607 performs intra-picture prediction on a 16-by-16-pixel block basis to generate a predicted image (S2706). Here, when the current macroblock is a sub-block, this means that the control unit 2601 has already transmitted, to the 16-by-16 intra prediction unit 2607, the location information indicating the location of the sub-block in the macroblock and the intra-prediction mode of the sub-block. Thus, according to the above information transmitted from the control unit 2601, the 16-by-16 intra prediction unit 2607 performs intra-picture prediction on the current sub-block. The process for calculating the intra-prediction mode of the sub-block is the same as the process performed in step S1801 (in FIG. 18) described in Embodiments 1 and 2. Moreover, the intra-picture prediction performed when the current block is a sub-block is the same as the processes performed in steps S1802 and S1803 (in FIG. 18) in Embodiments 1 and 2.

After this, the 16-by-16 reconstruction unit 2608 generates a reconstructed image having the 16-by-16-pixel size (S2707) by adding the difference image generated in the 16-by-16-pixel-basis inverse frequency transform (S2703) to the predicted image generated in the 16-by-16-pixel-basis motion compensation (S2705) or in the 16-by-16-pixel-basis intra prediction (S2706). The processes in steps S2704, S2705, S2706, and S2707 described thus far are assigned to a stage 2 of the pipeline processing by the pipeline control unit 2601c.

Lastly, the 16-by-16 deblocking filtering unit 2610 performs deblocking filtering on the reconstructed image having the 16-by-16-pixel size (S2708). The deblocking filtering process performed in step S2708 is assigned to a stage 3 of the pipeline processing by the pipeline control unit 2601c.

By the processes from step S2702 to step S2708, the operation for decoding a 16-by-16-pixel block is completed. After this, the control unit 2601 determines whether or not the current macroblock includes a 16-by-16-pixel block that has yet to be processed (S2712). Until all the 16-by-16-pixel blocks are processed, the control unit 2601 causes the corresponding processing units to repeat the processes from step S2702 to step S2708. It should be noted that when the size of the macroblock is smaller than or equal to 16 by 16 pixels, the result of the determination made in step S2712 is always "N". When no unprocessed 16-by-16-pixel block is present, this means that the process for decoding one macroblock is completed. As shown in FIG. 27, the pipeline processing is performed by assigning: the variable-length decoding process (S1001) and the macroblock division process (S2711) to the stage 0; the inverse quantization process (S2702) and the inverse frequency transform process (S2703) to the stage 1; either the motion compensation process (S2705) or the intra-picture prediction process (S2706), and the reconstruction process (S2707) to the stage 2; and the deblocking filtering process (S2708) to the stage 3. This pipeline processing is controlled by the pipeline control unit 2601c of the control unit 2601.

Figure 1:
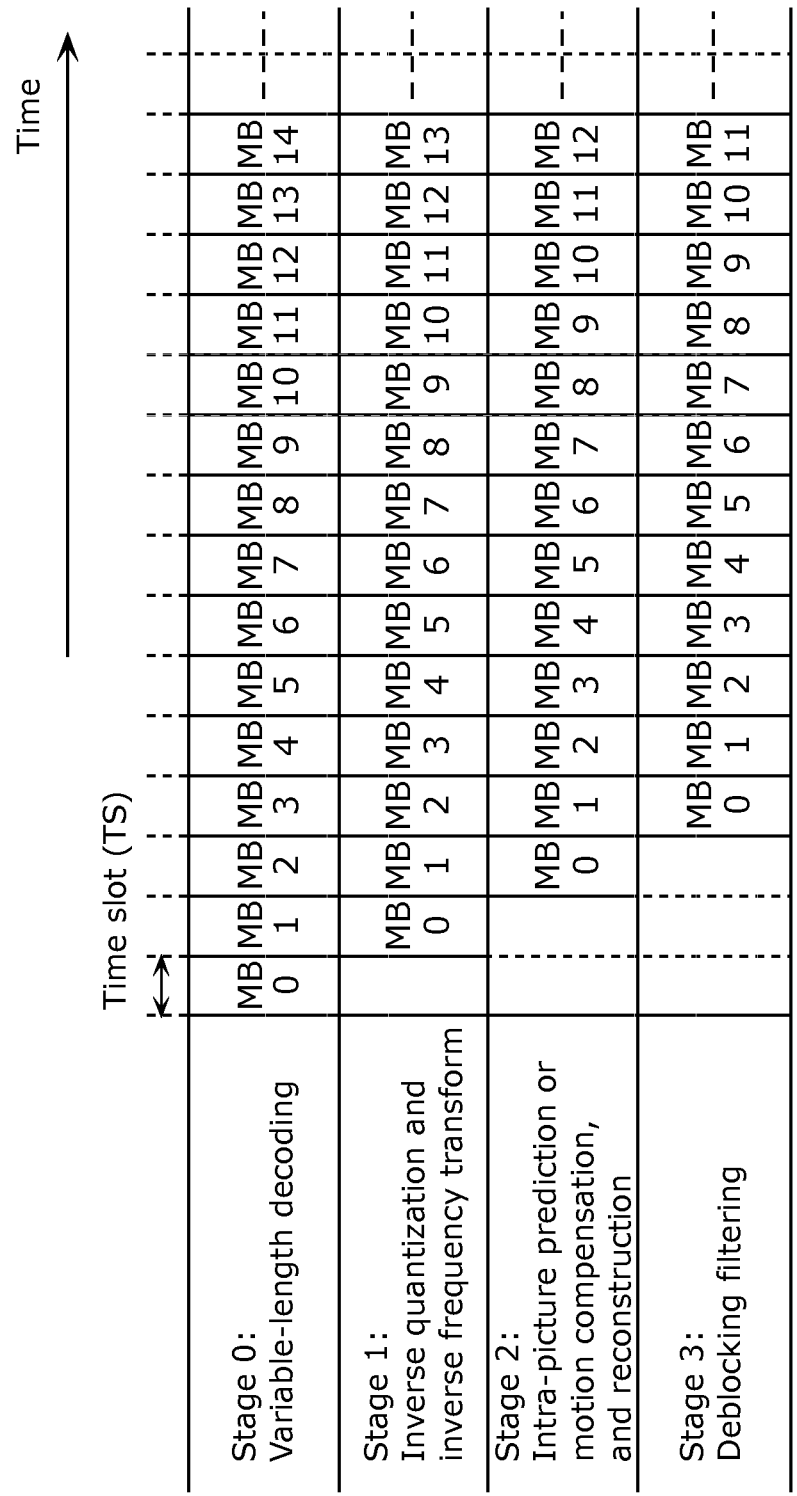
FIG. 1 is a diagram showing macroblock-based pipeline processing performed by a conventional image decoding apparatus.
Figure 2:
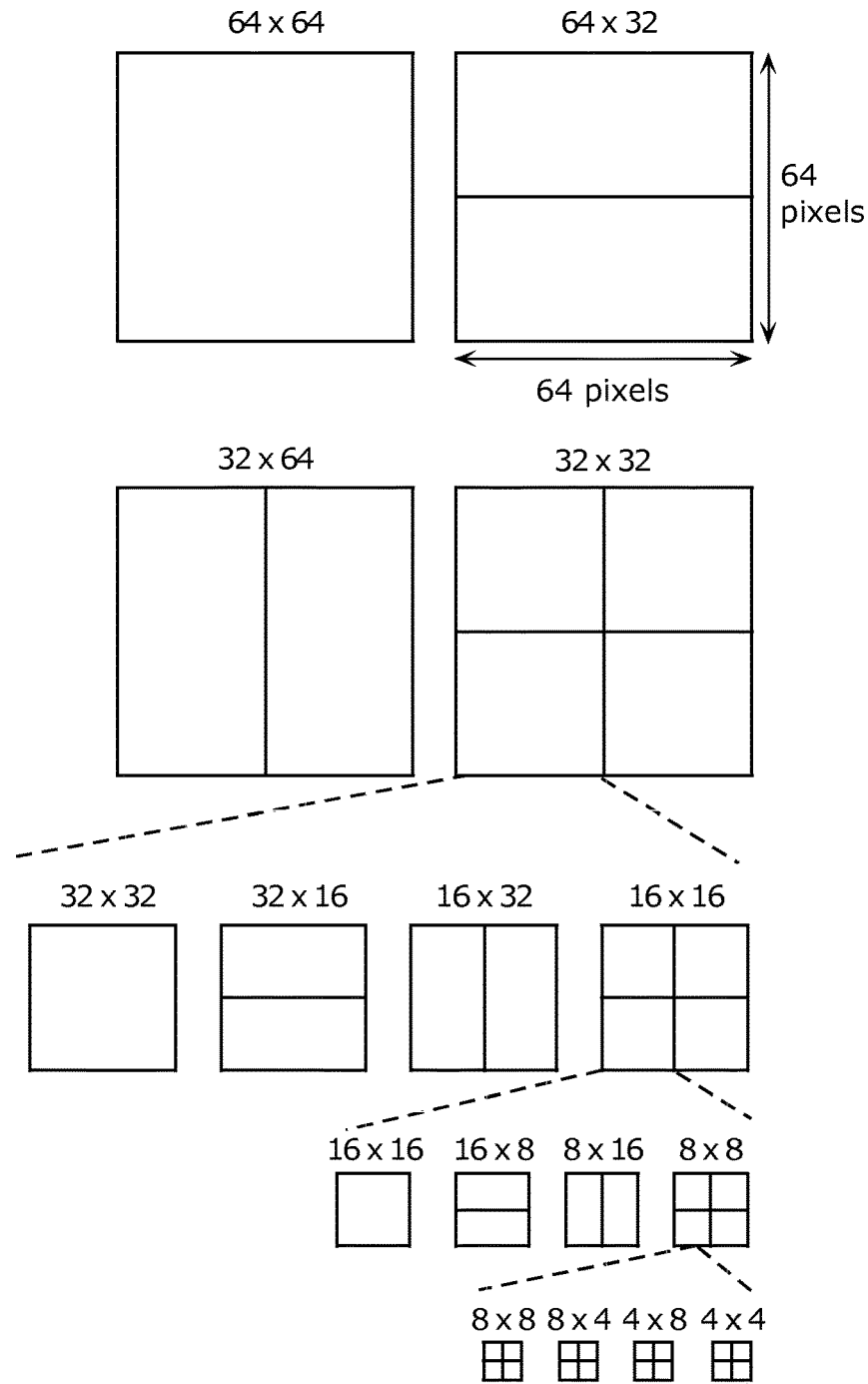
FIG. 2 is a diagram showing structural patterns of a super macroblock.
Figure 3:
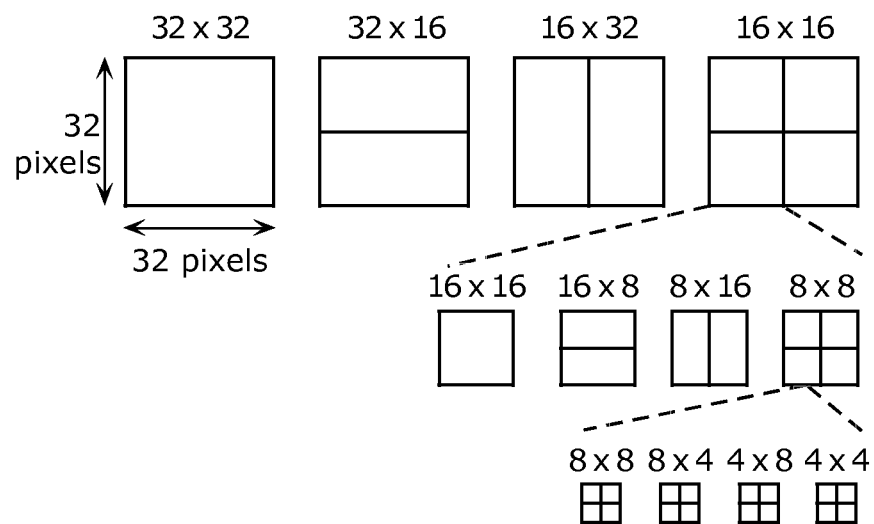
FIG. 3 is a diagram showing unit blocks for performing motion compensation on a macroblock.
Figure 4:
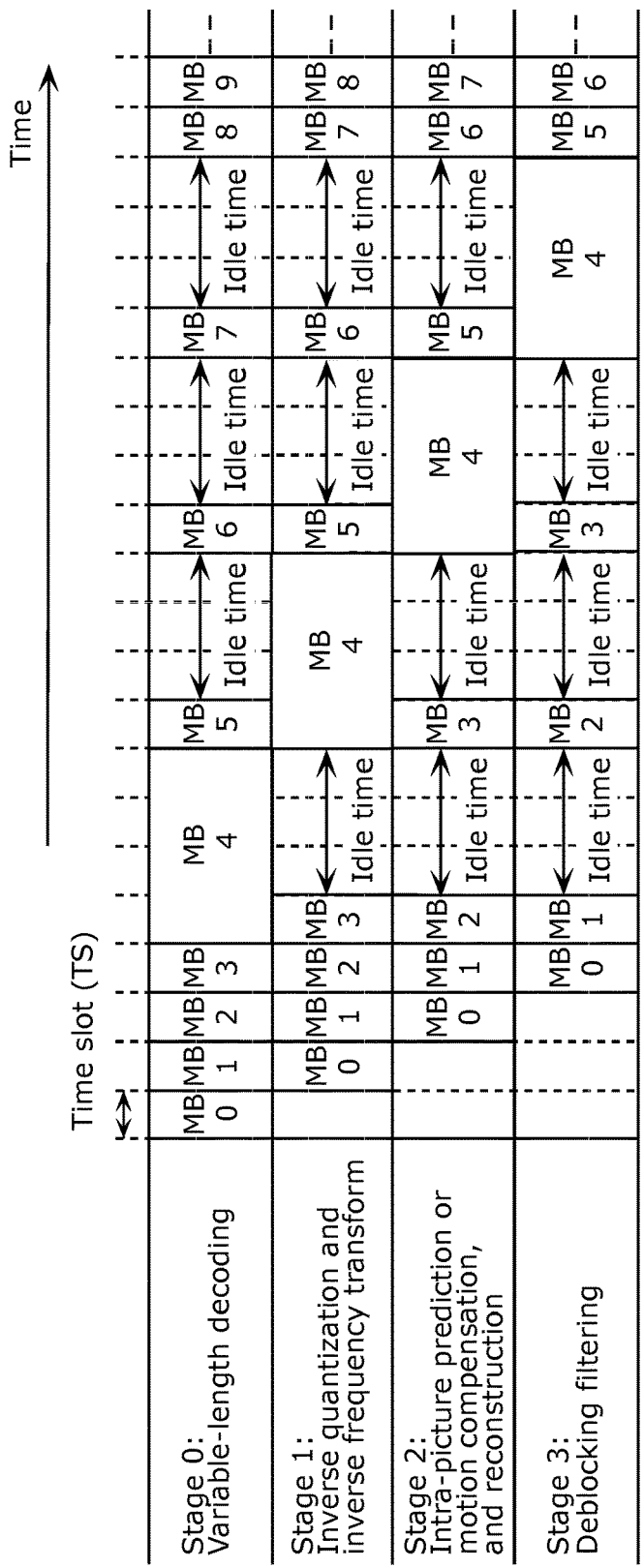
FIG. 4 is a diagram showing an operation performed in the pipeline processing by a conventional image decoding apparatus to decode a coded video sequence including a macroblock having the size larger than 16 by 16 pixels.
Figure 28:
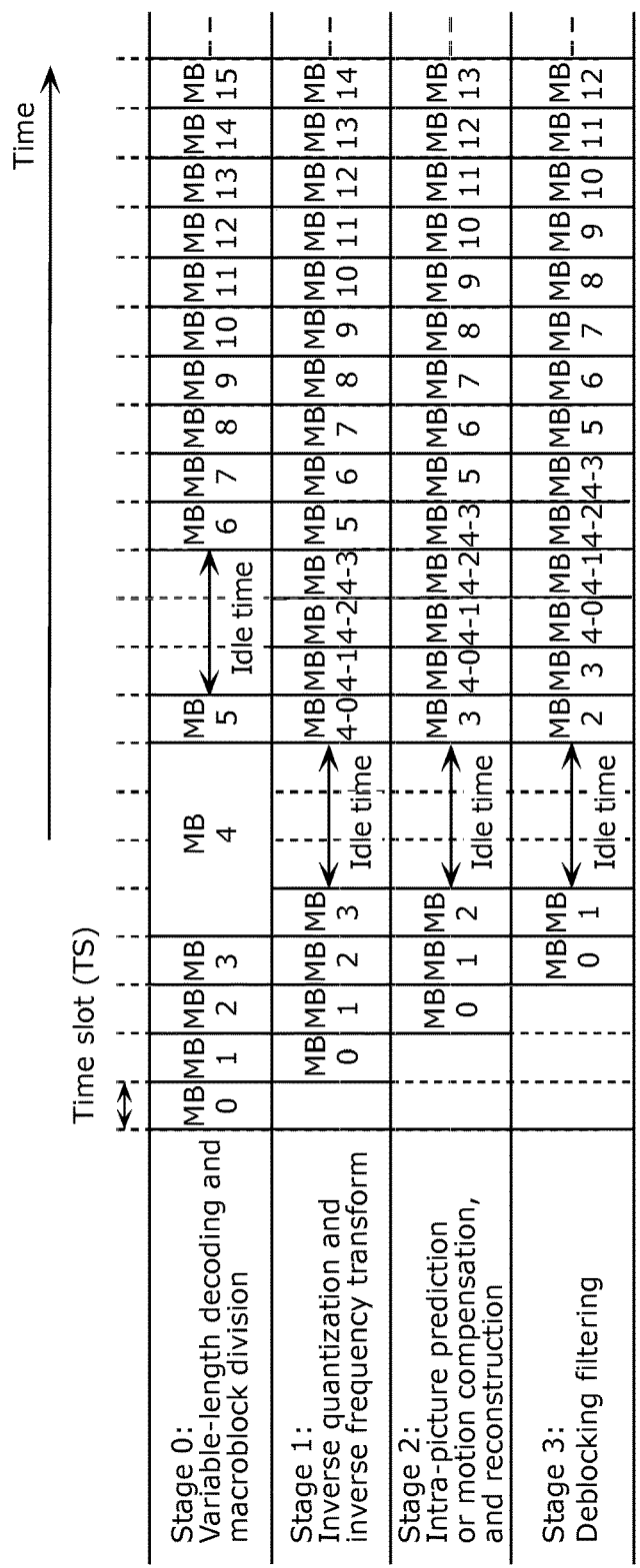
FIG. 28 is a diagram showing an operation performed by the image decoding apparatus to decode a coded video sequence including a macroblock having the size larger than 16 by 16 pixels in Embodiment 3 according to the present invention.

FIG. 28 is a diagram showing an example of the pipeline processing performed by the image decoding apparatus 500B in Embodiment 3. This example describes a process operation performed when the size of a macroblock (MB) 4 is 32 by 32 pixels and each of the sizes of the other macroblocks is 16 by 16 pixels. As shown in FIG. 28, in the stages 1 to 3, the MB 4 is divided into four 16-by-16-pixel sub-blocks, i.e., an MB4-0, an MB4-1, an MB4-2, and an MB4-3, which are then processed. Each of these sub-blocks has the same size as the other 16-by-16-pixel macroblock (such as an MB 5 and an MB 6 ). Therefore, the sub-block can be processed in the same processing cycle as the processing cycle of the 16-by-16-pixel macroblock. With this, an idle time is shorter as compared to the case where the pipeline processing is performed by the conventional image decoding apparatus shown in FIG. 4. Hence, the pipeline processing can be performed without a reduction in the processing efficiency as compared to the conventional pipeline processing.

This is the operation performed by the image decoding apparatus 500B.

[Advantageous Effect]

In Embodiment 3, the control unit 2601 of the image decoding apparatus 500B includes the macroblock-size determination unit 2601a, the macroblock division unit 2601b, and the pipeline control unit 2601c as described. Thus, the processing units that perform, for example, inverse quantization and motion compensation can process the coded video sequence on a 16-by-16-pixel block basis.

With this, the pipeline processing to decode the coded video sequence where the size of the macroblock is variable can be performed on a 16-by-16-pixel block basis, and the processes for macroblock decoding can be performed in parallel. Moreover, as compared to the pipeline processing performed by the conventional image decoding apparatus shown in FIG. 4, the pipeline processing performed by the image decoding apparatus 500B in Embodiment 3 allows an idle time caused in the pipeline processing to be reduced. Hence, the image decoding apparatus 500B can suppress a reduction in the efficiency of the pipeline processing.

Furthermore, even when the size of a macroblock increases, each processing unit only needs a function enough to process a 16-by-16-pixel block since the macroblock is processed after being divided. This can suppress an increase in the circuit size of each processing unit.

Embodiment 3 has described the case where the current coded video sequence to be decoded has been coded according to the variable-length coding method. However, the coding method may be different. The current coded video sequence may have been coded according to any other coding method, such as Huffman coding, run-length coding, or arithmetic coding.

Moreover, each of the configurations of the processing units may be implemented, in whole or part, by a circuit configured with dedicated hardware, or may be implemented by a program on a processor.

Furthermore, each of the frame memory 502 and the reconstructed-image memory 509 is a memory. However, each of these memories may be configured with a different memory element such as a flip-flop, as long as the memory element can store data. Alternatively, each of these memories may be configured to use a part of a memory area of a processor or a part of a cache memory.

Moreover, in Embodiment 3, the coded video sequence is the same as defined according to the H.264 standard, except that the size of the macroblock is 128 by 128 pixels at the maximum and that motion compensation and intra-picture prediction are performed per unit block having the size of 128 by 128 pixels at the maximum. However, the coded video sequence may be based on any other image coding standard, such as the MPEG2 standard, the MPEG4 standard, or the VC-1 standard.

Furthermore, Embodiment 3 has described the case where the size of the macroblock is 128 by 128 pixels at the maximum and motion compensation and intra-picture prediction are performed per unit block having the size of 128 by 128 pixels at the maximum. However, these sizes may be larger than 128 by 128 pixels. Even when the size of the macroblock is larger than 128 by 128 pixels, the control unit 2601 divides the macroblock into 16-by-16-pixel sub-blocks and controls the whole apparatus to implement the pipeline processing. Hence, the image decoding apparatus 500B in Embodiment 3 can decode the coded video sequence, regardless of the size of the macroblock.

Moreover, in Embodiment 3, the pipeline processing is performed by assigning: the variable-length decoding process (S1001) and the macroblock division process (S2711) to the stage 0; the inverse quantization process (S2702) and the inverse frequency transform process (S2703) to the stage 1; either the motion compensation process (S2705) or the intra-picture prediction process (S2706), and the reconstruction process (S2707) to the stage 2; and the deblocking filtering process (S2708) to the stage 3. However, the assignment of the processes to the respective stages and the number of stages may be different from the description above. For example, the inverse quantization process (S2702) and the inverse frequency transform process (S2703) may be separated and assigned to different stages. Similarly, either the motion compensation process (S2705) or the intra-picture prediction process (S2706), and the reconstruction process (S2707) may be separated and assigned to different stages. Moreover, for example, the stage 1 and the stage 2 may be combined into one stage. In this way, various different combinations are possible for the assignment of the processes and the number of stages.

Furthermore, in Embodiment 3, the stage 0 where the variable-length decoding process (S1001) and the macroblock division process (S2711) are performed is included in the pipeline processing. However, the stage 0 may be excluded from the pipeline processing and performed in advance before the macroblock decoding process (S904 in FIG. 9). In this case, the pipeline processing is performed according to the stages 1 to 3. Since only the process in the stage 0 is performed without dividing the macroblock as shown in FIG. 28, the processing cycle of the stage 0 is increased when the size of the macroblock is larger than 16 by 16 pixels. This results in idle times caused in the stages 1 to 3. Thus, when only the process in the stage 0 is performed in advance and the stages 1 to 3 are performed in the pipeline processing, no idle time is caused.

[Modification]

The following describes an image decoding apparatus in Modification of Embodiment 3 is described.

The image decoding apparatus in Modification has a feature of eliminating the idle time caused in the process of the stage 0, by including a buffer or a memory.

Figure 29:
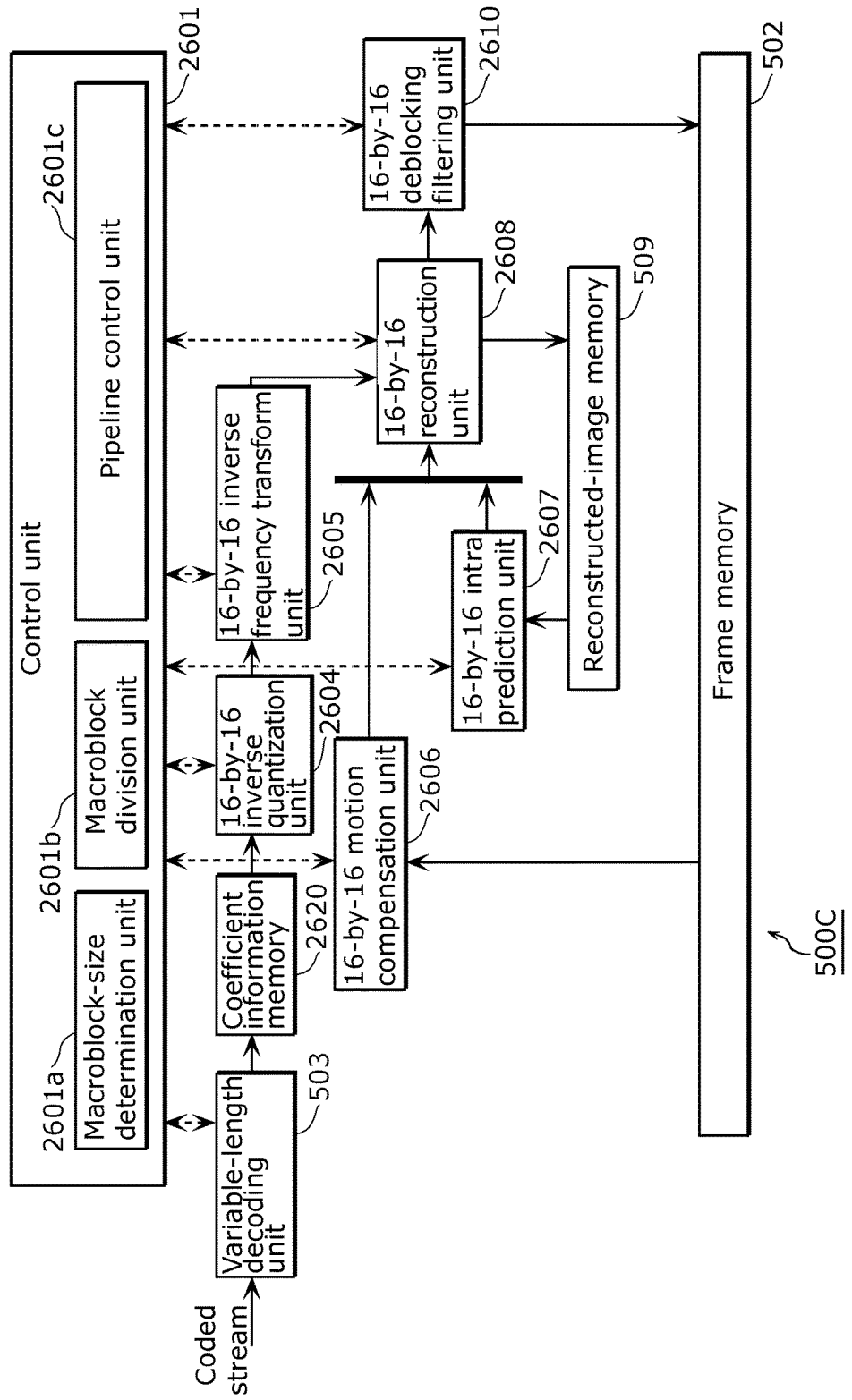
FIG. 29 is a diagram showing a configuration of an image decoding apparatus in Modification of Embodiment 3 according to the present invention.

FIG. 29 is a diagram showing a configuration of the image decoding apparatus in Modification.

An image decoding apparatus 500C in Modification includes all the components of the image decoding apparatus 500B and a coefficient information memory 2620. To be more specific, the image decoding apparatus 500C includes a control unit 2601, a frame memory 502, a reconstructed-image memory 509, a variable-length decoding unit 503, a 16-by-16inverse quantization unit 2604, a 16-by-16 inverse frequency transform unit 2605, a 16-by-16 motion compensation unit 2606, a 16-by-16 intra prediction unit 2607, a 16-by-16 reconstruction unit 2608, a 16-by-16 deblocking filtering unit 2610, and the coefficient information memory 2620.

The coefficient information memory 2620 has an area for recording coefficient information outputted from the variable-length decoding unit 503. The variable-length decoding unit 503 performs variable-length decoding for each MB of a coded stream to generate the coefficient information, and stores the coefficient information into the coefficient information memory 2620 for each MB.

When performing inverse quantization, the 16-by-16 inverse quantization unit 2604 reads a part or whole of the coefficient information corresponding to the 16-by-16-pixel block and then performs inverse quantization on the read coefficient information. For example, when the 16-by-16-pixel block is a sub-block obtained as a result of dividing a 32-by-32-pixel super macroblock, the 16-by-16 inverse quantization unit 2604 reads a part of the coefficient information corresponding to this super macroblock and performs inverse quantization on the read coefficient information.

When the 16-by-16-pixel block is a regular macroblock instead of a sub-block, the 16-by-16 inverse quantization unit 2604 reads the whole of the coefficient information corresponding to this macroblock and performs inverse quantization on the read coefficient information.

In Modification, the coefficient information generated by variable-length decoding is stored into the coefficient information memory 2620 as described. Thus, the variable-length decoding unit 503 can perform variable-length decoding sequentially on blocks following the current 16-by-16-pixel block, without having to wait for the 16-by-16 inverse quantization unit 2604 to finish inverse quantization performed on the current 16-by-16-pixel block. More specifically, regardless of the progress of the stages 1 to 3, the stage 0 can be proceeded.

Figure 30:
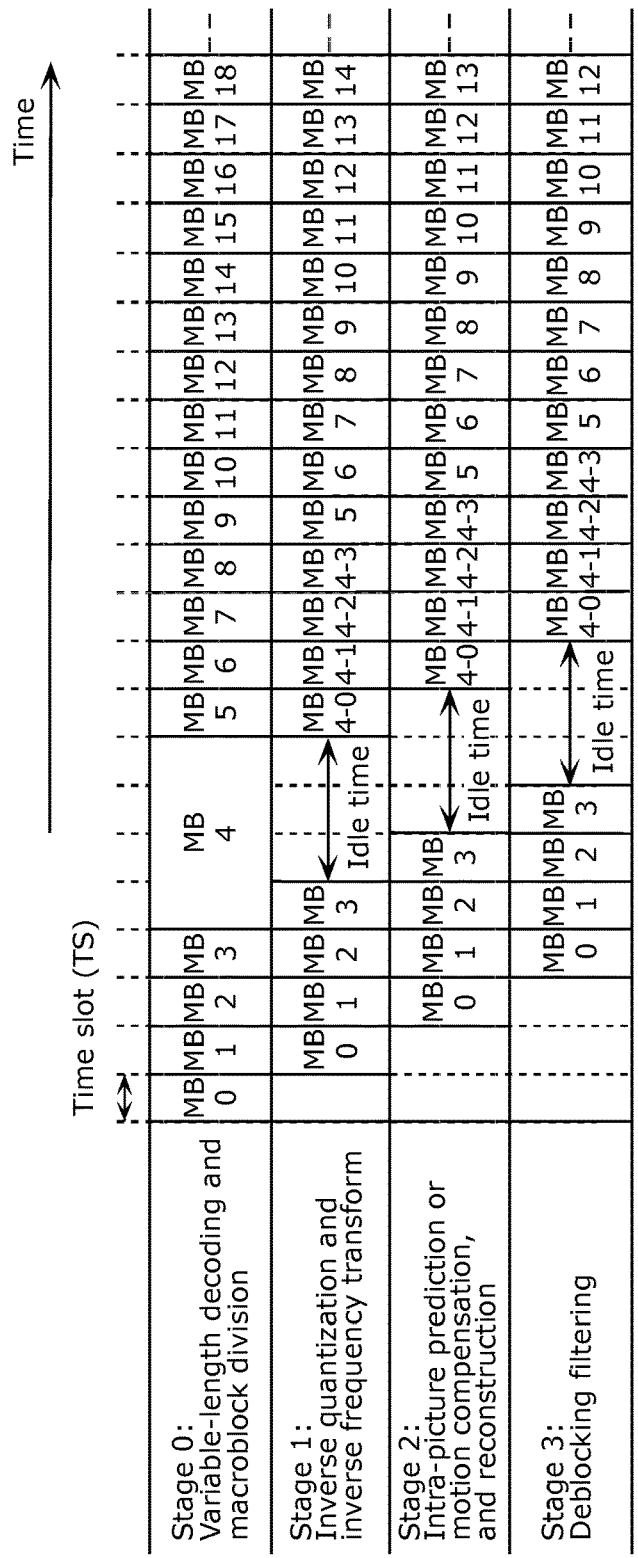
FIG. 30 is a diagram showing an example of a pipeline processing operation performed by the image decoding apparatus in Modification of Embodiment 3 according to the present invention.

FIG. 30 is a diagram showing an example of a pipeline processing operation performed by the image decoding apparatus 500C in Modification. As with the process shown in FIG. 28, this example describes a process operation performed when the size of an MB (macroblock) 4 is 32 by 32 pixels and each of the sizes of the other macroblocks is 16 by 16 pixels. As shown in FIG. 30, in the stages 1 to 3, the MB 4 is divided into four 16-by-16-pixel sub-blocks, i.e., an MB4-0, an MB4-1, an MB4-2, and an MB4-3, which are then processed. Here, in the stage 0 in Modification, immediately after an MB 5 is processed, an MB 6, an MB 7, . . . can be processed. With this, the idle time in the stage 0 can be eliminated.

Thus, in Modification, the coefficient information memory 2602 is provided between the variable-length decoding unit 503 and the 16-by-16 inverse quantization unit 2604. With this, the processing can be performed without an "idle time" that is caused in the variable-length decoding stage of the pipeline processing.

It should be noted that the coefficient information memory 2602 may be provided inside an LSI or may be a DSRAM provided outside the LSI. Alternatively, the frame memory 502 or the reconstructed-image memory 509 may have a function as the coefficient information memory 2620.

Moreover, the image decoding apparatus and the method thereof according to the present invention are not limited to Embodiments 1 to 3 described above, and may be image decoding apparatuses and an image decoding method shown in FIG. 31A to FIG. 34 as described below. These image decoding apparatuses and image decoding method can achieve the same advantageous effects as in Embodiments 1 to 3 described above.

Figure 31A:
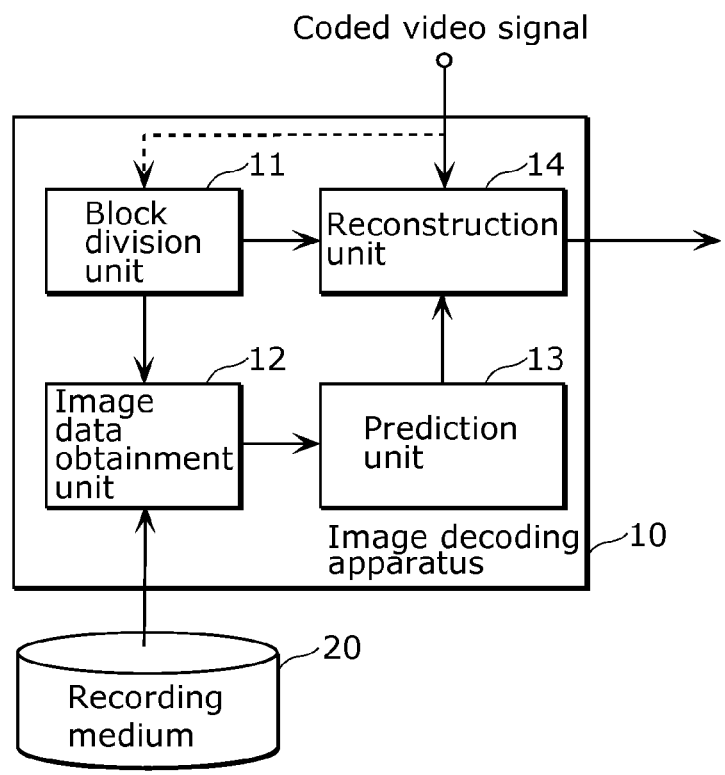
FIG. 31A is a diagram showing a configuration of an image decoding apparatus according to the present invention.

FIG. 31A is a diagram showing a configuration of an image decoding apparatus according to the present invention.

An image decoding apparatus 10 decodes a coded video sequence generated by coding, per block, each of pictures included in video. The image decoding apparatus 10 includes: a block division unit 11 which divides a current block that is to be decoded and is included in a picture of the coded video sequence, into a plurality of sub-blocks; an image obtainment unit 12 which obtains, for each of the sub-blocks, image data corresponding to the sub-block from a recording medium 20; a prediction unit 13 which generates, for each of the sub-blocks, a predicted image of the sub-block, based on the image data obtained by the image obtainment unit 12; and a reconstruction unit 14 which reconstructs each of the sub-blocks, by adding the predicted image generated for the sub-block to the sub-block.

Here, the image decoding apparatus 10 corresponds to the image decoding apparatus 500 in Embodiment 1, the image decoding apparatus 500A in Embodiment 2, and the image decoding apparatus 500B in Embodiment 3. The block division unit 11 corresponds to at least one of the motion-compensation block division unit 601 and the intra-prediction block division unit 701 described in each of Embodiments 1 and 2, and also corresponds to the macroblock division unit 2601b in Embodiment 3. The image data obtainment unit 12 corresponds to at least one of the reference image obtainment unit 602 and the reconstructed-image obtainment unit 702 described in each of Embodiments 1 and 2, and also corresponds to some of the functions included in at least one of the 16-by-16 motion compensation unit 2606 and the 16-by-16 intra prediction unit 2607 in Embodiment 3. The prediction unit 13 corresponds to at least one of the motion-compensation arithmetic unit 603 and the intra-prediction arithmetic unit 703 described in each of Embodiments 1 and 2, and also corresponds to some of the functions include in at least one of the 16-by-16motion compensation unit 2606 and the 16-by-16 intra prediction unit 2607 in Embodiment 3. The reconstruction unit 14 corresponds to the reconstruction unit 508 described in each of Embodiments 1 and 2, and also corresponds to the 16-by-16 reconstruction unit 2608 in Embodiment 3.

Moreover, a recording medium 20 corresponds to the frame memory 502 and the reconstructed-image memory 209 described in each of Embodiments 1 to 3.

Furthermore, a block or a current block to be decoded is, for example, a macroblock and has a size larger than 16 by 16 pixels. The size of a sub-block is 16 by 16 pixels, for example. Image data obtained by the image data obtainment unit 12 is a reference image or a reconstructed image.

Figure 31B:
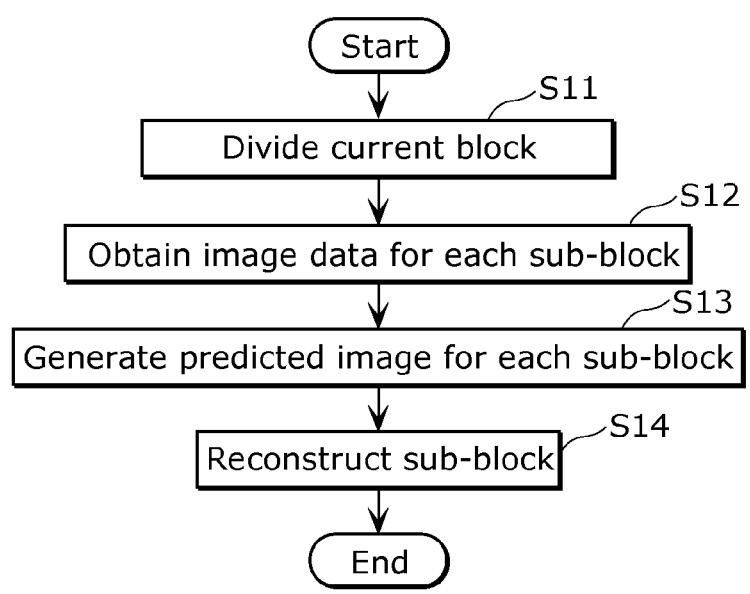
FIG. 31B is a flowchart showing an image decoding method according to the present invention.

FIG. 31B is a flowchart showing an image decoding method according to the present invention.

The image decoding method is used for decoding a coded video sequence generated by coding, per block, each of pictures included in video. The image decoding method includes: a block division step S11 of dividing a current block that is to be decoded and is included in a picture of the coded video sequence, into a plurality of sub-blocks; an image obtainment step S12 of obtaining, for each of the sub-blocks, image data corresponding to the sub-block from a recording medium; a prediction step S13 of generating, for each of the sub-blocks, a predicted image of the sub-block, based on the image data obtained in the image obtainment step S12; and a reconstruction step S14 of reconstructing each of the sub-blocks, by adding the predicted image generated for the sub-block to the sub-block. The coded video sequence is decoded according to this image decoding method by the image decoding apparatus 10 shown in FIG. 31A.

In Embodiment 1, steps S11 to S13 described above correspond to steps S1101 to S1103 in FIG. 11 or steps S1801 to S1803 in FIG. 18. Moreover, step S14 described above corresponds to step S1007 in FIG. 10 in Embodiment 1.

In Embodiment 2, steps S11 to S13 described above correspond to steps S1101 to S1103 in FIG. 24 or steps S1801 to S1803 in FIG. 25. Moreover, step S14 described above corresponds to step S1007 in FIG. 10 in Embodiment 2.

In Embodiment 3, steps S11 to S13 described above correspond to step S2711 and one of steps S2705 and S2706 in FIG. 27. Moreover, step S14 described above corresponds to step S2707 in FIG. 27 in Embodiment 3.

With the image decoding apparatus 10 and the image decoding method as described, when the size of a block (such as a macroblock) used as a unit of coding in a coded video sequence is larger than, for example, the size defined by the H.264 standard (i.e., the 16-by-16-pixel size), the block is divided into a plurality of 16-by-16-pixel sub-blocks or the like. Therefore, the prediction unit 13 does not need a circuit size for generating a predicted image corresponding to a block having the size larger than 16 by 16 pixels. As a result, the circuit of the prediction unit 13 can be held to a minimum enough to generate a predicted image corresponding to a block having the size smaller than or equal to 16 by 16 pixels. Hence, a coded video sequence including a large-size block can be decoded without an increase in the circuit size. To be more specific, although the other components such as the deblocking filtering unit 510 included in Embodiments 1 to 3 are not included, the image decoding apparatus 10 and the image decoding method as described can achieve the object in the present invention.

Figure 32:
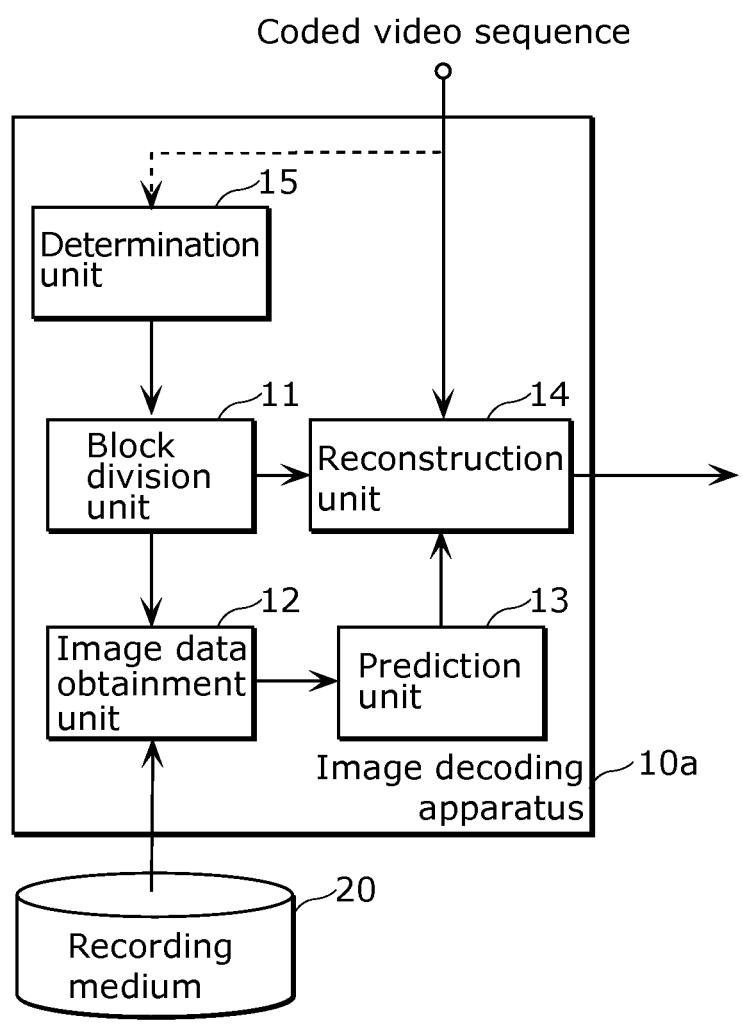
FIG. 32 is a diagram showing a configuration of another image decoding apparatus according to the present invention.

FIG. 32 is a diagram showing another image decoding apparatus according to the present invention.

An image decoding apparatus 10a includes all the components of the image decoding apparatus 10, and further includes a determination unit 15 which determines whether or not a size of the current block is larger than a predetermined size. The block division unit 11 divides the current block into the sub-blocks when the determination unit 15 determines that the size of the current block is larger than the predetermined size. It should be noted that the determination unit 15 corresponds to the macroblock-size determination unit 2101 or 2201 in Embodiment 2 and also corresponds to the macroblock-size determination unit 2601a in Embodiment 3.

With this, the block (the current block to be decoded) is divided when the size of the block is larger than the predetermined size. Thus, the predetermined size may be set at the size of a sub-block, for example. When the coded video sequence includes a block having the size smaller than or equal to the predetermined size, this block is not divided and thus processed by the prediction unit 13. When the coded video sequence includes a block having the size larger than the predetermined size, this block is divided into a plurality of sub-blocks each of which is then processed by the prediction unit 13. Hence, when the blocks included in the coded video sequence have different sizes, the coded video sequence can be decoded appropriately without an increase in the circuit size.

Figure 33:
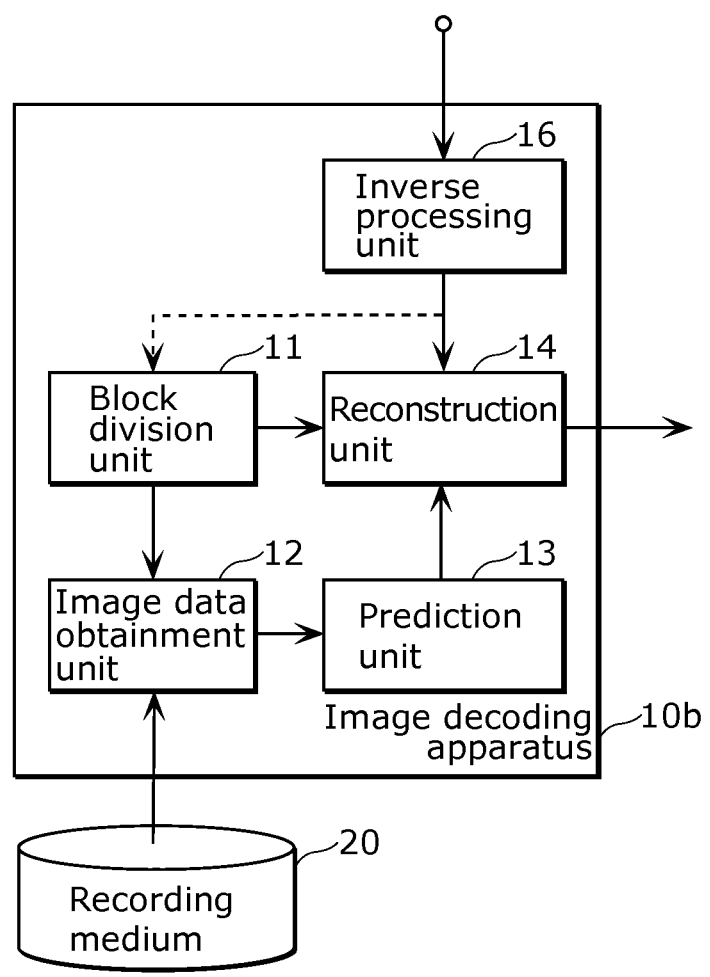
FIG. 33 is a diagram showing a configuration of another image decoding apparatus according to the present invention.

FIG. 33 is a diagram showing a configuration of another image decoding apparatus according to the present invention.

An image decoding apparatus 10b includes all the components of the image decoding apparatus 10, and further includes an inverse processing unit 16 which performs inverse quantization and inverse frequency transform on the current block, sequentially for each of the sub-blocks. The prediction unit 13 generates a predicted image of a first sub-block, among the sub-blocks, on which the inverse processing unit 16 already performs inverse quantization and inverse frequency transform, while the inverse processing unit 16 performs inverse quantization and inverse frequency transform on a second sub-block among the sub-blocks. It should be noted that the inverse processing unit 16 corresponds to the 16-by-16 inverse quantization unit 2604 and the 16-by-16 inverse frequency transform unit 2605 in Embodiment 3. Moreover, the first sub-block corresponds to, for example, the MB 4-0 shown in FIG. 28 in Embodiment 3, and the second sub-block corresponds to, for example, the MB 4-1 shown in FIG. 28 in Embodiment 3.

With this, after the inverse processing unit 16 performs inverse quantization and inverse frequency transform on the first sub-block, inverse quantization and inverse frequency transform by the inverse processing unit 16 for the second sub-block are performed in parallel with generation of the predicted image by the prediction unit 13 for the first sub-block. To be more specific, the inverse processing unit 16 and the prediction unit 13 can execute the pipeline processing for each sub-block. Thus, without having to wait for inverse quantization and inverse frequency transform to be completed for different sub-blocks other than the first sub-block included in the current block (the block to be decoded), that is, without having to wait for these processes to be completed for the current entire block (the block to be decoded), the prediction unit 13 can start processing for this block. As a result, the process waiting time can be reduced, and the efficiency of the decoding process can be increased.

Figure 34:
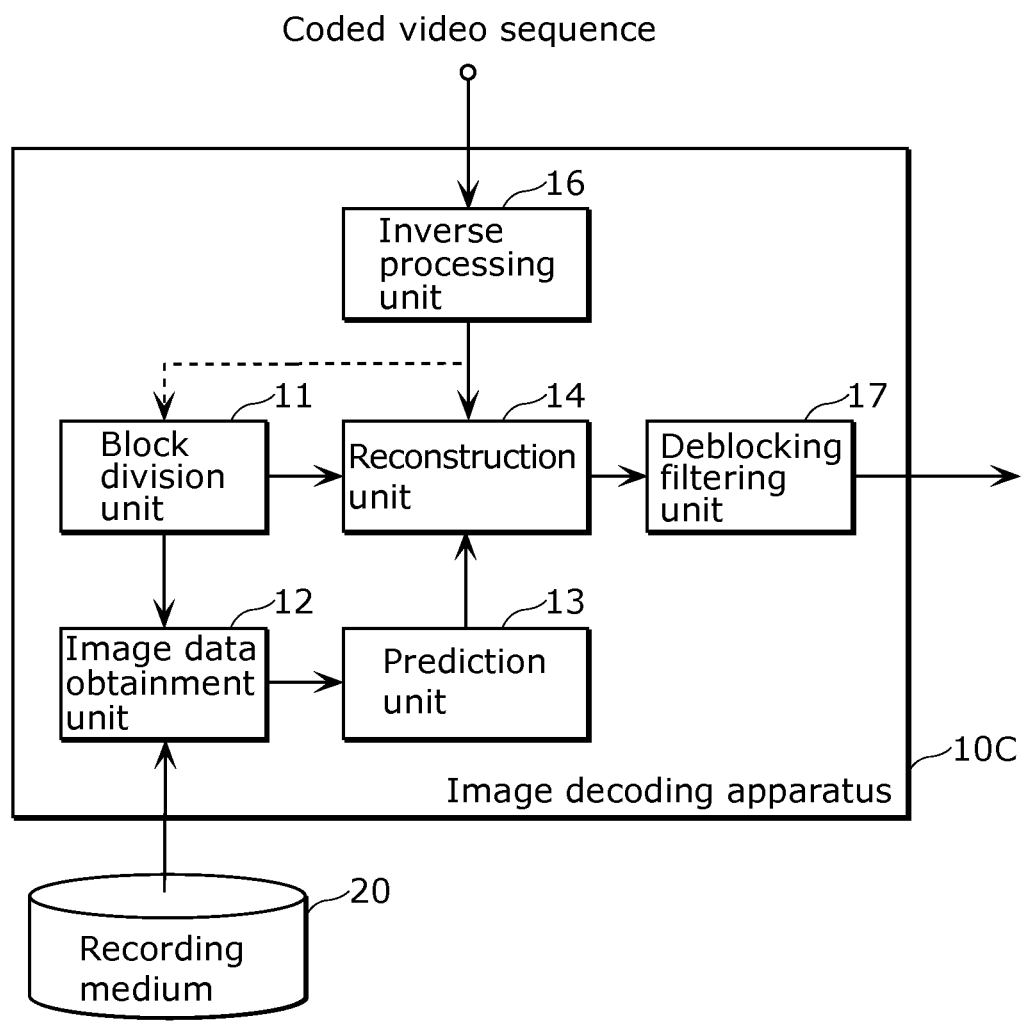
FIG. 34 is a diagram showing a configuration of another image decoding apparatus according to the present invention.

FIG. 34 is a diagram showing a configuration of another image decoding apparatus according to the present invention.

An image decoding apparatus 10c includes all the components of the image decoding apparatus 10b, and further includes a deblocking filtering unit 17 which eliminates, for each of the sub-blocks, a block noise included in the sub-block reconstructed by the reconstruction unit 14. The deblocking filtering unit 17 eliminates the block noise included in the first sub-block for which the predicted image is already generated by the prediction unit 13 and which is already reconstructed by the reconstruction unit 14, while the prediction unit 13 generates a predicted image of the second sub-block and the reconstruction unit 14 reconstructs the second sub-block. It should be noted that the deblocking filtering unit 17 corresponds to the 16-by-16 deblocking filtering unit 2610 in Embodiment 3.

With this, after the prediction unit 13 generates the predicted image for the first sub-block and the reconstruction unit 14 reconstructs the first sub-block, generation of a predicted image by the prediction unit 13 for the second sub-block, reconstruction by the reconstruction unit 14 for the second sub-block, and block noise elimination by the deblocking filtering unit 17 for the first sub-block are performed in parallel. To be more specific, the prediction unit 13, the reconstruction unit 14, and the deblocking filtering unit 17 can execute the pipeline processing for each sub-block. Thus, without having to wait for predicted-image generation and reconstruction to be completed for different sub-blocks other than the first sub-block included in the current block (the block to be decoded), that is, without having to wait for these processes to be completed for the current entire block (the block to be decoded), the deblocking filtering unit 17 can start processing for this block. As a result, the process waiting time can be further reduced, and the efficiency of the decoding process can be further increased.

[Embodiment 4]

The processing described in above Embodiments can be simply implemented by an independent computer system by recording, onto a recording medium, a program for implementing the image decoding method described in above Embodiments. The recording medium may be any recording medium as long as the program can be recorded thereon, such as a magnetic disk, an optical disc, a magnetic optical disc, an IC card, and a semiconductor memory.

Hereinafter, the application to the image decoding method described in above Embodiments and a system using the same will be described.

Figure 35:
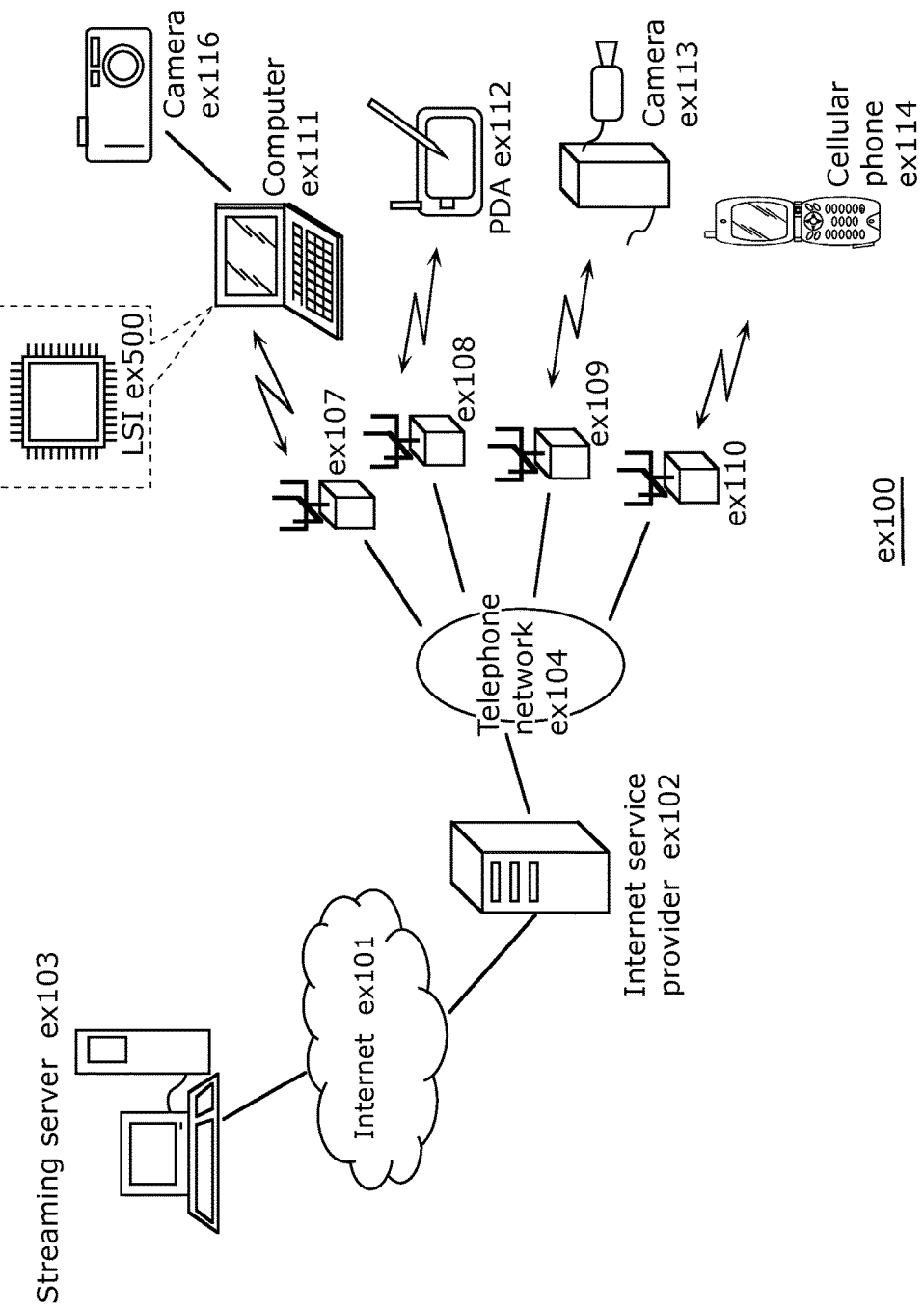
FIG. 35 is a block diagram showing an overall configuration of a content providing system for implementing content distribution services, in Embodiment 4 according to the present invention.

FIG. 35 illustrates an overall configuration of a content providing system ex100 for implementing content distribution services. The area for providing communication services is divided into cells of desired size, and base stations ex107 to ex110 which are fixed wireless stations are placed in each of the cells.

The content providing system ex100 is connected to devices, such as a computer ex111, a personal digital assistant (PDA) ex112, a camera ex113, a cellular phone ex114, and a game machine, via an Internet ex101, an Internet service provider ex102, a telephone network ex104, as well as the base stations ex107 to ex110.

However, the configuration of the content providing system ex102 is not limited to the configuration shown in FIG. 35, and a combination in which any of the elements are connected is acceptable. In addition, each of the devices may be directly connected to the telephone network ex104, rather than via the base stations ex107 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in each of Embodiments, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding moving images may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the moving picture data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 36:
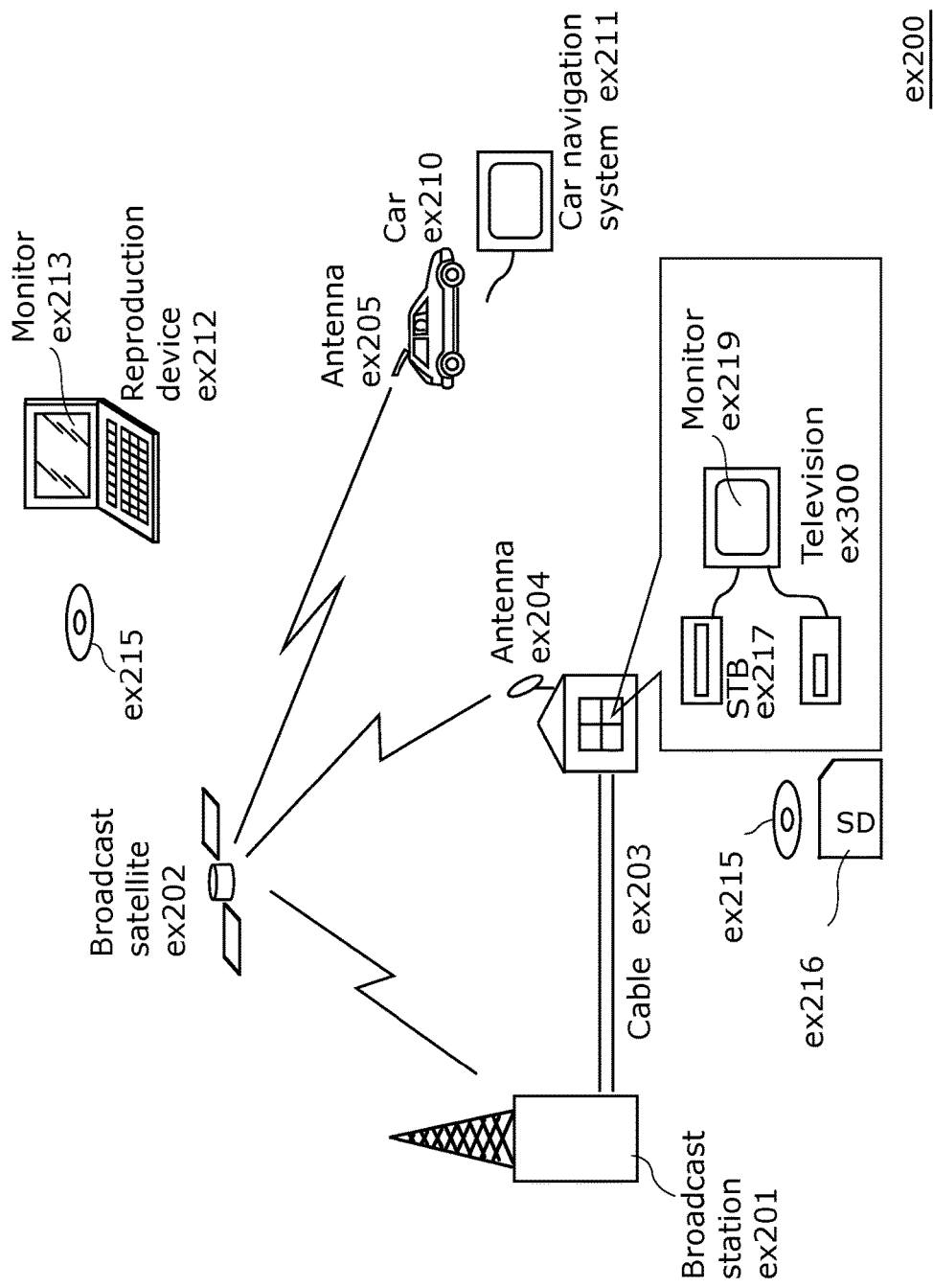
FIG. 36 is a block diagram showing an overall configuration of a digital broadcasting system in Embodiment 4 according to the present invention.

The present invention is not limited to the above-mentioned content providing system ex100, and at least either the image coding apparatus or the image decoding apparatus described in above Embodiments can be incorporated into a digital broadcasting system ex200 as shown in FIG. 36. More specifically, a broadcast station ex201 communicates and transmits, via radio waves to a broadcast satellite ex202, a bit stream of video information. This bit stream is the coded bit stream having been coded by the image coding method described in above Embodiments. Upon receipt of the bit stream, the broadcast satellite ex202 transmits radio waves for broadcasting. Then, a home-use antenna ex204 with a satellite broadcast reception function receives the radio waves, and a device, such as a television (receiver) ex300 and a set top box (STB) ex217, decodes the coded bit stream and reproduces the decoded bit stream.

Furthermore, a reproduction device ex212 that reads and decodes a bit stream recorded on a storage medium ex214, such as a compact disc (CD) and a digital versatile disc (DVD), may include the image decoding apparatus described in above Embodiments. In this case, the reproduced video signals are displayed on the monitor ex213.

Furthermore, the image decoding apparatus or the image coding apparatus as described in above Embodiments can be implemented in a reader/recorder ex218 (i) for reading and decoding the coded bit stream recorded on a recording medium 215 such as a DVD or a blu-ray disc (BD), or (ii) for coding the video signals and recording the resulting data on the recording medium ex215. In this case, the reproduced video signals are displayed on the monitor ex219. Furthermore, the reproduced video signals can be reproduced by another device or system, using the recording medium ex215 on which the coded bit stream is recorded. Furthermore, it is also possible to implement the image decoding apparatus in the set top box ex217 connected to the cable ex203 for a cable television or the antenna ex204 for satellite and/or terrestrial broadcasting, so as to display the video signals on the monitor ex219 of the television. The image decoding apparatus may be included not in the set top box but in the television.

Figure 37:
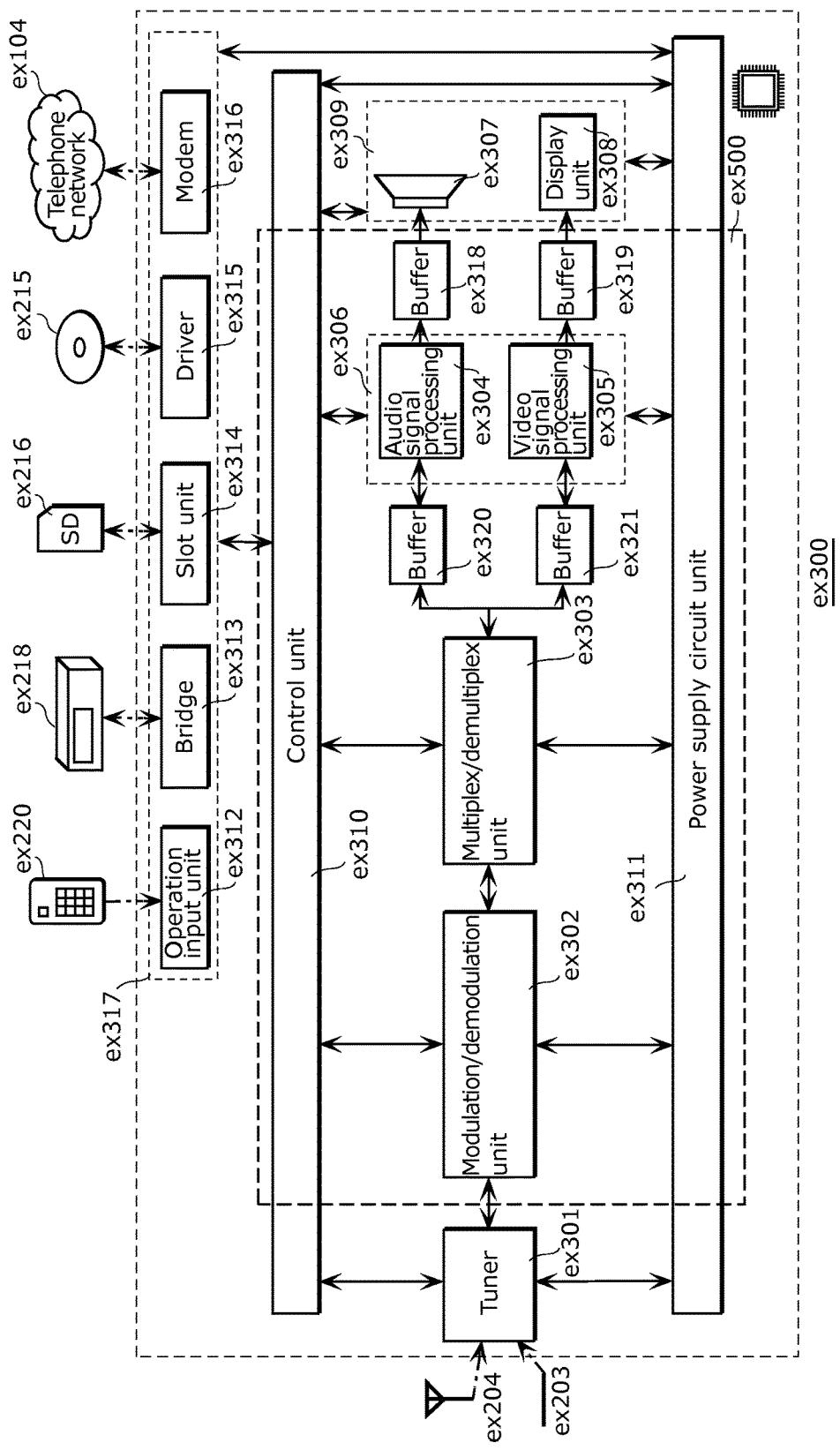
FIG. 37 is a block diagram showing an example of a configuration of a television in Embodiment 4 according to the present invention.

FIG. 37 illustrates the television (receiver) ex300 that uses the image decoding method described in above Embodiments. The television ex300 includes: a tuner ex301 that obtains or provides a bit stream of video information from and through the antenna ex204 or the cable ex203, etc. that receives a broadcast; a modulation/demodulation unit ex302 that demodulates the received coded data or modulates data into coded data to be supplied outside; and a multiplexing/demultiplexing unit ex303 that demultiplexes the modulated data into video data and audio data, or multiplexes the coded video data and audio data into data. Furthermore, the television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to one another through a synchronous bus.

First, a configuration in which the television ex300 decodes data obtained from outside through the antenna ex204 and others and reproduces the decoded data will be described. In the television ex300, upon receipt of a user operation from a remote controller ex220 and others, the multiplexing/demultiplexing unit ex303 demultiplexes the video data and audio data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in above Embodiments, in the television ex300. The output unit ex309 provides the decoded video signal and audio signal outside. When the output unit ex309 provides the video signal and the audio signal, the signals may be temporarily stored in buffers ex318 and ex319, and others so that the signals are reproduced in synchronization with each other. Furthermore, the television ex300 may read a coded bitstream not through a broadcast and others but from the recording media ex215 and ex216, such as a magnetic disk, an optical disc, and an SD card. Next, a configuration in which the television ex300 codes an audio signal and a video signal, and transmits the data outside or writes the data on a recording medium will be described. In the television ex300, upon receipt of a user operation from the remote controller ex220 and others, the audio signal processing unit ex304 codes an audio signal, and the video signal processing unit ex305 codes a video signal, under control of the control unit ex310 using the coding method as described in above Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may not be capable of performing all the processes but only capable of receiving, decoding, and providing outside data.

Furthermore, when the reader/recorder ex218 reads or writes a coded bit stream from or in a recording medium, one of the television ex300 and the reader/recorder ex218 may decode or code the coded bit stream, and the television ex300 and the reader/recorder ex218 may share the decoding or coding.

Figure 38:
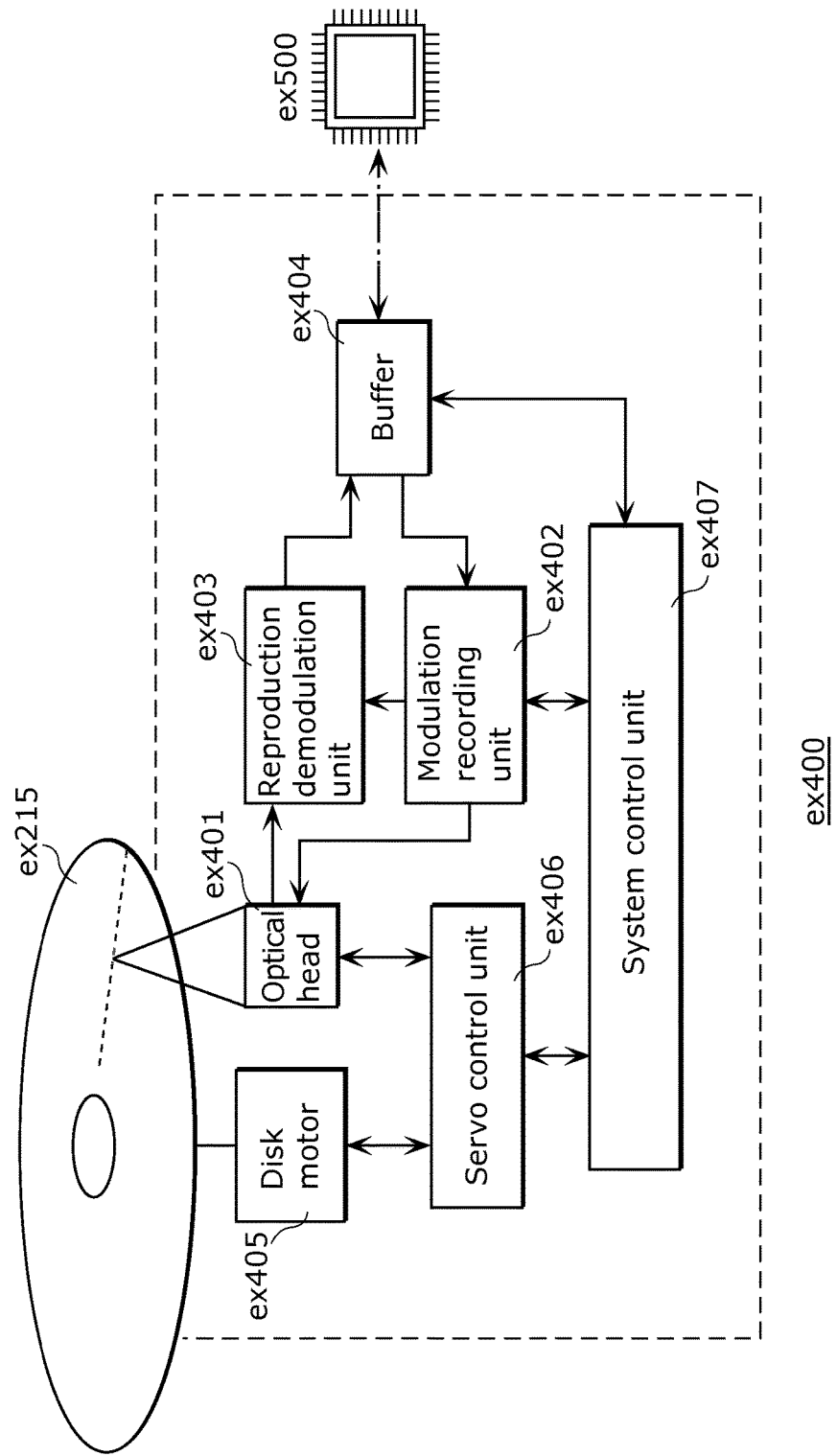
FIG. 38 is a block diagram showing an example of a configuration of an information reproducing-recording unit that reads and writes information from and to an optical disc used as a recording medium, in Embodiment 4 according to the present invention.

As an example, FIG. 38 illustrates a configuration of an information reproducing/recording unit ex400 when data is read or written from or in an optical disc. The information reproducing/recording unit ex400 includes constituent elements ex401 to ex407 to be described hereinafter. The optical head ex401 irradiates a laser spot on a recording surface of the recording medium ex215 that is an optical disc to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 39:
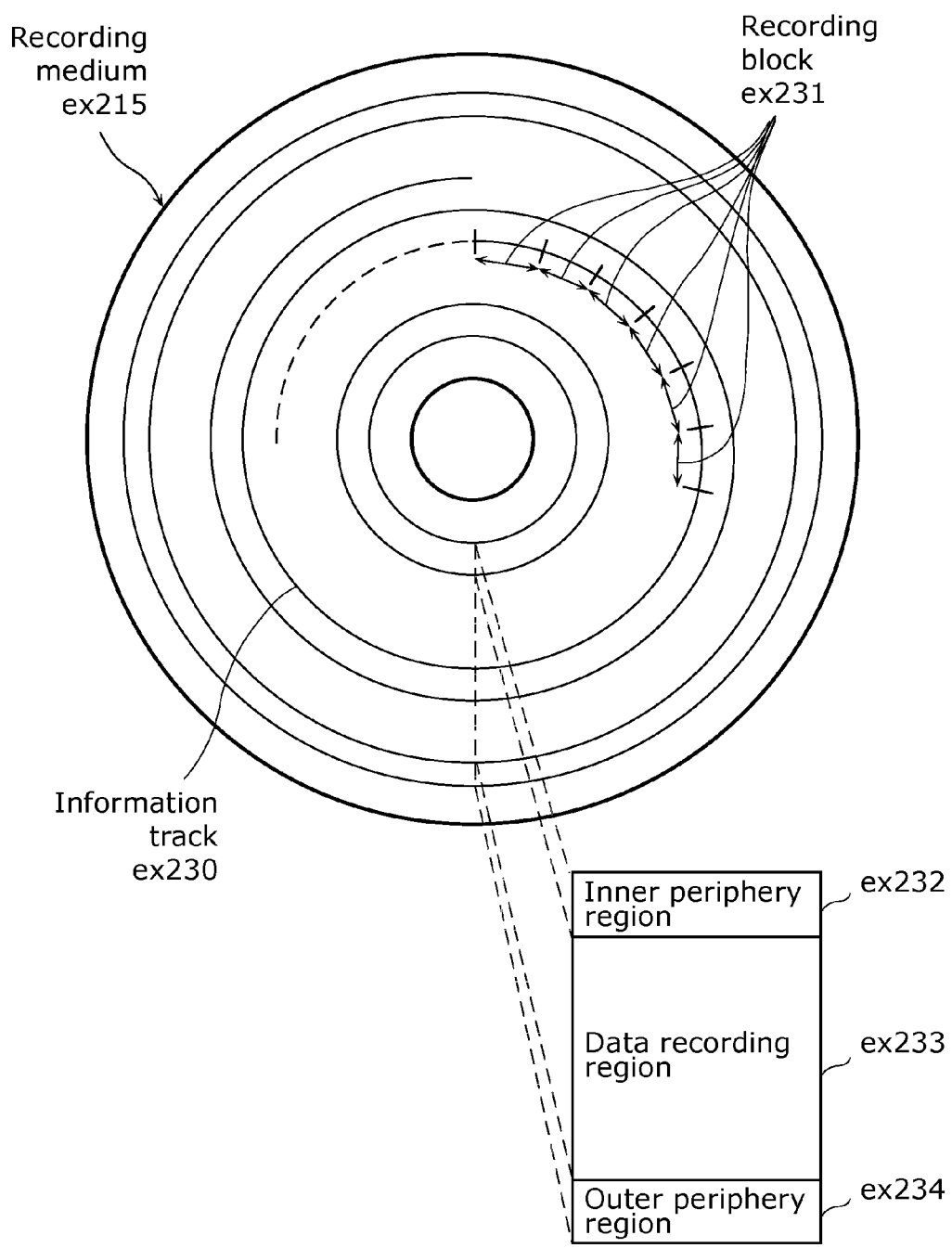
FIG. 39 is a diagram showing an example of a structure of a recording medium that is an optical disc, in Embodiment 4 according to the present invention.

FIG. 39 schematically illustrates the recording medium ex215 that is the optical disc. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or coded data obtained by multiplexing the coded audio data and the coded video data, from and on the data recording area ex233 of the recording medium ex215.

Although an optical disc having a layer, such as a DVD and a BD is described as an example in the description, the optical disc is not limited to such, and may be an optical disc having a multilayer structure and capable of being recorded on a part other than the surface. Furthermore, the optical disc may have a structure for multidimensional recording/reproduction, such as recording of information using light of colors with different wavelengths in the same portion of the optical disc and recording information having different layers from various angles.

Furthermore, the car ex210 having the antenna ex205 can receive data from the broadcast satellite ex202 and others, and reproduce video on the display device such as the car navigation system ex211 set in the car ex210, in a digital broadcasting system ex200. Here, a configuration of the car navigation system ex211 will be the one for example, including a GPS receiving unit in the configuration illustrated in FIG. 35. The same will be true for the configuration of the computer ex111, the cellular phone ex114, and others. Furthermore, similarly to the television ex300, a terminal such as the cellular phone ex114 may have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

As such, the video coding method or the video decoding method described in above Embodiments can be used in any of the devices and systems described. Thus, the advantages described therein can be obtained.

Furthermore, the present invention is not limited to above Embodiments, and various modifications and revisions are possible without departing from the scope of the present invention.

[Embodiment 5]

Figure 40:
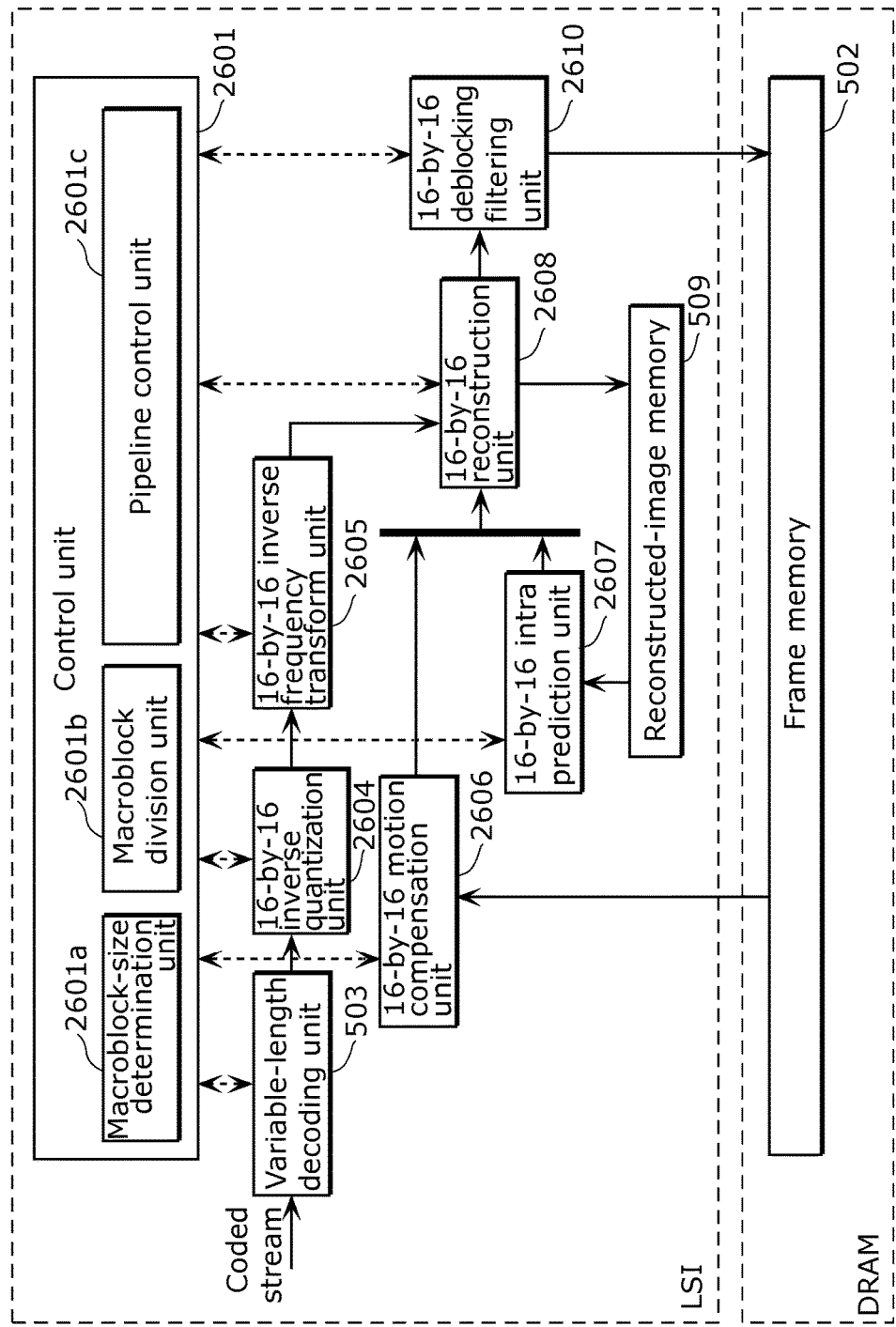
FIG. 40 is a block diagram showing an example of a configuration of an integrated circuit for implementing an image decoding apparatus, in Embodiment 5 according to the present invention.

FIG. 40 shows Embodiment 5 where the image decoding apparatus described in Embodiment 3 is implemented as an LSI which is typically a semiconductor integrated circuit. The frame memory 502 is implemented on a DRAM, and the other circuits and memories are implemented on the LSI.

These may be integrated into individual chips or may be integrated into one chip including some or all of them. Although referred to as the LSI here, it may be referred to as an IC, a system LSI, a super LSI, or an ultra LSI depending on the scale of integration.

A method for circuit integration is not limited to application of an LSI. It may be implemented as a dedicated circuit or a general purpose processor. It is also possible to use a Field Programmable Gate Array (FPGA) that can be programmed after the LSI is manufactured, or a reconfigurable processor in which connection and setting of circuit cells inside the LSI can be reconfigured.

Moreover, when a circuit integration technology that replaces LSIs comes along owing to advances of the semiconductor technology or to a separate derivative technology, the function blocks should be understandably integrated using that technology.

There can be a possibility of adaptation of biotechnology, for example.

In addition, the semiconductor chip on which the image decoding apparatus described in above Embodiment has been integrated can be combined with a display for drawing images, to form an image drawing device depending on various applications. The present invention can thereby be used as an information drawing means for a mobile phone, a television set, a digital video recorder, a digital camcorder, a vehicle navigation device, and the like. The display in the combination may be, for example: a cathode-ray tube (CRT); a flat display such as a liquid crystal display, a plasma display panel (PDP), or an organic electroluminescent (EL) display; or a projection display represented by a projector.

In above Embodiments, the configuration includes the system LSI and the DRAM. However, the configuration may include a different storage device, such as an embedded DRAM (eDRAM), a static random access memory (SRAM), or a hard disk.

[Embodiment 6]

Figure 41:
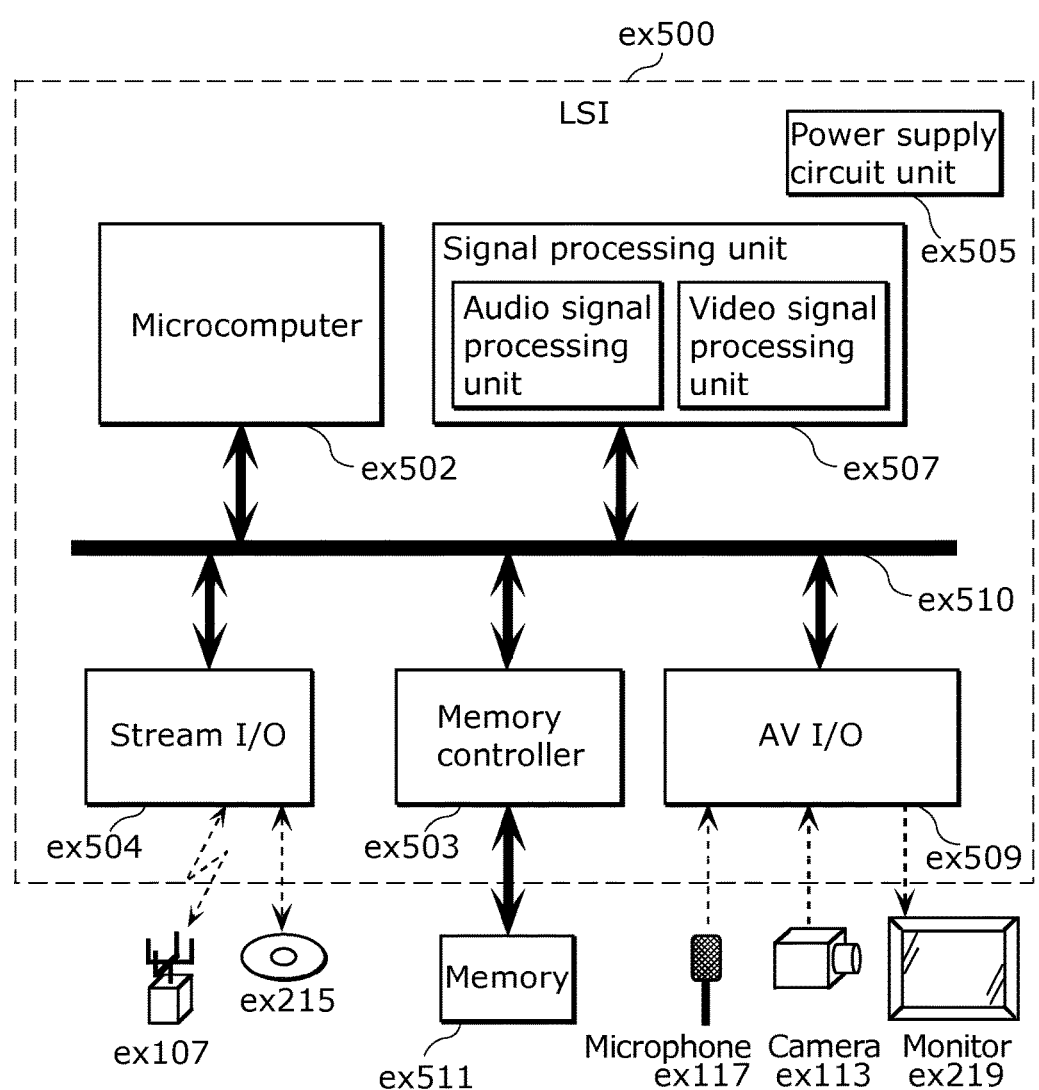
FIG. 41 is a block diagram showing an example of a configuration of another integrated circuit for implementing an image decoding apparatus, in Embodiment 6 according to the present invention.

Each of the image decoding apparatuses and the image decoding methods in above Embodiments is achieved by an LSI which is typically an integrated circuit. As an example, FIG. 41 illustrates a configuration of an LSI ex500 that is made into one chip. The LSI ex500 includes elements ex502 to ex509 to be described below, and the elements are connected to each other through a bus ex510. The power supply circuit unit ex505 is activated by supplying each of the elements with power when power is on.

For example, when coded data is decoded, the LSI ex500 temporarily stores, in the memory ex511, the coded data obtained from the modulation/demodulation unit ex302 through the stream I/O ex504 or read from the recording medium ex215 under control of the microcomputer ex502. Under control of the microcomputer ex502, the stored data is subdivided into data portions according to the computing amount and speed as necessary. Then, the data portions are transmitted to a signal processing unit ex507. The signal processing unit ex507 decodes audio data and/or video data. Here, the decoding of the video signal is the decoding described in Embodiments. Furthermore, a decoded audio signal and a decoded video signal may be temporarily stored in the memory ex511 and others so that the signals can be reproduced in synchronization with each other. The decoded output signal is provided from the AV I/O ex509 to the monitor ex219 via, for example, the memory ex511 as necessary. When the memory ex511 is accessed, a memory controller ex503 is used.

Although the memory ex511 is an element outside the LSI ex500 in the description, it may be included in the LSI ex500. Furthermore, the LSI ex500 may be made into one chip or a plurality of chips.

Although referred to as the LSI here, the integrated circuit may be referred to as an IC, a system LSI, a super LSI, or an ultra LSI depending on the degree of integration.

The technique of integrated circuit is not limited to the LSI, and it may be implemented as a dedicated circuit or a general-purpose processor. It is also possible to use a FPGA (Field Programmable Gate Array) that can be programmed after manufacturing the LSI, or use a reconfigurable processor in which connection and setting of circuit cells inside the LSI can be reconfigured.

Moreover, when a circuit integration technology that replaces LSIs comes along owing to advances of the semiconductor technology or to a separate derivative technology, the function blocks should be understandably integrated using that technology.

There can be a possibility of adaptation of biotechnology, for example.

INDUSTRIAL APPLICABILITY

The image decoding apparatus according to the present invention can decode, without an increase in the circuit size, a coded video sequence including a large-size block and can be used for various purposes. For example, the image decoding apparatus is applicable to an information display device and an image pickup device, such as a television, a digital video recorder, a car navigation system, a cellular mobile phone, a digital camera, and a digital video camera, and is thus highly useful.

REFERENCE SIGNS LIST 10, 10a, 10b, 10c Image decoding apparatus
11 Block division unit
12 Image data obtainment unit
13 Prediction unit
14 Reconstruction unit
15 Determination unit
16 Inverse processing unit
17 Deblocking filtering unit
20 Recording medium
500, 500A, 500B Image decoding apparatus
501 Control unit
502 Frame memory
503 Variable-length decoding unit
504 Inverse quantization unit
505 Inverse frequency transform unit
506 Motion compensation unit
507 Intra-picture prediction unit
508 Reconstruction unit
509 Reconstructed-image memory
510 Deblocking filtering unit
601 Motion-compensation block division unit
602 Reference image obtainment unit
603 Motion-compensation arithmetic unit
701 Intra-prediction block division unit
702 Reconstructed-image obtainment unit
703 Intra-prediction arithmetic unit
2006 Variable-block-capable motion compensation unit
2007 Variable-block-capable intra prediction unit
2101 Macroblock-size determination unit
2201 Macroblock-size determination unit
2601 Control unit
2601a Macroblock-size determination unit
2601b Macroblock division unit
2601c Pipeline control unit
2604 16-by-16 inverse quantization unit
2605 16-by-16 inverse frequency transform unit
2606 16-by-16 motion compensation unit
2607 16-by-16 intra prediction unit
2608 16-by-16 reconstruction unit
2610 16-by-16 deblocking filtering unit
ex100 Content providing system
ex101 Internet
ex102 Internet service provider
ex103 Streaming server
ex104 Telephone network
ex107 Base station
ex108 Base station
ex109 Base station
ex110 Base station
ex111 Computer
ex112 PDA (Personal Digital Assistant)
ex113 Camera
ex114 Cellular phone
ex116 Camera
ex117 Microphone
ex200 Digital broadcasting system
ex201 Broadcast station
ex202 Broadcast satellite
ex203 Cable
ex204 Antenna
ex205 Antenna
ex210 Car
ex211 Car navigation system
ex212 Reproduction device
ex213 Monitor
ex215 Recording medium
ex216 Recording medium
ex217 Set top box (STB)
ex218 Reader/recorder
ex219 Monitor
ex220 Remote controller
ex230 Information track
ex231 Recording block
ex232 Inner circumference area
ex233 Data recording area
ex234 Outer circumference area
ex300 Television (receiver)
ex301 Tuner
ex302 Modulation/demodulation unit
ex303 Multiplexing/demultiplexing unit
ex304 Audio signal processing unit
ex305 Video signal processing unit
ex306 Signal processing unit
ex307 Speaker
ex308 Display unit
ex309 Output unit
ex310 Control unit
ex311 Power supply circuit unit
ex312 Operation input unit
ex313 Bridge
ex314 Slot unit
ex315 Driver
ex316 Modem
ex317 Interface unit
ex318 Buffer
ex319 Buffer
ex400 Information reproducing/recording unit
ex401 Optical head
ex402 Modulation recording unit
ex403 Reproduction demodulating unit
ex404 Buffer
ex405 Disk motor
ex406 Servo control unit
ex407 System control unit
ex500 LSI
ex502 CPU
ex503 Memory controller
ex504 Stream I/O
ex505 Power supply circuit unit
ex507 Signal processing unit
ex509 AV I/O
ex510 Bus
ex511 Memory

The invention claimed is:

1. An image decoding apparatus that decodes a coded video sequence generated by coding, per block, each of pictures included in video, the image decoding apparatus comprising:
a processor; and
a non-transitory memory having stored thereon executable instructions, which when executed, cause the processor to perform:
determining whether or not a size of a current block, which is to be decoded and which is included in a picture of the coded video sequence, is larger than a predetermined size;
dividing the current block into a plurality of sub-blocks;
obtaining, for each of the sub-blocks, image data for generating a predicted image of the sub-block from a recording medium;

generating, for each of the sub-blocks, the predicted image of the sub-block, based on the image data obtained in the obtaining; and reconstructing each of the sub-blocks, by adding the predicted image generated for the sub-block to the sub-block, wherein in the dividing, (i) the current block is divided into the sub-blocks when the determining determines that the size of the current block is larger than the predetermined size and (ii) the current block is not divided into the sub-blocks when the determining determines that the size of the current block is smaller than or equal to the predetermined size, the obtaining obtains, as the image data for generating the predicted image of the sub-block, a part of an already-reconstructed image in the picture including the sub-block, the generating generates the predicted image by performing intra-picture prediction on the sub-block, with reference to the image data obtained in the obtaining, the dividing includes assigning, to each of the sub-blocks, an intra-prediction mode already assigned to the current block, the intra-prediction mode already assigned to the current block being obtained by decoding coding information included in the coded video sequence, the obtaining of the part of the already-reconstructed image includes:

determining whether or not an intra-prediction mode assigned to a current sub-block to be reconstructed is a prediction mode corresponding to a size larger than a size of the current sub-block to be reconstructed;

calculating a location and a size of an image area used for reference in intra-picture prediction of the current sub-block to be reconstructed when it is determined that the intra-prediction mode is the prediction mode;

determining the location and the size of the image area used for reference in intra-picture prediction of the current sub-block to be reconstructed to be a location and a size which have been associated with the intra-picture prediction mode in advance, when it is determined that the intra-prediction mode is not the prediction mode;

obtaining, as the part of the already-reconstructed image, an image area which is located at the location calculated or determined and has the size calculated or determined, and the calculating of the location and the size of the image area includes:

when the current sub-block to be reconstructed is adjacent to a different sub-block included in the current block and is not adjacent to an already-reconstructed block adjacent to the current block, (i) interdicting the calculation of a location and a size of an image area included in the different sub-block adjacent to the current sub-block to be reconstructed and (ii) calculating a location and a size of an image area included in the already-reconstructed block that is adjacent to the current block and is not adjacent to the current sub-block to be reconstructed.

2. The image decoding apparatus according to claim 1, wherein the obtaining obtains, as the image data for generating the predicted image of the sub-block, a part of an already-reconstructed picture that is included in the coded video sequence and is different from the picture including the sub-block, and the generating generates the predicted image by performing motion compensation on the sub-block, with reference to the image data obtained in the obtaining.

3. The image decoding apparatus according to claim 2, wherein the dividing includes assigning a motion vector and an index that indicates the different picture to each of the sub-blocks, the motion vector and the index being already assigned to the current block.

4. The image decoding apparatus according to claim 3, wherein the dividing includes outputting, for each of the sub-blocks, (i) location information indicating a location of the sub-block in the current block and (ii) the motion vector and the index assigned to the sub-block, and the obtaining obtains, as the image data for generating the predicted image of the sub-block, the part specified by the location information and the motion vector of the sub-block, from the different picture that is specified by the index assigned to the sub-block and is stored in the recording medium.

5. The image decoding apparatus according to claim 1, wherein the dividing includes outputting, for each of the sub-blocks, (i) location information indicating a location of the sub-block in the current block and (ii) the intra-prediction mode assigned to the sub-block, and the obtaining obtains, as the image data for generating the predicted image of the sub-block, the part specified by the location information and the intra-prediction mode of the sub-block, from an already-reconstructed area in the picture including the sub-block.

6. The image decoding apparatus according to claim 1, wherein the executable instructions, when executed, further cause the processor to perform inverse quantization and inverse frequency transform on the current block, sequentially for each of the sub-blocks, and the generating generates a predicted image of a first sub-block, among the sub-blocks, on which the inverse quantization and the inverse frequency transform has already been performed, while the inverse quantization and the inverse frequency transform is performed on a second sub-block among the sub-blocks.

7. The image decoding apparatus according to claim 6, wherein the executable instructions, when executed, further cause the processor to perform eliminating, for each of the sub-blocks, a block noise included in the sub-block reconstructed in the reconstructing, and the eliminating eliminates the block noise included in the first sub-block for which the predicted image is already generated in the generating and which is already reconstructed in the reconstructing, while the generating generates a predicted image of the second sub-block and the reconstructing reconstructs the second sub-block.

8. The image decoding apparatus according to claim 6, wherein the executable instructions, when executed, further cause the processor to perform generating coefficient information by performing variable-length decoding on the coded video sequence and storing the coefficient information into the non-transitory memory, for each of blocks, and when performing the inverse quantization and the inverse frequency transform on the sub-block, a part of the coefficient information corresponding to the sub-block is read and the inverse quantization and the inverse frequency transform is performed on the read part of the coefficient information.

9. The image decoding apparatus according to claim 1,
wherein, in the obtaining, when a pixel value of the block adjacent to the current block is used in the intra-prediction mode assigned to the current block,
the obtaining obtains, as the image data corresponding to the sub-block, the pixel value of the block adjacent to the current block.

10. An image decoding method for decoding a coded video sequence generated by coding, per block, each of pictures included in video, the image decoding method comprising:
determining whether or not a size of a current block, which is to be decoded and which is included in a picture of the coded video sequence, is larger than a predetermined size;
dividing the current block into a plurality of sub-blocks;
obtaining, for each of the sub-blocks, image data for generating the predicted image of the sub-block from a recording medium;
generating, for each of the sub-blocks, the predicted image of the sub-block, based on the image data obtained in the obtaining; and
reconstructing each of the sub-blocks, by adding the predicted image generated for the sub-block to the sub-block,
wherein in the dividing, (i) the current block is divided into the sub-blocks when the determining determines that the size of the current block is larger than the predetermined size and (ii) the current block is not divided into the sub-blocks when the determining determines that the size of the current block is smaller than or equal to the predetermined size,
the obtaining obtains, as the image data for generating the predicted image of the sub-block, a part of an already-reconstructed image in the picture including the sub-block,
the generating generates the predicted image by performing intra-picture prediction on the sub-block, with reference to the image data obtained in the obtaining,
the dividing includes assigning, to each of the sub-blocks, an intra-prediction mode already assigned to the current block, the intra-prediction mode already assigned to the current block being obtained by decoding coding information included in the coded video sequence,
the obtaining of the part of the already-reconstructed image includes:
determining whether or not an intra-prediction mode assigned to a current sub-block to be reconstructed is a prediction mode corresponding to a size larger than a size of the current sub-block to be reconstructed;
calculating a location and a size of an image area used for reference in intra-picture prediction of the current sub-block to be reconstructed when it is determined that the intra-prediction mode is the prediction mode;
determining the location and the size of the image area used for reference in intra-picture prediction of the current sub-block to be reconstructed to be a location and a size which have been associated with the intra-picture prediction mode in advance, when it is determined that the intra-prediction mode is not the prediction mode;
obtaining, as the part of the already-reconstructed image, an image area which is located at the location calculated or determined and has the size calculated or determined, and
the calculating of the location and the size of the image area includes:
when the current sub-block to be reconstructed is adjacent to a different sub-block included in the current block and is not adjacent to an already-reconstructed block adjacent to the current block, (i) interdicting the calculation of a location and a size of an image area included in the different sub-block adjacent to the current sub-block to be reconstructed and (ii) calculating a location and a size of an image area included in the already-reconstructed block that is adjacent to the current block and is not adjacent to the current sub-block to be reconstructed.

11. An integrated circuit that decodes a coded video sequence generated by coding, per block, each of pictures included in video, the integrated circuit comprising:
a processor; and
a non-transitory memory having stored thereon executable instructions, which when executed, cause the processor to perform:
determining whether or not a size of a current block, which is to be decoded and which is included in a picture of the coded video sequence, is larger than a predetermined size;
dividing the current block into a plurality of sub-blocks;
obtaining, for each of the sub-blocks, image data for generating the predicted image of the sub-block from a recording medium;
generating, for each of the sub-blocks, the predicted image of the sub-block, based on the image data obtained in the obtaining; and
reconstructing each of the sub-blocks, by adding the predicted image generated for the sub-block to the sub-block,
wherein in the dividing, (i) the current block is divided into the sub-blocks when the determining determines that the size of the current block is larger than the predetermined size and (ii) the current block is not divided into the sub-blocks when the determining determines that the size of the current block is smaller than or equal to the predetermined size,
the obtaining obtains, as the image data for generating the predicted image of the sub-block, a part of an already-reconstructed image in the picture including the sub-block,
the generating generates the predicted image by performing intra-picture prediction on the sub-block, with reference to the image data obtained in the obtaining,
the dividing includes assigning, to each of the sub-blocks, an intra-prediction mode already assigned to the current block, the intra-prediction mode already assigned to the current block being obtained by decoding coding information included in the coded video sequence,
the obtaining of the part of the already-reconstructed image includes:
determining whether or not an intra-prediction mode assigned to a current sub-block to be reconstructed is a prediction mode corresponding to a size larger than a size of the current sub-block to be reconstructed;
calculating a location and a size of an image area used for reference in intra-picture prediction of the current sub-block to be reconstructed when it is determined that the intra-prediction mode is the prediction mode;
determining the location and the size of the image area used for reference in intra-picture prediction of the current sub-block to be reconstructed to be a location and a size which have been associated with the intra-picture prediction mode in advance, when it is determined that the intra-prediction mode is not the prediction mode;

obtaining, as the part of the already-reconstructed image, an image area which is located at the location calculated or determined and has the size calculated or determined, and the calculating of the location and the size of the image area includes:

when the current sub-block to be reconstructed is adjacent to a different sub-block included in the current block and is not adjacent to an already-reconstructed block adjacent to the current block, (i) interdicting the calculation of a location and a size of an image area included in the different sub-block adjacent to the current sub-block to be reconstructed and (ii) calculating a location and a size of an image area included in the already-reconstructed block that is adjacent to the current block and is not adjacent to the current sub-block to be reconstructed.

12. A non-transitory computer-readable recording medium for use in a computer, the recording medium having a computer program recorded thereon for decoding a coded video sequence generated by coding, per block, each of pictures included in video, and the computer program causing the computer to execute:

determining whether or not a size of a current block, which is to be decoded and which is included in a picture of the coded video sequence, is larger than a predetermined size;

dividing the current block into a plurality of sub-blocks;

obtaining, for each of the sub-blocks, image data for generating the predicted image of the sub-block from a recording medium;

generating, for each of the sub-blocks, the predicted image of the sub-block, based on the image data obtained in the obtaining; and reconstructing each of the sub-blocks, by adding the predicted image generated for the sub-block to the sub-block, wherein in the dividing, (i) the current block is divided into the sub-blocks when the determining determines that the size of the current block is larger than the predetermined size and (ii) the current block is not divided into the sub-blocks when the determining determines that the size of the current block is smaller than or equal to the predetermined size, the obtaining obtains, as the image data for generating the predicted image of the sub-block, a part of an already-reconstructed image in the picture including the sub-block, the generating generates the predicted image by performing intra-picture prediction on the sub-block, with reference to the image data obtained in the obtaining, the dividing includes assigning, to each of the sub-blocks, an intra-prediction mode already assigned to the current block, the intra-prediction mode already assigned to the current block being obtained by decoding coding information included in the coded video sequence, the obtaining of the part of the already-reconstructed image includes:

determining whether or not an intra-prediction mode assigned to a current sub-block to be reconstructed is a prediction mode corresponding to a size larger than a size of the current sub-block to be reconstructed;

calculating a location and a size of an image area used for reference in intra-picture prediction of the current sub-block to be reconstructed when it is determined that the intra-prediction mode is the prediction mode;

determining the location and the size of the image area used for reference in intra-picture prediction of the current sub-block to be reconstructed to be a location and a size which have been associated with the intra-picture prediction mode in advance, when it is determined that the intra-prediction mode is not the prediction mode;

obtaining, as the part of the already-reconstructed image, an image area which is located at the location calculated or determined and has the size calculated or determined, and the calculating of the location and the size of the image area includes:

when the current sub-block to be reconstructed is adjacent to a different sub-block included in the current block and is not adjacent to an already-reconstructed block adjacent to the current block, (i) interdicting the calculation of a location and a size of an image area included in the different sub-block adjacent to the current sub-block to be reconstructed and (ii) calculating a location and a size of an image area included in the already-reconstructed block that is adjacent to the current block and is not adjacent to the current sub-block to be reconstructed.

\* \* \* \* \*